United States Patent
Hotta et al.

[11] Patent Number: 5,222,923
[45] Date of Patent: Jun. 29, 1993

[54] PLANETARY GEAR TRANSMISSION

[75] Inventors: Takashi Hotta; Yukio Morita, both of Asaka; Yoichi Kojima, Shiki; Kimihiko Kikuchi, Tokorozawa; Tsunefumi Niiyama, Kamifukuoka; Yorinori Kumagai, Kawaguchi; Hiroshi Nakayama, Niiza, all of Japan

[73] Assignee: Honda Giken Kogyo Kabushiki Kaisha, Tokyo, Japan

[21] Appl. No.: 766,660

[22] Filed: Sep. 26, 1991

[30] Foreign Application Priority Data

Sep. 28, 1990 [JP] Japan ................................. 2-261726

[51] Int. Cl.⁵ ............................................. F16H 3/62
[52] U.S. Cl. .................................................. 475/276
[58] Field of Search ................ 475/276, 277, 278, 279

[56] References Cited

U.S. PATENT DOCUMENTS

| | | | |
|---|---|---|---|
| 4,038,887 | 8/1977 | Murakami et al. | 475/276 |
| 4,038,888 | 8/1977 | Murakami et al. | 475/276 |
| 4,223,571 | 9/1980 | Quemerais et al. | 475/276 |
| 5,090,952 | 2/1992 | Asada | 475/278 |

FOREIGN PATENT DOCUMENTS

| | | |
|---|---|---|
| 59-222644 | 12/1984 | Japan . |
| 61-103654 | 7/1986 | Japan . |
| 63-318349 | 12/1988 | Japan . |
| 1-320361 | 12/1989 | Japan . |
| 1-320362 | 12/1989 | Japan . |
| 0076954 | 3/1990 | Japan .................................. 475/276 |
| 0118241 | 5/1990 | Japan .................................. 475/278 |

OTHER PUBLICATIONS

English translation outlining JP63-318349, JP59-222644 and JP1-320361 and JP1-320362.

Primary Examiner—Dirk Wright
Attorney, Agent, or Firm—Lyon & Lyon

[57] ABSTRACT

A planetary gear transmission typically for use on automobiles has first, second, and third planetary gear trains arranged coaxially with each other and each having elements including a sun gear, a carrier, and a ring gear. Two of the elements of each of the first, second, and third planetary gear trains are directly or disengageably coupled to elements of the other planetary gear trains. The transmission also has two clutch means and three brake means for selectively establishing a power transmitting path from an input shaft to an output gear member through the first, second, and third planetary gear trains. The first planetary gear train comprises a double-pinion planetary gear train, one of the sun gear and the carrier of the double-pinion planetary gear train being coupled to the input shaft and the other being disengageably coupled to a stationary member. The elements of the first, second, and third planetary gear trains are corotatably coupled into first, second, third fourth, and fifth rotational members in a speed diagram, the third and fifth rotatable members being coupled to the input member, the fourth rotational member being coupled to the output member.

118 Claims, 101 Drawing Sheets

| RANGES | K1 | K2 | B1 | B2 | B3 | RATIOS |
|--------|----|----|----|----|----|--------|
| LOW    | O  |    |    |    | O  | 3.577  |
| 2ND    | O  |    |    | O  |    | 2.100  |
| 3RD    | O  |    | O  |    |    | 1.400  |
| 4TH    | O  | O  |    |    |    | 1.000  |
| 5TH    |    | O  | O  |    |    | 0.711  |
| REV    |    |    | O  |    | O  | 2.953  |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | S2 | C2 | R2 | | | 0.32 |
| | G3 | S3 | C3 | | R3 | | 0.57 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | S2 | C2 | R2 | | | 0.32 |
| | G3 | S3 | C3 | | R3 | | 0.57 |

| RANGES | K 1 | K 2 | B 1 | B 2 | B 3 | RATIOS |
|---|---|---|---|---|---|---|
| LOW | ○ | | | | ○ | 3.577 |
| 2ND | ○ | | | ○ | | 2.100 |
| 3RD | ○ | | ○ | | | 1.400 |
| 4TH | ○ | ○ | | | | 1.000 |
| 5TH | | ○ | ○ | | | 0.711 |
| REV | | | ○ | | ○ | 2.953 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G 1 | S1 | R1 | | | C1 | 0.55 |
| | G 2 | S2 | C2 | R2 | | | 0.32 |
| | G 3 | S3 | R3 | | C3 | | 0.36 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | S2 | C2 | R2 | | | 0.32 |
| | G3 | S3 | R3 | | C3 | | 0.36 |

| PLANETARY GEAR TRAINS | | ROTATIONAL MEMBERS | | | | | $\lambda$ |
|---|---|---|---|---|---|---|---|
| | | 1ST | 2ND | 3RD | 4TH | 5TH | |
| | G 1 | S1 | R1 | | | C1 | 0.55 |
| | G 2 | S2 | C2 | R2 | | | 0.32 |
| | G 3 | C3 | R3 | | S3 | | 0.64 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | S2 | C2 | R2 | | | 0.32 |
| | G3 | C3 | R3 | | S3 | | 0.64 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | S1 | R1 | | | C1 | 0.55 |
| | G2 | S2 | C2 | R2 | | | 0.32 |
| | G3 | | S3 | R3 | C3 | | 0.43 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | S2 | C2 | R2 | | | 0.32 |
| | G3 | | S3 | R3 | C3 | | 0.43 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | S2 | C2 | R2 | | | 0.32 |
| | G3 | | C3 | R3 | S3 | | 0.57 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | S2 | C2 | R2 | | | 0.32 |
| | G3 | | C3 | R3 | S3 | | 0.57 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | S3 | C3 | | R3 | | 0.57 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | | S2 | R2 | C2 | | 0.43 |
| | G3 | S3 | C3 | | R3 | | 0.57 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | S3 | C3 | | R3 | | 0.57 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | S2 | | 0.57 |
| | G3 | S3 | C3 | | R3 | | 0.57 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | R2 | S2 | | 0.57 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | | C2 | R2 | S2 | | 0.57 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | C3 | R3 | | S3 | 0.27 |

|  |  | ROTATIONAL MEMBERS | | | | | λ |
|---|---|---|---|---|---|---|---|
|  |  | 1ST | 2ND | 3RD | 4TH | 5TH |  |
| PLANETARY GEAR TRAINS | G1 | C1 | R1 |  |  | S1 | 0.45 |
|  | G2 |  | C2 | R2 | S2 |  | 0.57 |
|  | G3 |  | C3 | R3 |  | S3 | 0.27 |

|  |  | ROTATIONAL MEMBERS | | | | | $\lambda$ |
|---|---|---|---|---|---|---|---|
|  |  | 1ST | 2ND | 3RD | 4TH | 5TH |  |
| PLANETARY GEAR TRAINS | G1 | S1 | R1 |  |  | C1 | 0.55 |
|  | G2 |  | S2 | R2 | C2 |  | 0.43 |
|  | G3 |  | S3 |  | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G 1 | C 1 | R 1 | | | S 1 | 0.45 |
| | G 2 | | S 2 | R 2 | C 2 | | 0.43 |
| | G 3 | | S 3 | | R 3 | C 3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | | R3 | S3 | 0.48 |

| | | ROTATIONAL MEMBERS | | | | |
|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | C3 | | R3 | S3 | 0.48 |

|  | | ROTATIONAL MEMBERS | | | | | |
|---|---|---|---|---|---|---|---|
|  | | 1ST | 2ND | 3RD | 4TH | 5TH | λ |
| PLANETARY GEAR TRAINS | G1 | S1 | R1 |  |  | C1 | 0.55 |
|  | G2 |  | C2 | R2 | S2 |  | 0.57 |
|  | G3 |  | S3 |  | R3 | C3 | 0.52 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | R2 | S2 | | 0.57 |
| | G3 | | C3 | | R3 | S3 | 0.48 |

| | | ROTATIONAL MEMBERS | | | | | $\lambda$ |
|---|---|---|---|---|---|---|---|
| | | 1ST | 2ND | 3RD | 4TH | 5TH | |
| PLANETARY GEAR TRAINS | G 1 | C1 | R1 | | | S1 | 0.45 |
| | G 2 | | C2 | R2 | S2 | | 0.57 |
| | G 3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.52 |
| | G3 | | | R3 | C3 | S3 | 0.39 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.52 |
| | G3 | | | R3 | C3 | S3 | 0.39 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | | C3 | R3 | S3 | 0.28 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | R2 | S2 | | 0.57 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | S2 | | 0.57 |
| | G3 | | | C3 | R3 | S3 | 0.28 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | S1 | R1 | | | C1 | 0.55 |
| | G2 | | R2 | C2 | | S2 | 0.37 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | R2 | C2 | | S2 | 0.37 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | R2 | | S2 | 0.27 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | | S2 | 0.27 |
| | G3 | | C3 | | R3 | S3 | 0.48 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | C2 | R2 | | S2 | 0.27 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | | R2 | C2 | S2 | 0.39 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | | R2 | C2 | S2 | 0.39 |
| | G3 | | S3 | | R3 | C3 | 0.52 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | S1 | R1 | | | C1 | 0.55 |
| | G2 | | | R2 | C2 | S2 | 0.39 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | | R2 | C2 | S2 | 0.39 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | | C2 | R2 | S2 | 0.28 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | | C2 | R2 | S2 | 0.28 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | | C2 | R2 | S2 | 0.28 |
| | G3 | | C3 | | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | | C2 | R2 | S2 | 0.28 |
| | G3 | | C3 | | R3 | S3 | 0.28 |

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | ○ | ○ | |
| G3 | | ○ | ○ | | ○ |

| PLANETARY GEAR TRAINS | | ROTATIONAL MEMBERS | | | | |
|---|---|---|---|---|---|---|
| | | 1ST | 2ND | 3RD | 4TH | 5TH |
| | G1 | ○ | ○ | | | ○ |
| | G2 | | ○ | ○ | ○ | |
| | G3 | | | ○ | ○ | ○ |

| PLANETARY GEAR TRAINS | ROTATIONAL MEMBERS | | | | |
|---|---|---|---|---|---|
| | 1ST | 2ND | 3RD | 4TH | 5TH |
| G1 | ◯ | ◯ | | | ◯ |
| G2 | | ◯ | ◯ | ◯ | |
| G3 | | ◯ | ◯ | | ◯ |

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | ○ | ○ | |
| G3 | | ○ | | ○ | ○ |

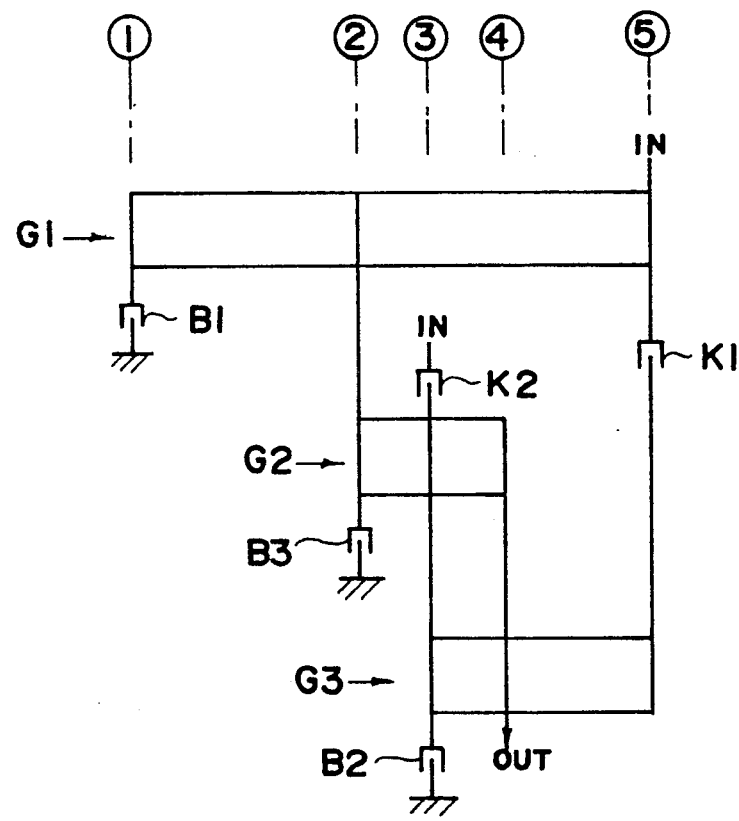

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | ○ | | ○ |
| G3 | | ○ | | ○ | ○ |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | R2 | | S2 | 0.27 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | R2 | C2 | | S2 | 0.37 |
| | G3 | | | C3 | R3 | S3 | 0.28 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | R2 | C2 | | S2 | 0.37 |
| | G3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | C2 | R2 | | S2 | 0.27 |
| | G3 | | | C3 | R3 | S3 | 0.28 |

| PLANETARY GEAR TRAINS | ROTATIONAL MEMBERS | | | | |
|---|---|---|---|---|---|
| | 1ST | 2ND | 3RD | 4TH | 5TH |
| G1 | ◯ | ◯ | | | ◯ |
| G2 | ◯ | ◯ | ◯ | | |
| G3 | | ◯ | ◯ | ◯ | |

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | ○ | ○ | |
| G3 | ○ | ○ | | ○ | |

| PLANETARY GEAR TRAINS | ROTATIONAL MEMBERS | | | | |
|---|---|---|---|---|---|
| | 1ST | 2ND | 3RD | 4TH | 5TH |
| G1 | ○ | ○ | | | ○ |
| G2 | | ○ | ○ | ○ | |
| G3 | | ○ | ○ | | ○ |

|  | | ROTATIONAL MEMBERS | | | | |
|---|---|---|---|---|---|---|
|  | | 1ST | 2ND | 3RD | 4TH | 5TH |
| PLANETARY GEAR TRAINS | G1 | ○ | ○ | | | ○ |
|  | G2 | | ○ | ○ | ○ | |
|  | G3 | | ○ | | ○ | ○ |

| PLANETARY GEAR TRAINS | | ROTATIONAL MEMBERS | | | | |
|---|---|---|---|---|---|---|
| | | 1ST | 2ND | 3RD | 4TH | 5TH |
| | G1 | ○ | ○ | | | ○ |
| | G2 | | ○ | ○ | | ○ |
| | G3 | | | ○ | ○ | ○ |

| PLANETARY GEAR TRAINS | ROTATIONAL MEMBERS | | | | |
|---|---|---|---|---|---|
| | | 1ST | 2ND | 3RD | 4TH | 5TH |
| | G1 | ○ | ○ | | | ○ |
| | G2 | | | ○ | ○ | ○ |
| | G3 | | ○ | | ○ | ○ |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | S3 | R3 | | C3 | | 0.36 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | S1 | R1 | | | C1 | 0.55 |
| | G2 | | C2 | R2 | S2 | | 0.57 |
| | G3 | S3 | R3 | | C3 | | 0.36 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | C2 | R2 | S2 | | 0.57 |
| | G3 | S3 | R3 | | C3 | | 0.36 |

|  |  | ROTATIONAL MEMBERS | | | | | $\lambda$ |
|---|---|---|---|---|---|---|---|
|  |  | 1ST | 2ND | 3RD | 4TH | 5TH |  |
| PLANETARY GEAR TRAINS | G1 | C1 | R1 |  |  | S1 | 0.45 |
|  | G2 |  | S2 | R2 | C2 |  | 0.43 |
|  | G3 | C3 | R3 |  | S3 |  | 0.64 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | S1 | R1 | | | C1 | 0.55 |
| | G2 | | C2 | R2 | S2 | | 0.57 |
| | G3 | C3 | R3 | | S3 | | 0.64 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | R2 | S2 | | 0.57 |
| | G3 | C3 | R3 | | S3 | | 0.64 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | S2 | R2 | C2 | | 0.43 |
| | G3 | | R3 | C3 | | S3 | 0.38 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | R3 | C3 | | S3 | 0.38 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | R3 | C3 | | S1 | 0.37 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | C2 | R2 | S2 | | 0.57 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | S1 | R1 | | | C1 | 0.55 |
| | G2 | | C2 | R2 | S2 | | 0.57 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G 1 | C1 | R1 | | | S1 | 0.45 |
| | G 2 | | C2 | R2 | S2 | | 0.57 |
| | G 3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | S3 | | R3 | C3 | 0.52 |

| | | ROTATIONAL MEMBERS | | | | | |
|---|---|---|---|---|---|---|---|
| | | 1ST | 2ND | 3RD | 4TH | 5TH | $\lambda$ |
| PLANETARY GEAR TRAINS | G1 | C1 | R1 | | | S1 | 0.45 |
| | G2 | | S2 | R2 | C2 | | 0.43 |
| | G3 | | S3 | | R3 | C3 | 0.52 |

| | | ROTATIONAL MEMBERS | | | | | |
| --- | --- | --- | --- | --- | --- | --- | --- |
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | | R3 | S3 | 0.48 |

| | | ROTATIONAL MEMBERS | | | | | $\lambda$ |
|---|---|---|---|---|---|---|---|
| | | 1ST | 2ND | 3RD | 4TH | 5TH | |
| PLANETARY GEAR TRAINS | G 1 | S1 | R1 | | | C1 | 0.55 |
| | G 2 | | C2 | R2 | S2 | | 0.57 |
| | G 3 | | C3 | | R3 | S3 | 0.48 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.45 |
| | G3 | | R3 | C3 | | S3 | 0.38 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | C1 | R1 | | | S1 | 0.45 |
| | G2 | | S2 | R2 | C2 | | 0.43 |
| | G3 | | R3 | C3 | | S3 | 0.38 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | R3 | | S3 | 0.27 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | C2 | R2 | S2 | | 0.57 |
| | G3 | | R3 | C3 | | S3 | 0.37 |

| | | ROTATIONAL MEMBERS | | | | λ |
|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | C2 | R2 | S2 | | 0.57 |
| | G3 | | R3 | C3 | | S3 | 0.37 |

| | | ROTATIONAL MEMBERS | | | | |
|---|---|---|---|---|---|---|
| | | 1ST | 2ND | 3RD | 4TH | 5TH | λ |
| PLANETARY GEAR TRAINS | G 1 | S1 | R1 | | | C1 | 0.55 |
| | G 2 | | C2 | R2 | S2 | | 0.57 |
| | G 3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | C2 | R2 | S2 | | 0.57 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | | R3 | C3 | S3 | 0.39 |

| | | ROTATIONAL MEMBERS | | | | | $\lambda$ |
|---|---|---|---|---|---|---|---|
| | | 1ST | 2ND | 3RD | 4TH | 5TH | |
| PLANETARY GEAR TRAINS | G1 | C1 | R1 | | | S1 | 0.45 |
| | G2 | | S2 | R2 | C2 | | 0.43 |
| | G3 | | | R3 | C3 | S3 | 0.39 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G 1 | S1 | R1 | | | C1 | 0.55 |
| | G 2 | | S1 | R2 | C2 | | 0.43 |
| | G 3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G 1 | C1 | R1 | | | S1 | 0.45 |
| | G 2 | | S2 | R2 | C2 | | 0.43 |
| | G 3 | | | C3 | R3 | S3 | 0.28 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | S1 | R1 | | | C1 | 0.55 |
| | G2 | | S2 | R2 | C2 | | 0.43 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | R3 | C3 | | S3 | 0.37 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | S1 | R1 | | | C1 | 0.55 |
| | G2 | | S2 | R2 | C2 | | 0.43 |
| | G3 | | C3 | R3 | | S3 | 0.27 |

| | | ROTATIONAL MEMBERS | | | | | |
|---|---|---|---|---|---|---|---|
| | | 1ST | 2ND | 3RD | 4TH | 5TH | λ |
| PLANETARY GEAR TRAINS | G1 | C1 | R1 | | | S1 | 0.45 |
| | G2 | | S2 | R2 | C2 | | 0.43 |
| | G3 | | C3 | R3 | | S3 | 0.27 |

PLANETARY GEAR TRANSMISSION

BACKGROUND OF THE INVENTION

1. Field of the Invention

The present invention relates to a planetary gear transmission which comprises three planetary gear trains with two elements of each of the planetary gear trains being directly or disengageably coupled to elements of the other planetary gear trains.

2. Description of the Prior Art

Planetary gear transmissions are widely used as automatic transmissions for automobiles or the like. Many conventional planetary gear transmissions comprise two planetary gears such as Ravigneaux gear trains, Simpson gear trains, or the like which are combined with each other, and generally have gear positions up to a fourth forward gear position. To meet demands for more gear positions for improved running characteristics, there have been proposed transmissions having gear positions up to and more than a fifth forward gear position, and some of those proposed transmissions have already been in use.

Transmissions with an increased number of gear positions are disclosed in Japanese Laid-Open Patent Publication No. 63-318349 and Japanese Laid-Open Utility Model Publication No. 61-103654, for example. The disclosed transmissions comprise two planetary gear trains each combined with three clutches and three brakes, and have six forward gear positions and one reverse gear position. Since only two planetary gear trains are employed, the disclosed transmissions may share components with conventional planetary gear transmissions. However, the disclosed transmissions are complex in transmission control because they cannot avoid gearshifts which require two engaging means (a clutch and a brake) to be disengaged and two other engaging means to be engaged at the same time.

For example, when the disclosed transmissions effect a gearshift from the second gear position to the third gear position or a gearshift from the third gear position to the second gear position, it is necessary for the transmission to disengage one clutch and one brake and also to engage another clutch and another brake.

Japanese Laid-Open Patent Publications Nos. 59-222644, 1-320361, and 1-320362, for example, disclose planetary gear transmissions each having three planetary gear trains. In the disclosed planetary gear transmissions, two elements of each planetary gear train are mechanically coupled to elements of the other planetary gear trains, and three or four clutches and three brakes are combined with the planetary gear trains. The disclosed planetary gear transmissions have five forward gear positions and one reverse gear position which can be selected by controlling the operation of the engaging means (i.e., the clutches and the brakes). More specifically, each of the gear positions can be selected by engaging two of the engaging means, and any gearshifts between adjacent ones of the five forward gear positions can be accomplished by disengaging one engaging means and engaging another engaging means. Therefore, controlling the disclosed planetary gear transmissions is relatively simple.

However, the planetary gear transmissions each with three planetary gear trains require many engaging means, i.e., six or seven engaging means, in order to establish the desired gear positions. Use of the many engaging means results in a greater transmission size and a more complex transmission structure, and reduces the power transmitting efficiency of the transmissions due to the resistance presented to rotation by the engaging means.

SUMMARY OF THE INVENTION

It is an object of the present invention to provide a planetary gear transmission with three planetary gear trains which is capable of establishing an increased number of gear positions.

Another object of the present invention is to provide a planetary gear transmission which can effect a gearshift between two adjacent gear positions by disengaging one engaging means (a clutch or a brake) and engaging another engaging means, for thereby easily controlling gearshifts.

Still another object of the present invention is to provide a planetary gear transmission which has a reduced number of engaging means (clutches and brakes) for establishing gear positions, so that the planetary gear transmission is relatively small in size, simple in structure, and has a relatively high power transmitting efficiency.

According to the present invention, there is provided a planetary gear transmission comprising an input member, first, second, and third planetary gear trains arranged coaxially with each other and each having elements including a sun gear, a carrier, and a ring gear, two of the elements of each of the first, second, and third planetary gear trains being directly or disengageably coupled to elements of the other planetary gear trains, an output member, and two clutch means and three brake means for selectively establishing a power transmitting path from the input member to the output member through the first, second, and third planetary gear trains, at least one of the first, second, and third planetary gear trains comprising a double-pinion planetary gear train, the sun gear of the double-pinion planetary gear train being coupled to the input member and the carrier being connected to a stationary member through one of the brake means, the elements of the first, second, and third planetary gear trains being corotatably coupled into first, second, third, fourth, and fifth rotational members in a speed diagram, the third and fifth rotatable members being coupled to the input member, and the fourth rotational member being coupled to the output member.

The carrier of the double-pinion planetary gear train may be coupled to the input member, and the sun gear thereof may be connected to the stationary member through one of the brake means.

Since only the five engaging means, i.e., the two clutch means and the three brake means, are employed in the above planetary gear transmission, the number of engaging means required is smaller than the number of engaging means in the conventional planetary gear transmission which comprises three planetary gear trains. Therefore, any loss in the transmitted power due to the frictional resistance caused by the engaging means is relatively small, and hence the power transmitting efficiency of the transmission as a whole is improved.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 174-199 are tables showing rotational members and diagrams showing rotational speeds of elements.

DETAILED DESCRIPTION OF THE PREFERRED EMBODIMENTS

Figures 1, 2:
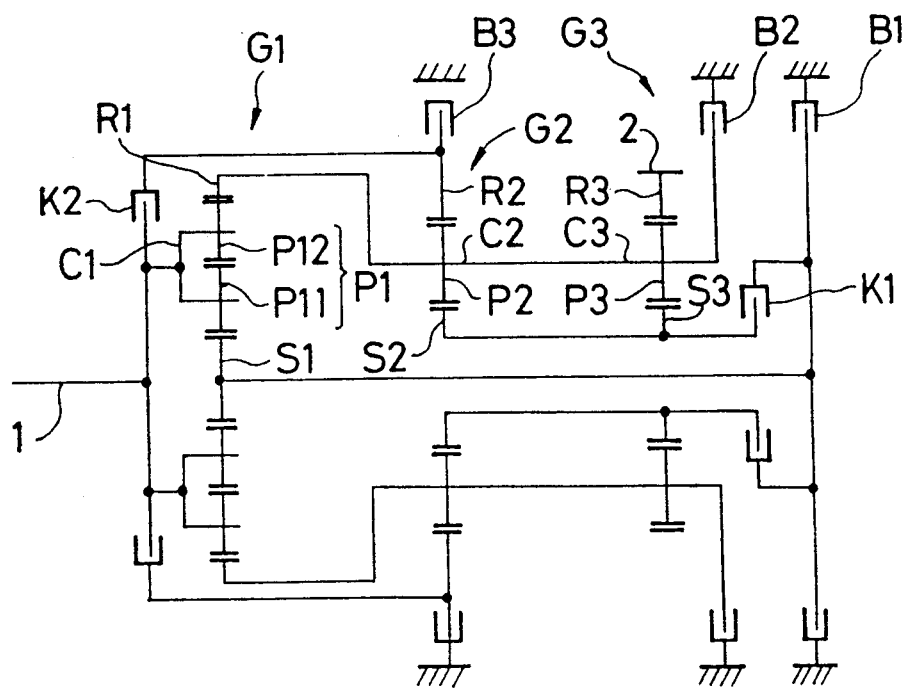
FIG. 1 is a diagram showing a skeleton of a planetary gear transmission according to a first embodiment of the present invention.
FIG. 2 is a table showing the relationship between gear ranges, engagement of engaging means, and speed reduction ratios of the planetary gear transmission shown in FIG. 2.

Like or corresponding reference characters denote like or corresponding parts throughout views.

The embodiment according to the present invention can be divided into 13 types as shown in FIGS. 174-199. Accordingly, each types are described hereinafter.

TYPE 1

Figures 174, 175:
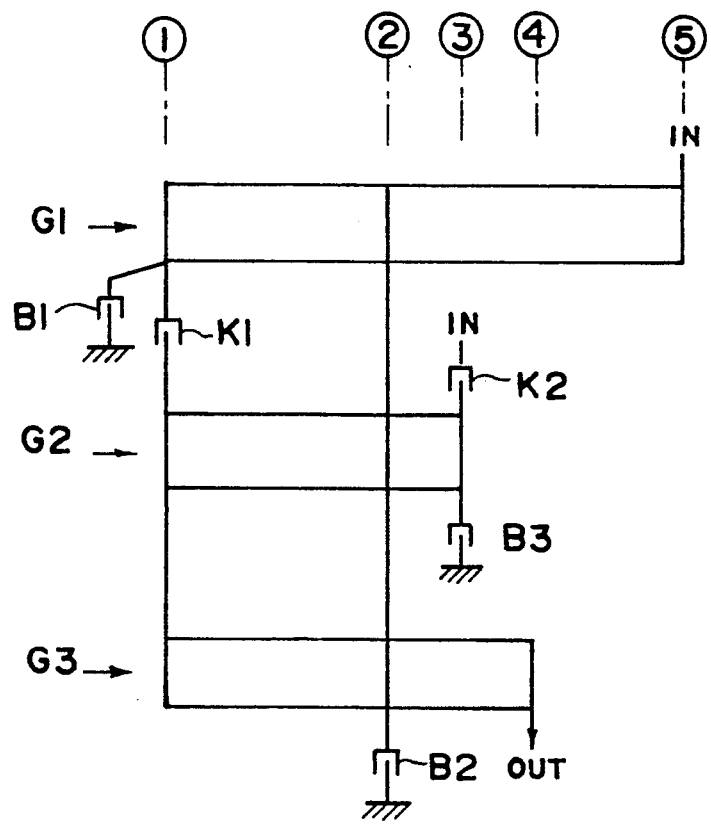

Transmissions of type 1 can be represented by the combination of elements to compose the 1st-5th rotational members shown in FIG. 174. In FIG. 174, each element (sun gear, carrier and ring gear) of the three planetary gear trains G1, G2 and G3 is respectively provided at the place where the symbol (O) is marked to make a planetary gear transmission. The three elements (sun gear S1, carrier C1 and ring gear R1) of the first planetary gear train G1 are respectively coupled to each one of the 1st, 2nd and 5th rotational members. The three elements (S2, C2, R2) of the second planetary gear trains G2 are respectively coupled to each one of the 1st, 2nd and 3rd rotational members. The three elements (S3, C3, R3) of the third planetary gear train G3 are respectively coupled to each one of the 1st, 2nd and 4th rotational members.

A diagram showing coupling relationship among the elements of the three planetary gear trains (G1, G2, G3), two clutches (K1, K2), three brakes (B1, B2, B3), input member and output member is shown in FIG. 175. One of the elements coupled to the 5th rotational member 5 is directly coupled to the input member. One of the elements coupled to the 3rd rotational member 3 in the second planetary gear train G2 is disengageably coupled to the input member through a clutch K2 and is disengageably coupled to a stationary member through a brake B3. One of the elements coupled to the fourth rotational member 4 in the third planetary gear train G3 is directly coupled to the output member. One of the elements coupled to the 1st rotational member 1 is disengageably coupled to a stationary member through a brake B1 and is disengageably coupled to one of the elements coupled to the 1st rotational member 1 in the second planetary gear train G2 through a clutch K1.

The transmissions of type 1 are described hereinafter.

FIG. 1 shows a skeleton of a planetary gear transmission according to a first embodiment of the present invention. The planetary gear transmission has first, second, and third planetary gear trains G1, G2, G3 which are coaxially arranged parallel to each other. The first, second, and third planetary gear trains G1, G2, G3 have respective first, second, and third sun gears S1, S2, S3 which are positioned centrally, respective first, second, and third planetary pinions P1, P2, P3 held in mesh with the first, second, and third sun gears S1, S2, S3, respectively, and rotatable therearound while rotating about their own axes, respective first, second, and third carriers C1, C2, C3 on which the respective first, second, and third planetary pinions P1, P2, P3 are rotatably supported and which are rotatable therewith around the first, second, and third sun gears S1, S2, S3, respectively, and respective first, second, and third ring gears R1, R2, R3 comprising internal gears meshing with the respective first, second, and third planetary pinions P1, P2, P3. The first planetary gear train G1 comprises a double-pinion planetary gear train. Specifically, the first pinion P1 comprises two pinion gears P11, P12. The second and third planetary gear trains G2, G3 comprise single-pinion planetary gear trains respectively.

The first sun gear S1 can be held against rotation by a first brake B1. The second sun gear S2 is directly coupled to the third sun gear S3, and is also disengageably connected to the first sun gear S1 through a first clutch K1. The first carrier C1 is securely connected to an input shaft 1, and is also disengageably connected to the second ring gear R2 through a second clutch K2. The second ring gear R2 can be held against rotation by a third brake B3. The first ring gear R1 is directly coupled to the second and third carriers C2, C3, and can be held against rotation by a second brake B2. The third ring gear R3 is securely coupled to an output gear 2.

In the planetary gear transmission of the above structure, gear positions can be established and gearshifts can be controlled by controlling engagement and disengagement of the first and second clutches K1, K2 and the first, second and third brakes B1, B2, B3. More specifically, five forward gear positions or ranges (LOW, 2ND, 3RD, 4TH, and 5TH) and one reverse gear position (REV) can be established by engaging and disengaging the first and second clutches K1, K2 and the first, second and third brakes B1, B2, B3 as shown in FIG. 2. Speed reduction ratios in the respective gear ranges vary depending on the number of teeth of each of the gears, but are shown by way of illustrative example in FIG. 2.

The table of FIG. 2 shows that each of the five forward gear positions or ranges (LOW~5TH) can be established by engaging two of the clutches and brakes (which will also be referred to as "engaging means"). Any gearshifts between adjacent gear positions can be achieved by disengaging one of the two engaging means and engaging the other engaging means, but not disengaging or engaging the two engaging means simultaneously. Therefore, the gearshifts can easily be controlled.

Figure 3:
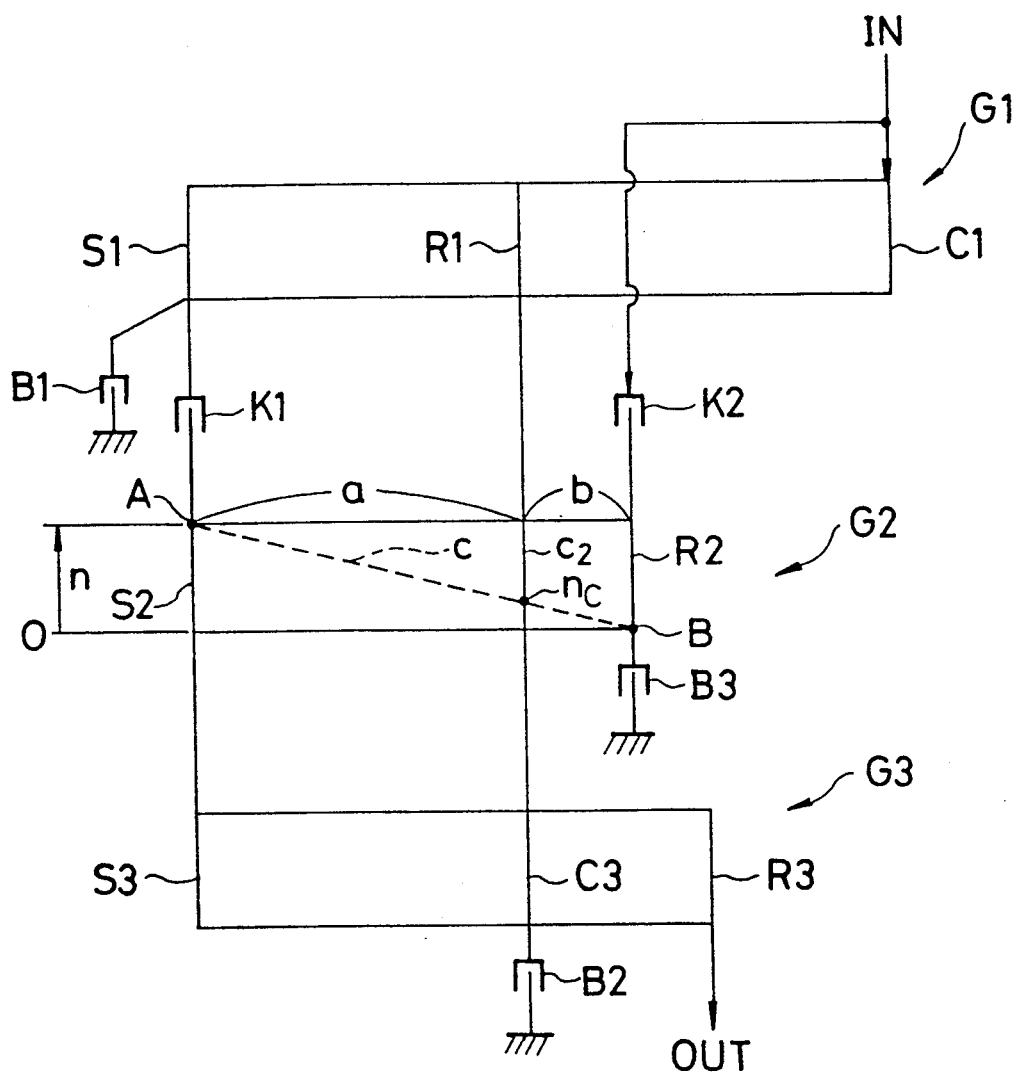
FIGS. 3, 5, 6 and 7A through 7D are diagrams showing rotational speeds of elements of the planetary gear transmission shown in FIG. 2.

The relationship between rotational speeds of the elements of the planetary gear transmission is shown in FIG. 3.

In FIG. 3, the first, second, and third planetary gear trains G1, G2, G3 are plotted separately from each other. In each of the plotted planetary gear trains G1, G2, G3, each vertical line represents one element of the planetary gear train, and the length thereof represents the rotational speed of the element. The distances between the vertical lines are proportional to the reciprocal of the number of teeth of the sun gears and the reciprocal of the number of teeth of the ring gears.

For example, the three vertical lines (FIG. 3) of the second planetary gear train G2 correspond, successively from the left to the right, to the second sun gear S2, the second carrier C2, and the second ring gear R2, respectively. The upward length of each of the vertical lines represents the rotational speed "n" in the forward direction. The distance "a" between the vertical line indicating the second sun gear S2 and the vertical line indicating the second carrier C2 corresponds to the reciprocal (1/Zs) of the number Zs of teeth of the second sun gear S2. The distance "b" between the vertical line indicating the second carrier C2 and the vertical line indicating the second ring gear R2 corresponds to the reciprocal (1/Zr) of the number Zr of teeth of the second ring gear R2. Therefore, when the second sun gear S2 is rotated at a speed "n", and the second ring gear R2 is held against rotation by the third brake B3, the rotational speed of the second carrier C2 is indicated by $n_c$ (FIG. 3) indicated by a point of intersection between the vertical line corresponding to the second carrier C2 and a line C which interconnects points A, B, the point A representing the rotation of the second sun gear S2 at the speed "n" and the point B representing the braked condition of the second ring gear R2.

The first and third planetary gear trains G1, G3 are defined basically in the same manner as described above. However, since the first planetary gear train G1 is a double-pinion planetary gear train, its ring gear rotates with respect to the sun gear in a direction opposite to the direction in which the ring gear of a single-pinion planetary gear train rotates. In FIG. 3, the vertical lines indicative of the sun gears S2, S3 and the ring gears R2, R3 of the second and third planetary gear trains G2, G3 which are single-pinion planetary gear trains are positioned one on each side of the vertical lines indicative of the carriers C2, C3 thereof. In the first planetary gear train G1 which is a double-pinion planetary gear train, the vertical lines indicative of the sun gear S1 and the ring gear R1 are positioned on one side of the vertical line indicative of the carrier C1. The definition of the distances between the vertical lines is the same as described above, i.e., the distances are proportional to the reciprocal of the number of teeth of the sun and ring gears.

Figures 4, 5:
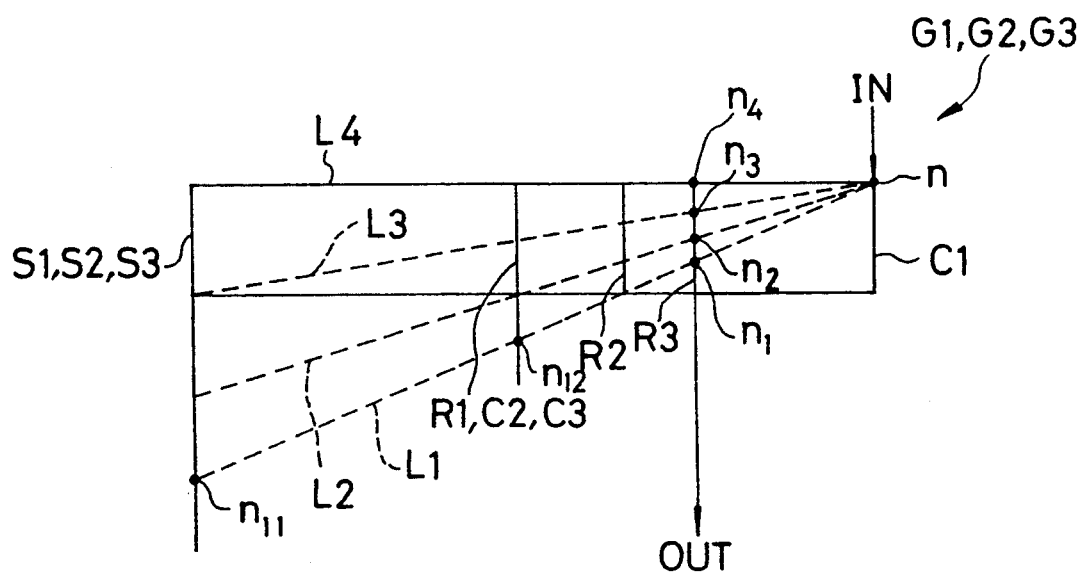
FIG. 4 is a table showing how elements are coupled into rotational members in the planetary gear transmission shown in FIG. 2.

FIG. 4 shows how the elements (the sun gears, the carriers, and the ring gears) shown in FIG. 3 are coupled into rotational members. The first, second and third sun gears S1, S2, S3 jointly serve as a first rotational member. The first ring gear R1, the second carrier C2 and the third carrier C3 can be coupled to each other and jointly serve as a second rotational member. The second ring gear R2 serves as a third rotational member, and the third ring gear R3 serves as a fourth rotational member. The first carrier C1 serves as a fifth rotational member. As can be understood from FIGS. 3 and 4, the third and fifth rotational members are directly or disengageably coupled to the input shaft 1, and the fourth rotational member is coupled to the output gear 2.

Furthermore, in all of subsequent embodiments, the third and fifth rotational members are directly or disengageably coupled to the input shaft 1, and the fourth rotational member is coupled to the output gear 2.

FIG. 4 also illustrates ratios $\lambda$ between the number Zs of teeth of the sun gears and the number Zr of teeth of ring gears ($\lambda = Zs/Zr$). The ratio indicates the sizes of the sun gear and the ring gear, and also the size of the planetary pinion between the sun and ring gears. In order for a planetary gear train to be physically established, the ratio $\lambda$ should be approximately in the range of from 0.3 to 0.6.

The ratio of the rotational speed of the output gear 2 to the rotational speed of the input shaft 1, i.e., a speed reduction ratio, in each of the gear ranges will be determined using a speed diagram.

In the LOW speed range (gear position), the first clutch K1 and the third brake B1 are engaged. Since the sun gears S2, S3 are mechanically coupled to each other and the carriers C2, C3 are mechanically coupled to each other, the second and third planetary gear trains G2, G3 are integrally coupled to each other as a unitary planetary gear train. Further, because of engagement of the first clutch K1, the first sun gear S1 and the first ring gear R1 are respectively coupled to the elements (the second and third sun gears S2, S3 and the second and third carriers C2, C3) of the second and third planetary gear trains G2, G3. Therefore, the three planetary gear trains G1, G2, G3 are integrally coupled to each other as a unitary planetary gear train, and may be plotted together as shown in FIG. 5.

If the input shaft 1 rotates at a speed n, then the first carrier C1 coupled to the input shaft 1 also rotates at the speed n. Since the second ring gear R2 is held against rotation by the first brake B1, the output gear 2 coupled to the third ring gear R3 rotates at a speed $n_1$ indicated by a point of intersection between the vertical line indicative of the third ring gear R3 and a dotted straight line L1. The line L1 interconnects two points which indicate, respectively, the rotation of the first carrier C1 and the braked condition of the first, second and third sun gears S1, S2, S3.

Other elements rotate at speeds indicated by points of intersections of the line L1. For example, as shown in FIG. 5, the first, second and third sun gears S1, S2, S3 rotate at a speed $n_{11}$. Also, the first ring gear R1 and the second and third carrier C2, C3 rotate at a speed $n_{12}$.

In the 2ND speed range (gear position), the first clutch K1 remains engaged, the third brake B3 is disengaged, and the second brake B2 is engaged. Since the first clutch K1 is engaged, the first to third planetary gear trains G1, G2, G3 are integrally coupled as a unitary planetary gear train as shown in FIG. 5. The first carrier C1 rotates at the same speed n as the rotational speed of the input shaft 1, and the first ring gear R1, the second carrier C2 and the third carrier C3 are held against rotation. At this time, the output gear 2 rotates at a speed $n_2$ indicated by a point of intersection between the vertical line indicative of the third ring gear R3 and a dotted straight line L2.

In the speed 3RD range (gear position), the third clutch K3 remains engaged, the second brake B2 is disengaged, and the first brake B1 is engaged. The first carrier C1 rotates at the same speed n as the rotational speed of the input shaft 1. The first, second and third sun gears S1, S2, S3 are held against rotation by the first brake B1. At this time, the output gear 2 rotates at a speed $n_3$ indicated by a point of intersection between the vertical line indicative of the third ring gear R3 and a dotted straight line L3.

In the 4TH speed range (gear position), the third clutch K3 remains engaged, and the first brake B1 is disengaged and the second clutch K2 is engaged. The first, second, and third planetary gear trains G1, G2, G3 rotate together with the input shaft 1. The first carrier C1 and the second ring gears C1, R2 rotate at the same speed n as the rotational speed of the input shaft 1. At this time, the output gear 2 rotates at a speed $n_4 (=n)$ indicated by a point of intersection between the vertical line indicative of the third ring gear R3 and a horizontal solid straight line L4.

Figure 6:
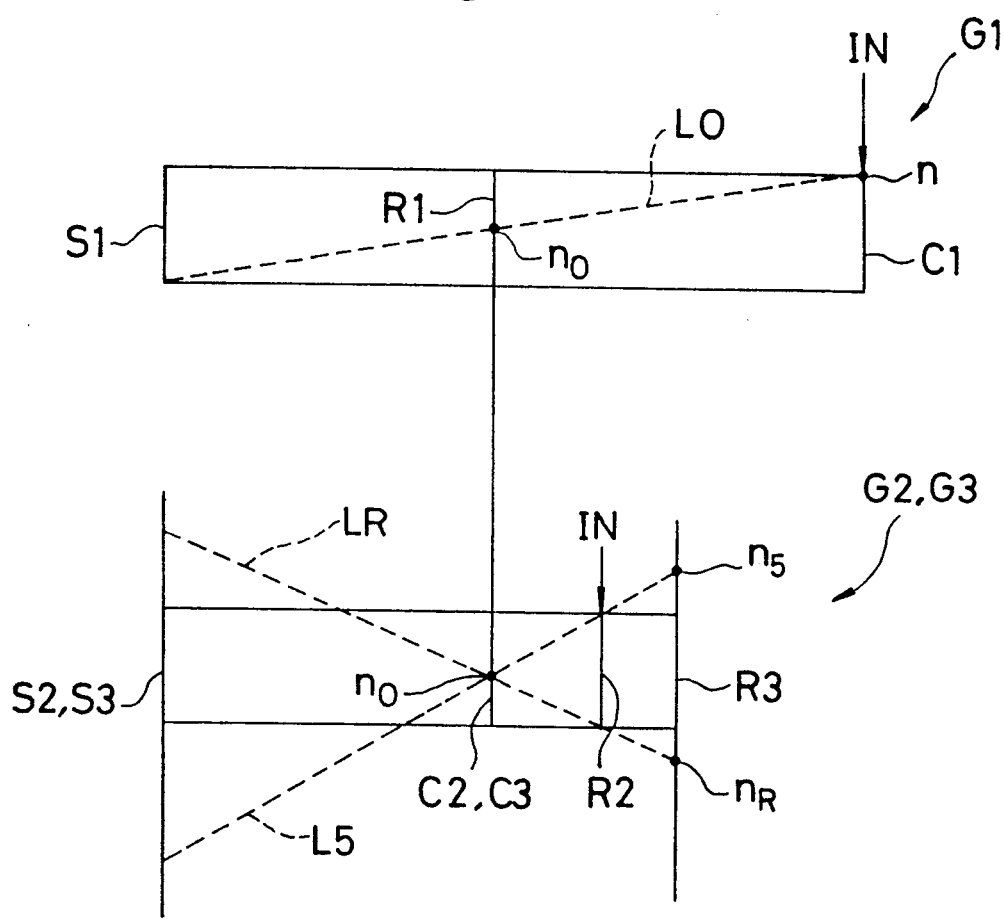

In the 5TH speed range (gear position), the second clutch K2 remains engaged, the first clutch K1 is disengaged, and the first brake B1 is engaged. Since only the first ring gear R1 of the first planetary gear train G1 is coupled to the elements of the second and third planetary gear trains G2, G3 (i.e. the second and third carriers C2, C3), the first planetary gear train G1 is separated from the second and third gear trains G2, G3 in the speed diagram as shown in FIG. 6. In the first planetary gear train G1, the first carrier C1 rotates at the same speed n as the rotational speed of the input shaft 1, and the first sun gear is fixed by the first brake B1. Therefore, the first ring gear R1 rotate at a speed $n_0$ indicated by a point of intersection between the vertical line indicative of the first ring gear R1 and the dotted line $L_0$. Since the first ring gear R1 is coupled to the second and third carriers C2, C3, the second and third carriers C2, C3 rotate the speed $n_0$. In the second and third planetary gear train, since the second clutch K2 is engaged, the second ring gear R2 rotate at the same speed n as the rotational speed of the input shaft 1.

At this time, the output gear 2 rotates at a speed $n_5$ indicated by a point of intersection between the vertical line indicative of the third ring gear R3 and a dotted straight line L5.

In the REV speed range (gear position), the first and third brake B1, B3 are engaged. Since the first clutch K1 is disengaged, the first planetary gear train G1 is separated from the second and third planetary gear trains G2, G3 in the speed diagram as shown in FIG. 6. The first ring gear R1 of the first planetary gear train G1 rotate at the speed $n_0$. In the second and third planetary gear trains G2, G3, the second and third carriers C2, C3 rotate at the speed $n_0$, and the second ring gear R2 is fixed by the third brake B3.

At this time, the output gear 2 rotates at a speed nR indicated by a point of intersection between the vertical line indicative of the third ring gear R3 and a dotted straight line LR.

Figure 7:
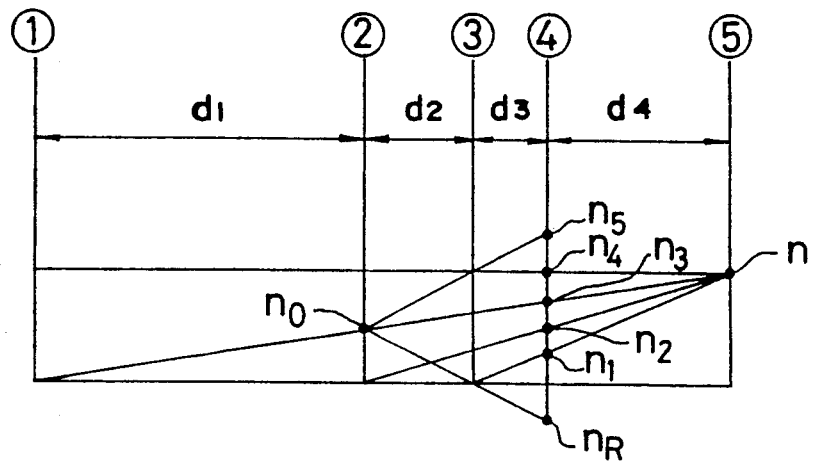
Figure 7:
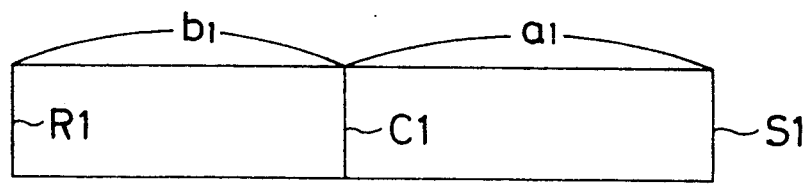
Figure 7:
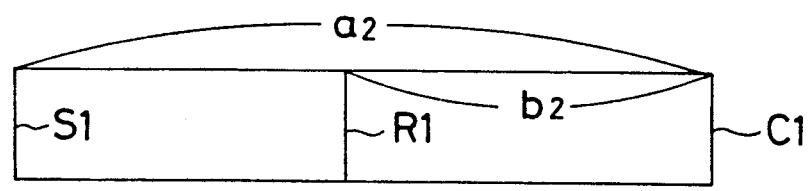
Figure 7:
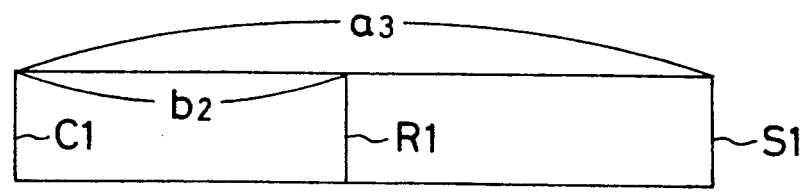

The rotational speeds of the output gear 2 with respect to the rotational speed n of the input shaft 1 in the respective gear positions or ranges can be determined in the manner described above. The rotational speeds thus determined are shown altogether in FIG. 7A. In FIG. 7A, five vertical lines $\sim$ represent the first through fifth rotational members, respectively, and the distances $d_1 \sim d_4$ between the vertical lines are uniquely determined once the speed reduction ratios in the gear positions or ranges are given. For example, if the speed reduction ratios are given as shown in FIG. 2, the distances $d_1 \sim d_4$ between the vertical lines are indicated as follows:

$$d_1:d_2:d_3:d_4 = 455:111:149:286.$$

The first planetary gear train G1 is composed of the first rotational member , the second rotational member , and the fifth rotational member . If the first planetary gear train G1 comprised a single-pinion planetary gear train, then the first rotational member . Would be a ring gear, the second rotational member would be a carrier, and the fifth rotational member would be a sun gear, as shown in FIG. 7B. The distances $a_1$, $b_1$ between the vertical lines, corresponding to the reciprocals of the numbers of teeth of the sun and ring gears, would be given by:

$$a_1:b_1 = 455:545$$

from the distances $d_1 \sim d_4$ between the vertical lines shown in FIG. 7A. At this time, the ratio $\lambda$ between the numbers of teeth of the sun and ring gears would be $\lambda = 0.833$. Since this value of the ratio is not in comformity with the condition in which the planetary gear train can be physically established, i.e., the numerical range of $0.3 < \lambda < 0.6$, it is not possible to employ a single-pinion planetary gear train as the first planetary gear train G1 in this embodiment.

Now, it is assumed that the first planetary gear train G1 comprises a double-pinion planetary gear train as with the illustrated embodiment. In this case, the first rotational member would be a sun gear, the second rotational member would be a ring gear, and the fifth rotational member would be a carrier, as shown in FIG. 7C. The distances $a_2$, $b_2$ between the vertical lines, corresponding to the reciprocals of the numbers of teeth of the sun and ring gears, are given by:

$$a_2:b_2 = 1000:545$$

from the distances $d_1 \sim d_4$ between the vertical lines shown in FIG. 7A. At this time, the ratio $\lambda$ between the numbers of teeth of the sun and ring gears is $\lambda = 0.545$. This value of the ratio is in conformity with the condition in which the planetary gear train can be physically established, i.e., the numerical range of $0.3 - \lambda < 0.6$. Therefore, the first planetary gear train G1 must be a double-pinion planetary gear train.

The first planetary gear train G1 may be a double-pinion planetary gear train with the first rotational member as a carrier, the second rotational member as a ring gear, and the fifth rotational member as a sun gear, as shown in FIG. 7D. The distances $a_3$, $b_3$ between the vertical lines, corresponding to the reciprocals of the numbers of teeth of the sun and ring gears, are given by:

$$a_3:b_3 = 1000:455$$

from the distances $d_1 \sim d_4$ between the vertical lines shown in FIG. 6A. At this time, the ratio $\lambda$ between the numbers of teeth of the sun and ring gears is $\lambda = 0.455$. This value of the ratio is also in conformity with the condition in which the planetary gear train can be physically established, i.e., the numerical range of $0.3 < \lambda < 0.6$.

Other embodiment according to the transmissions of type 1 will be described hereinafter.

Figures 8, 9:
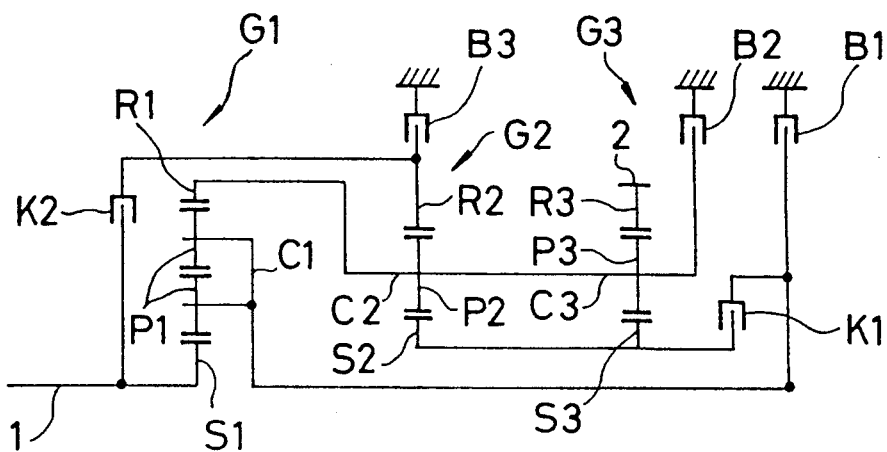
FIGS. 8 and 10 are diagrams showing skeltons of a planetary gear transmission.
FIGS. 9 and 13 are tables showing rotational members.

FIG. 8 shows a skeleton of a planetary gear transmission according to a second embodiment of the present invention. In the second embodiment and other subsequent embodiments, only an upper half of the skeleton of the planetary gear transmission, above the central axis about which the elements are rotatable, is shown for the sake of brevity. The planetary gear transmission of the second embodiment differs from the transmission of the first embodiment shown in FIG. 1 only as to the first planetary gear train. Specifically, the first sun gear S1 is securely coupled to the input shaft 1, and the first carrier C1 can be held against rotation by the first brake B1. The other details are identical to the first embodiment.

Accordingly, the first carrier C1, the second sun gear S2 and the third sun gear S3 serves as the first rotational member as shown in FIG. 9. Also, the first sun gear S1 serves as the fifth rotational member. Accordingly, the first planetary gear train G1 of the second embodiment has a structure as shown in FIG. 7D. By the way the first planetary gear train G1 of the first embodiment has a structure as shown in FIG. 7C.

Figures 10, 11:
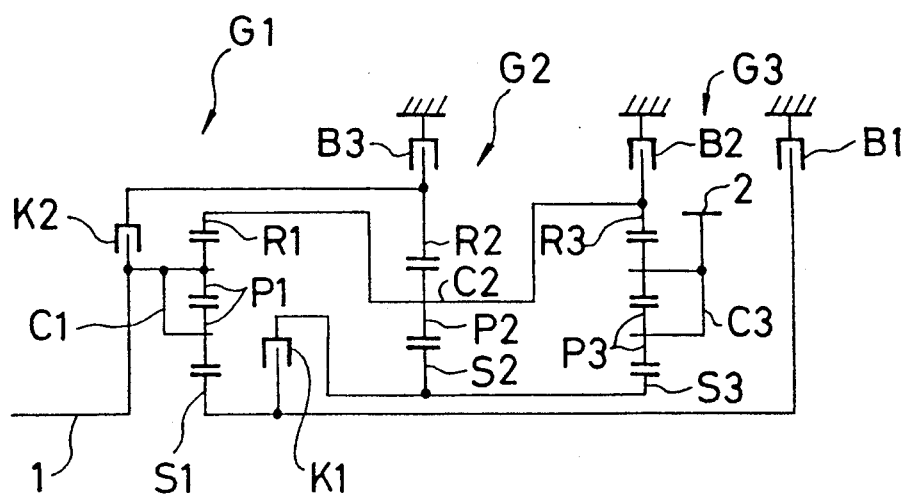
FIG. 11 is a table showing the relationship between gear ranges.

FIG. 10 shows a skeleton of a planetary gear transmission according to a third embodiment of the present invention. As shown in FIG. 10, the planetary gear transmission has first, second, and third planetary gear trains G1, G2, G3 which are coaxially arranged parallel to each other. The first and third planetary gear trains G1, G3 comprise double-pinion planetary gear trains, respectively, and the second planetary gear train G2 comprises a single-pinion planetary gear train.

In this transmission, the first sun gear S1 of the first planetary gear train G1 can be fixed by the first brake B1, and the first carrier C1 is securely coupled to the input shaft 1. The first gear train G1 has a structure of FIG. 7C. The first ring gear R1 is coupled to the second carrier C2 and the third ring gear R3. These first ring gear R1, second carrier C2 and third ring gear R3 can be fixed by the second brake B2. The second sun gear S2 is securely coupled to the third sun gear S3, and is disengageably coupled to the first sun gear S1 by the first clutch K1. The second ring gear R2 can be fixed by the third brake B3, and is coupled to the input shaft 1 through the second clutch K2.

In the planetary gear transmission as described above, five forward and one reverse gear positions or ranges can be established by controlling engagement and disengagement of the first and second clutches K1, K2 and the first, second and third brakes B1, B2, B3 as shown in FIG. 11.

Figures 12, 13:
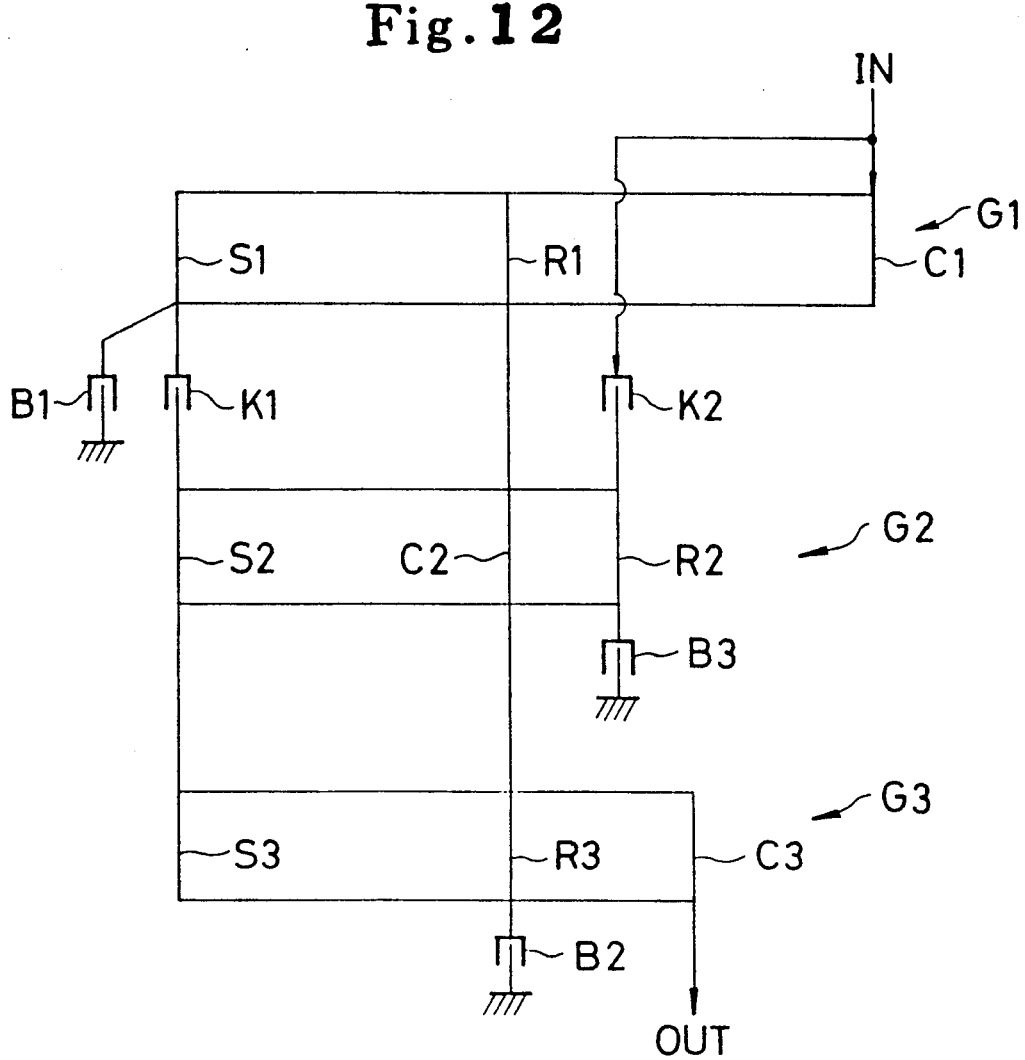
FIG. 12 is a diagram showing rotational speeds of elements.

The relationship between rotational speeds of the elements of the above planetary gear transmission is shown in FIG. 12. FIG. 13 shows how the elements are coupled into rotational members in the planetary gear transmission. In this embodiment, the first to third sun gears S1, S2, S3 jointly serve as a first rotational member, and the first ring gear R1, the second carrier C2, and the third ring gear R3 are coupled to each other and jointly serve as a second rotational member. The second ring gear R2 singly serves as a third rotational member, and the third carrier C3 singly serves as a fourth rotational member. The first carrier C1 singly serves as a fifth rotational member. The third and fifth rotational members are coupled to the input shaft 1, and the fourth rotational member is coupled to the output gear 2.

As described above with reference to FIGS. 7A through 7D, the first planetary gear train G1 comprises a double-pinion planetary gear train because it satisfies the condition required for planetary gear trains to be physically established.

In the third embodiment, the speed reduction ratios in the respective gear positions or ranges may also be determined using a speed diagram in the same manner as described above with reference to the first embodiment.

Figures 14, 15:
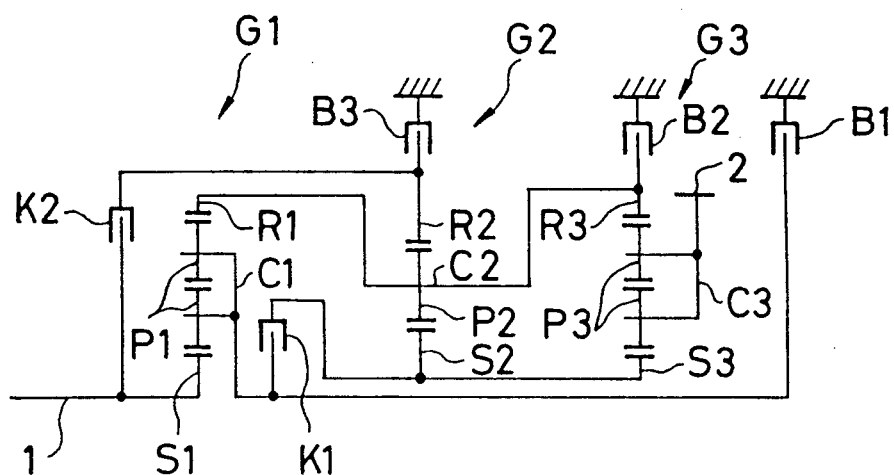
FIGS. 14-173 are diagrams showing skeletons of planetary gear transmissions of the present invention; and tables showing how elements are coupled into rotational members in the planetary gear transmissions.

FIG. 14 shows a skelton of a planetary gear transmission according to a fourth embodiment of the present invention. The planetary gear transmission of the second embodiment differs from the transmission of the third embodiment shown in FIG. 10 only as to the first planetary gear train. Specifically, the first sun gear S1 is securely coupled to the input shaft 1, and the first carrier C1 can be held against rotation by the first brake B1. The other details are identical to the first embodiment.

Accordingly, the first carrier C1, the second sun gear S2 and the third sun gear S3 serves as the first rotational member as shown in FIG. 15. Also, the first sun gear S1 serves as the fifth rotational member. Accordingly, the first planetary gear train G1 of the fourth embodiment has a structure as shown in FIG. 7D.

Figures 16, 17:
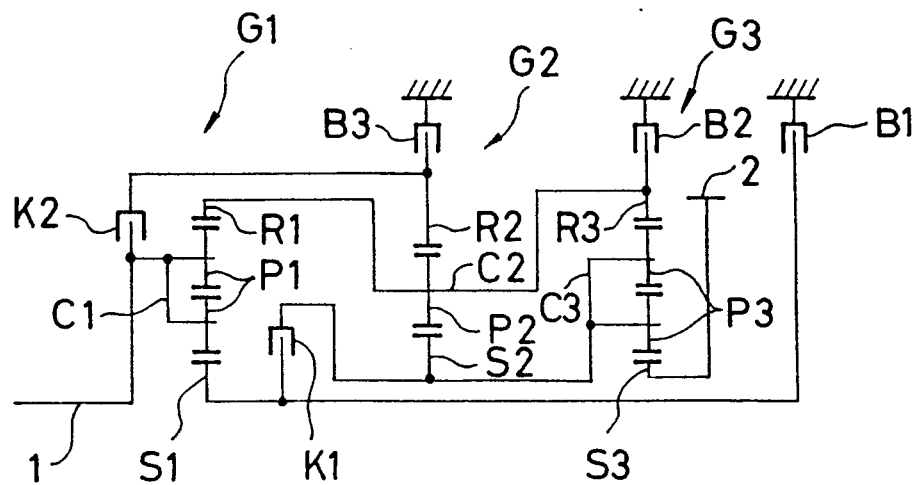

FIG. 16 shows a skeleton of a planetary gear transmission according to an fifth embodiment of the present invention. As shown in FIG. 16, the planetary gear transmission has first, second, and third planetary gear trains G1, G2, G3, wherein the first and third gear trains G1, G3 comprise double-pinion planetary gear trains, and the second gear train G2 comprises a single-pinion planetary gear train.

The first sun gear S1 can be fixed by the first brake B1, and the first carrier C1 is securely connected to an input shaft 1 for rotation therewith at all times, with the first planetary gear train G1 being of a structure as shown in FIG. 7D. The elements of the planetary gear trains are coupled as shown in FIG. 16.

Since the ways of connecting each elements are clearly shown in figures (shelton figures), the minute description thereabout will not be provided hereinafter.

In the planetary gear transmission shown in FIG. 16, five forward and one reverse gear positions or ranges can be established by controlling engagement and disengagement of the first and second clutches K1, K2 and the first, second and third brakes B1, B2, B3 in the same manner as shown in FIG. 11. In all of subsequent embodiments, the relationship between the ranges, engagement of the clutches and the brakes, and the speed reduction ratios is the same as the relationship shown in FIG. 11.

FIG. 17 shows how the elements are coupled into first through fifth rotational members.

The first sun gear S1, the second sun gear S2 and the third carrier C3 jointly serve as the first rotational member. The ring gear R1, the carrier C2 and the ring gear R3 jointly serve as the second rotational member. The ring gear R2 serves as the third rotational member. The third sun gear S3 serves as the fourth rotational member. The first carrier C1 serves as the fifth rotational member.

Figures 18, 19:
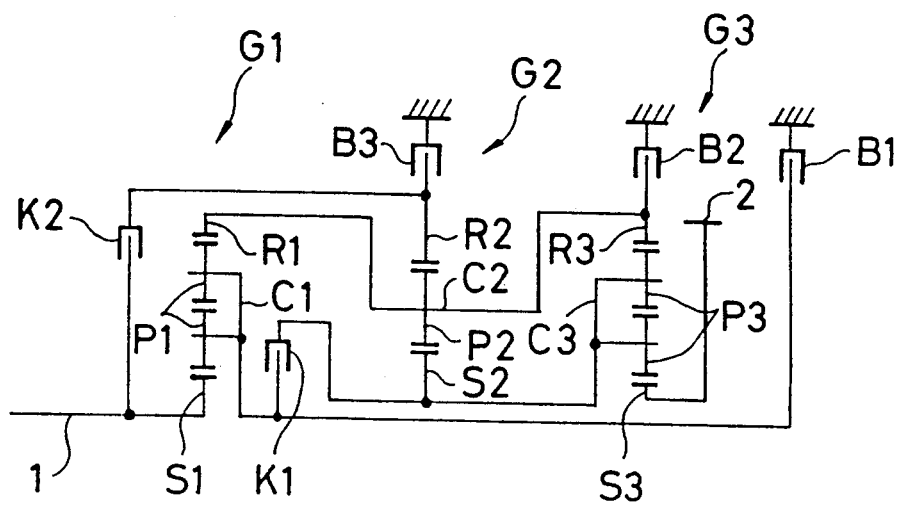

FIG. 18 shows a skeleton of a planetary gear transmission according to a 6th embodiment of the present invention. The transmission shown in FIG. 18 differs from the transmission shown in FIG. 16 only as to the first planetary gear train G1. Specifically, the first sun gear S1 is securely coupled to the input shaft 1, and the first carrier C1 is disengageably fixed to a stationary member by the first brake B1. The other details of the transmission shown in FIG. 18 are identical to those of the transmission shown in FIG. 16. FIG. 19 shows how the elements are coupled into first through fifth rotational members in the transmission shown in FIG. 18. The speed diagram of the first planetary gear train G1 corresponds to FIG. 7D.

TYPE 2

Figures 176, 177:
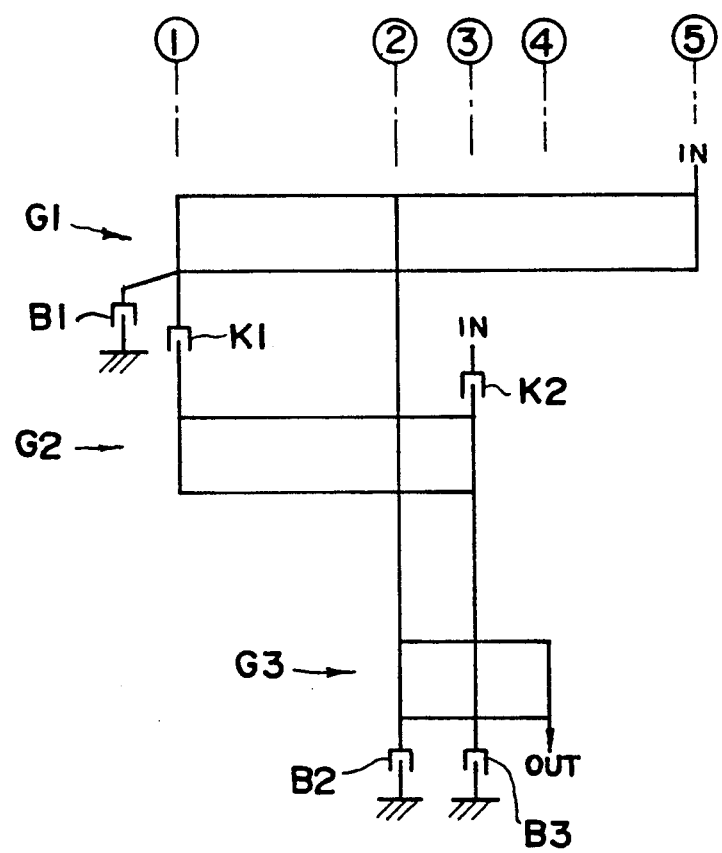

Transmissions of type 2 can be represented by the combination of elements to compose the 1st–5th rotational members shown in FIG. 176. The three elements of the first planetary gear train G1 are respectively coupled to the 1st, 2nd and 5th rotational members. The three elements of the second planetary gear train G2 are respectively coupled to the 1st, 2nd and 3rd rotational members. The three elements of the third planetary gear train G3 are respectively coupled to the 2nd, 3rd and 4th rotational members.

A diagram showing coupling relationship is shown in FIG. 177. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 3rd gear train G3 coupled to the 3rd rotational member are respectively connected to stationary members by the second brake B2 and the third brake B3. One of the elements of the 1st gear train G1 coupled to the 1st rotational member is disengageably connected to one of the elements of the 2nd gear train G2 coupled to the 1st rotational member by the first clutch K1.

Figures 20, 21:
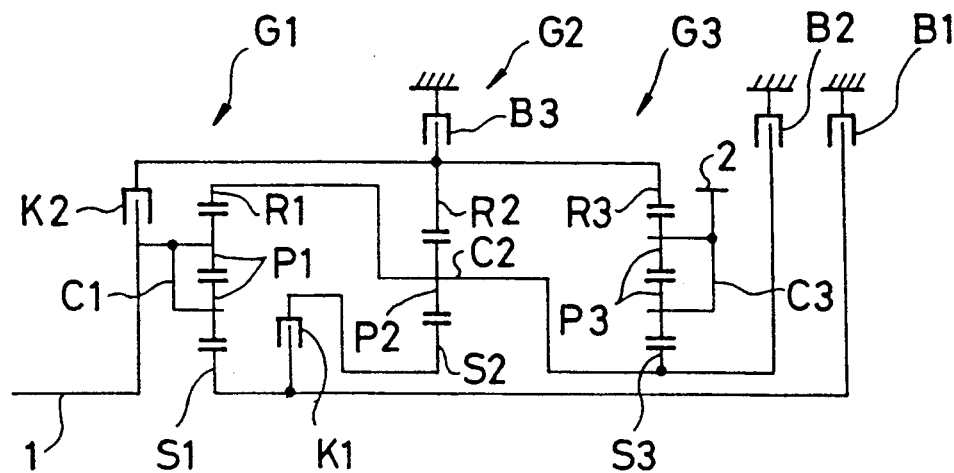

FIG. 20 shows a skelton of a planetary gear transmission according to a 7th embodiment. The transmission has first, second, and third planetary gear trains G1, G2, G3 which are coaxially arranged parallel to each other. The first and third planetary gear trains G1, G3 comprise double-pinion planetary gear trains, and the second planetary gear train G2 comprises a single-pinion planetary gear train.

The first sun gear S1 is disengageably coupled to a stationary member by the first brake B1, and the first carrier C1 is securely connected to an input shaft 1. FIG. 21 shows how the elements are coupled into first through fifth rotational members.

The sun gear S1 and the sun gear S2 jointly serve as the first rotational member. The ring gear R1, the carrier C2 and the sun gear S3 jointly serve as second rotational member. The ring gear R2 and the ring gear R3 jointly serve as third rotational member. The carrier C3 serves as fourth rotational member. The carrier C1 serves as fifth rotational member.

Figures 22, 23:
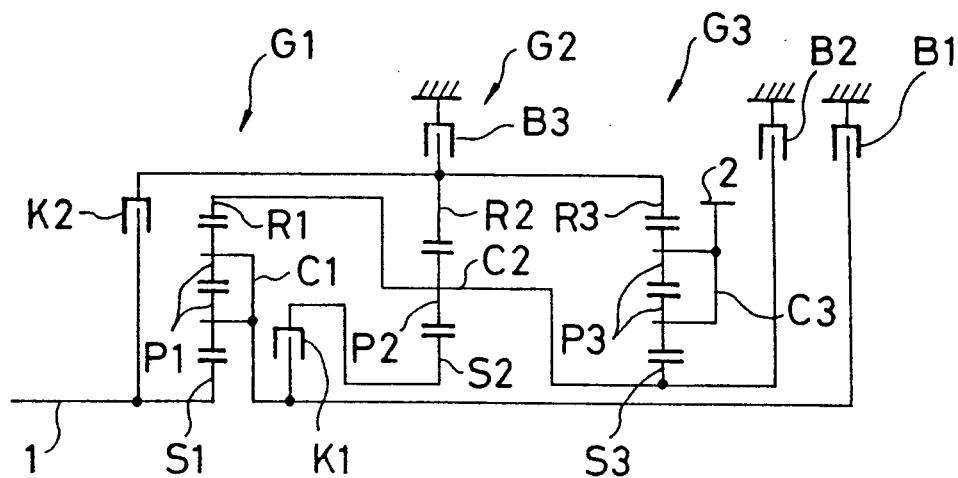

FIG. 22 shows a skelton of a planetary gear transmission according to a 8th embodiment. The transmission shown in FIG. 22 differs from the transmission shown in FIG. 20 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 22 are identical to those of the transmission shown in FIG. 20. FIG. 23 shows how the elements are coupled into first through fifth rotational members in the transmission shown in FIG. 22.

Figures 24, 25:
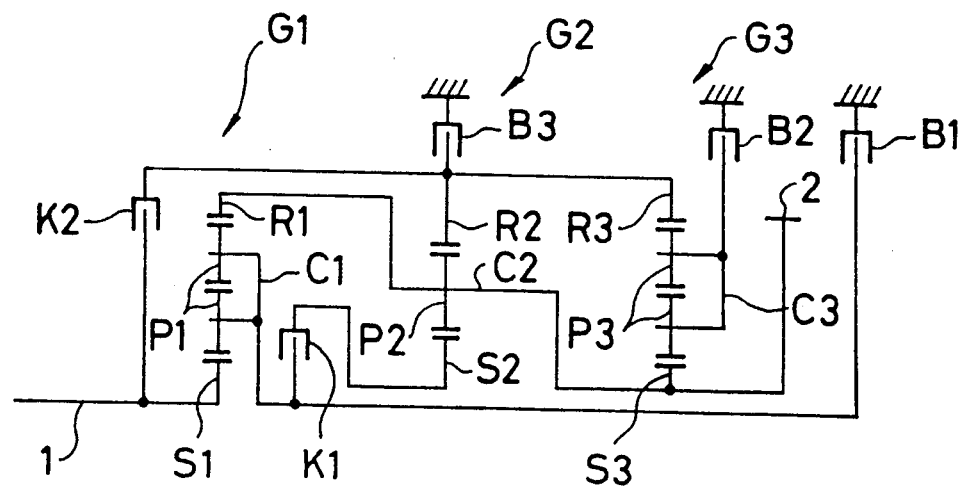

FIG. 24 shows a skelton of a planetary gear transmission according to a 9th embodiment. The transmission has first, second, and third planetary gear trains G1, G2, G3 which are coaxially arranged parallel to each other. The first and third planetary gear trains G1, G3 comprise double-pinion planetary gear trains, and the second planetary gear train G2 comprises a single-pinion planetary gear train.

The first carrier C1 is disengageably coupled to a stationary member by the first brake B1, and the first sun gear S1 is securely connected to an input shaft 1. FIG. 25 shows how the elements are coupled into first through fifth rotational members.

The sun gear S1 and the sun gear S2 jointly serve as the first rotational member. The ring gear R1, the carrier C2 and the carrier C3 jointly serve as second rotational member. The ring gear R2 and the ring gear R3 jointly serve as third rotational member. The sun gear S3 serves as fourth rotational member. The carrier C1 serves as fifth rotational member.

Figures 26, 27:
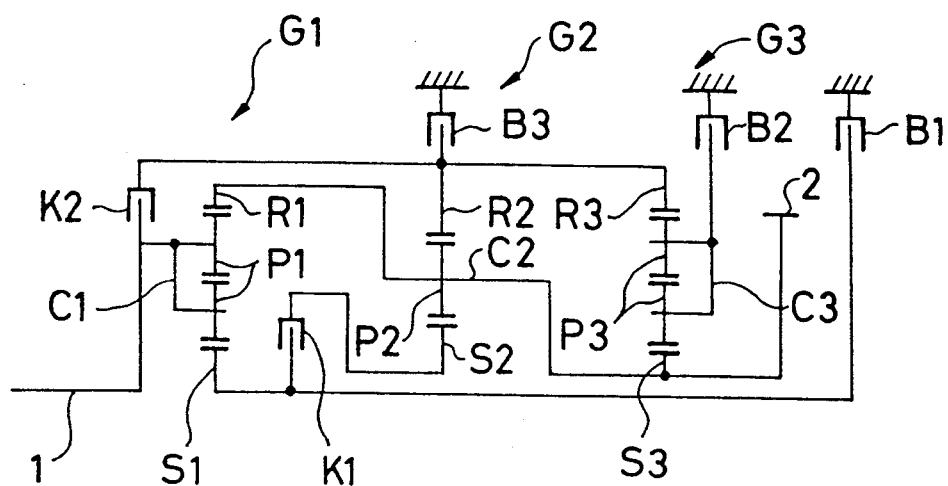

FIG. 26 shows a skelton of a planetary gear transmission according to a 10th embodiment. The transmission shown in FIG. 26 differs from the transmission shown in FIG. 24 only as to the first planetary gear train G1. Specifically, the first carrier C1 is securely coupled to the input shaft 1, and the first sun gear S1 is disengageably coupled to a stationary member by the first brake B1. The other details of the transmission shown in FIG. 26 are identical to those of the transmission shown in FIG. 24. FIG. 27 shows how the elements are coupled into first through fifth rotational members in the transmission shown in FIG. 26.

TYPE 3

Figures 178, 179:
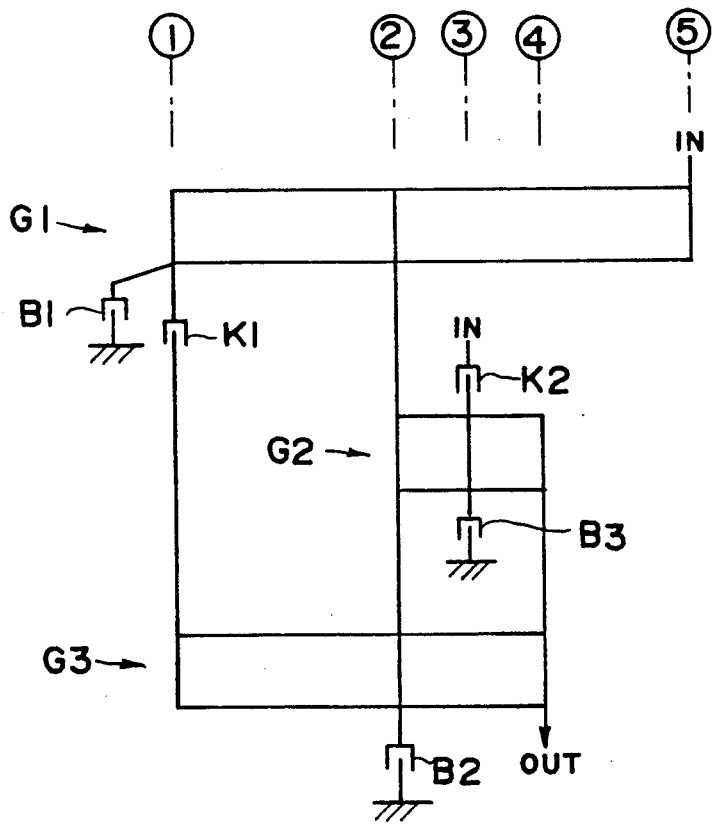

Transmissions of type 3 can be represented by the combination of elements to compose the 1st–5th rotational members shown in FIG. 178. The three elements of the first planetary gear train G2 are respectively coupled to 1st, 2nd and 5th rotational members. The three elements of the second planetary gear train G2 are respectively coupled to the 2nd, 3rd and 4th rotational members. The three elements of the third planetary gear train G3 are respectively coupled to the 1st, 2nd and 4th rotational members.

A diagram showing coupling relationship is shown in FIG. 179. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 2nd gear train G2 coupled to the 3rd rotational member are respectively connected to stationary members by the second brake B2 and the third brake B3. One of the elements of the 1st gear train G1 coupled to the 1st rotational member is disengageably connected to one of the elements of the 3rd gear train G3 coupled to the 1st rotational member by the first clutch K1.

Figures 28, 29:
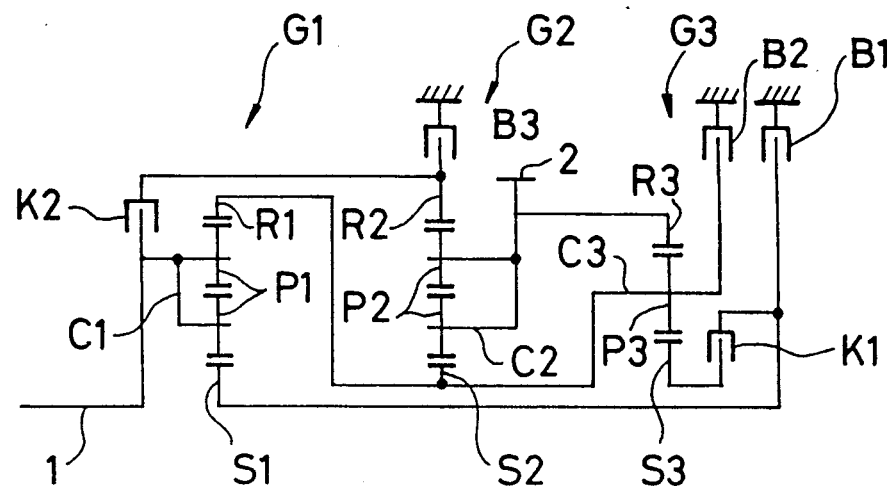

FIG. 28 shows a skelton of a planetary gear transmission according to a 11th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 29 shows how the elements are coupled into first through fifth rotational members.

The sun gear S1 and the sun gear S3 jointly serve as the first rotational member. The ring gear R1, the sun gear S2 and the carrier C3 jointly serve as second rotational member. The ring gear R2 serves as third rotational member. The carrier C2 and the ring gear R3 jointly serve as fourth rotational member. The carrier C1 serves as fifth rotational member.

Figures 30, 31:
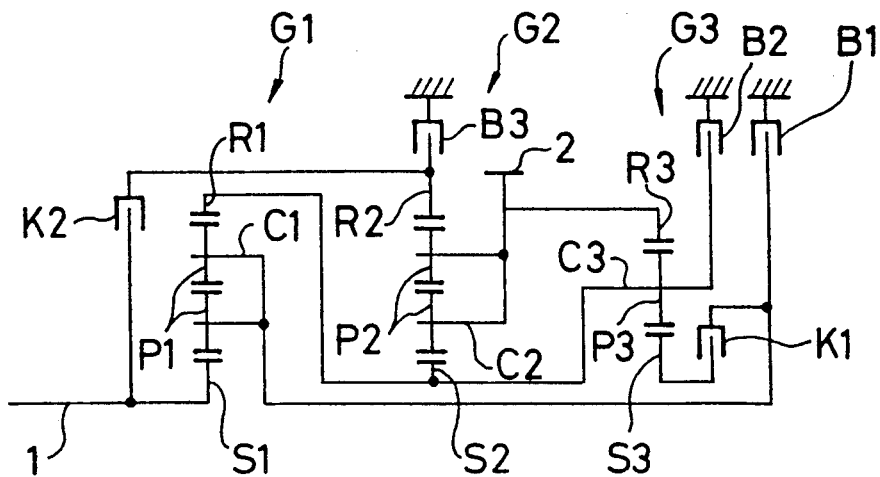

FIG. 30 shows a skelton of a planetary gear transmission according to a 12th embodiment. The transmission shown in FIG. 30 differs from the transmission shown in FIG. 28 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 30 are identical to those of the transmission shown in FIG. 28. FIG. 31 shows how the elements are coupled into first through fifth rotational members in the transmission shown in FIG. 30.

Figures 32, 33:
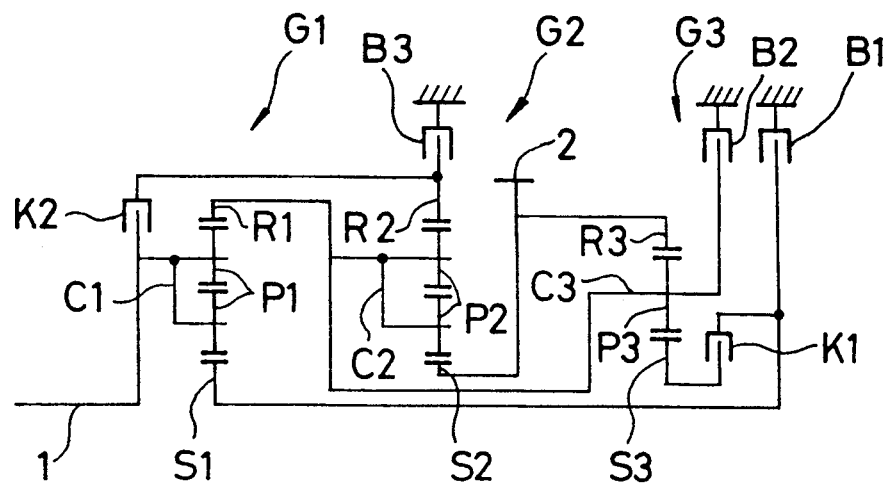

FIG. 32 shows a skelton of a planetary gear transmission according to a 13th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 33 shows how the elements are coupled into first through fifth rotational members.

The sun gear S1 and the sun gear S3 jointly serve as the first rotational member. The ring gear R1, the carrier C2 and the carrier C3 jointly serve as second rotational member. The ring gear R2 serves as third rotational member. The sun gear S2 and the ring gear R3 jointly serve as fourth rotational member. The carrier C1 serves as fifth rotational member.

Figures 34, 35:
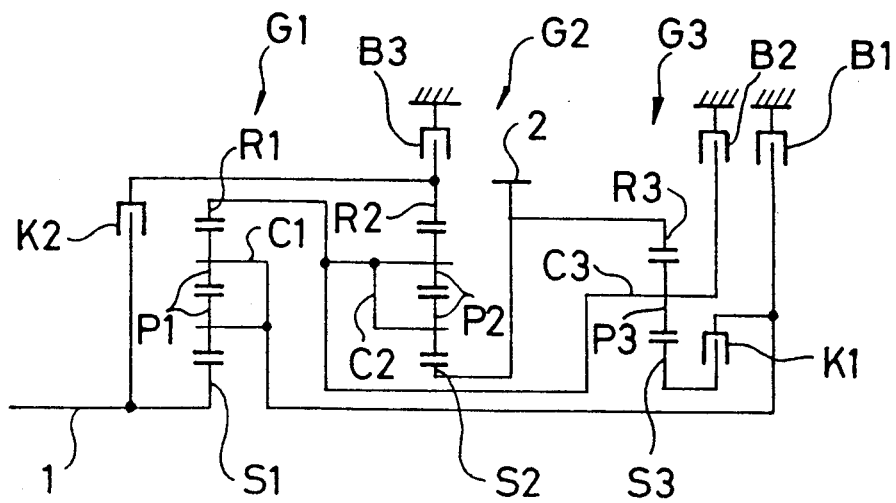

FIG. 34 shows a skelton of a planetary gear transmission according to a 14th embodiment. The transmission shown in FIG. 34 differs from the transmission shown in FIG. 32 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 34 are identical to those of the transmission shown in FIG. 32. FIG. 35 shows how the elements are coupled into first through fifth rotational members in the transmission shown in FIG. 34.

Figures 36, 37:
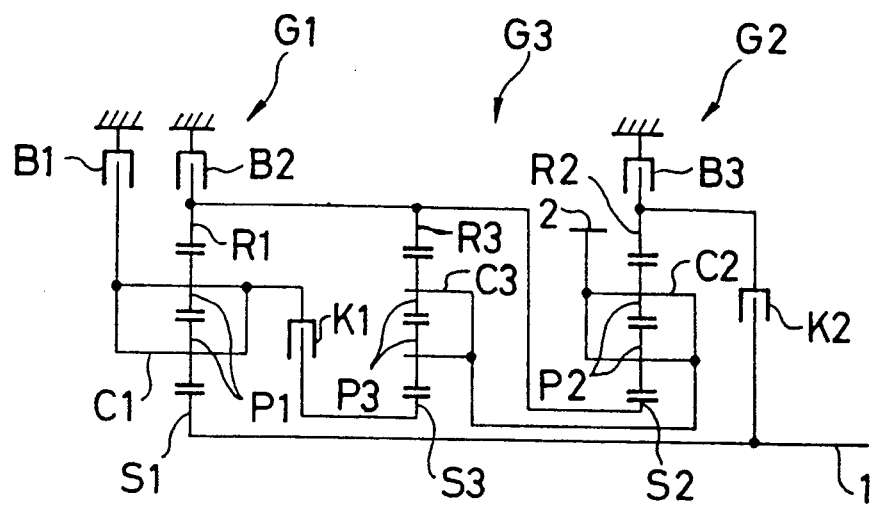

FIG. 36 shows a skelton of a planetary gear transmission according to a 15th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first carrier C1 is disengageably coupled to a stationary member by the first brake B1, and the first sun gear S1 is securely connected to an input shaft 1. FIG. 37 shows how the elements are coupled into first through fifth rotational members.

The carrier C1 and the sun gear S3 jointly serve as first rotational member. The ring gear R1, the sun gear S2 and the ring gear R3 jointly serve as second rotational member. The ring gear R2 serves as third rotational member. The carrier C2 and the carrier C3 jointly serve as fourth rotational member. The sun gear S1 serves as fifth rotational member.

Figures 38, 39:
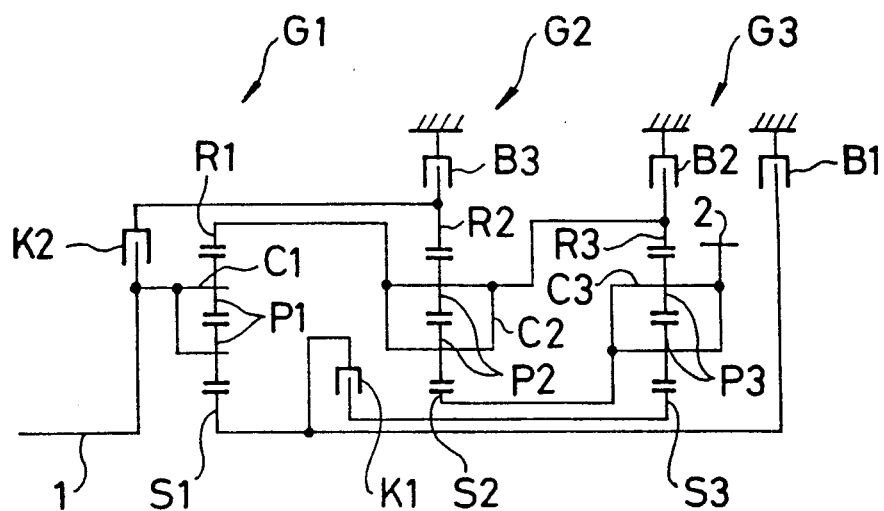

FIG. 38 shows a skelton of a planetary gear transmission according to a 16th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 39 shows how the elements are coupled into first through fifth rotational members.

The sun gear S1 and the sun gear S3 jointly serve as first rotational member. The ring gear R1, the carrier C2 and the ring gear R3 jointly serve as second rotational member. The ring gear R2 jointly serve as second rotational member. The ring gear R2 serves as third rotational member. The sun gear S2 and the carrier C3 jointly serve as fourth rotational member. The carrier C1 serves as fifth rotational member.

Figures 40, 41:
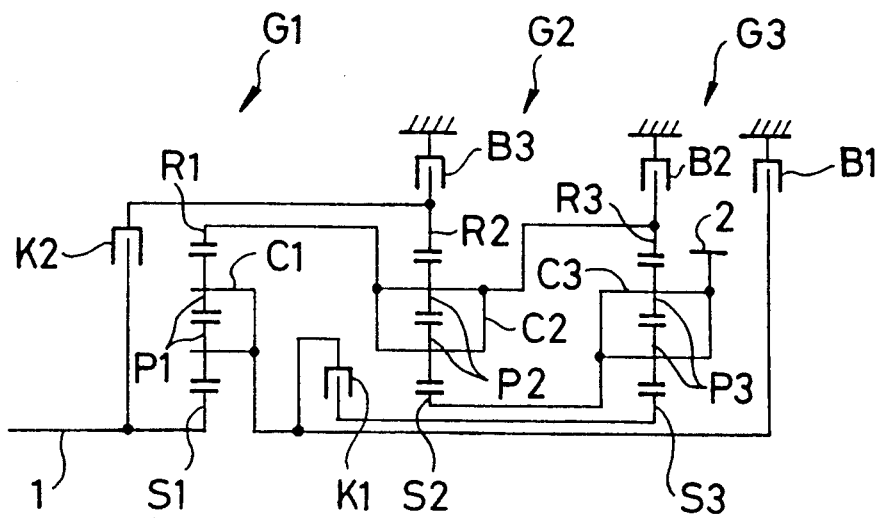

FIG. 40 shows a skelton of a planetary gear transmission according to a 17th embodiment. The transmission shown in FIG. 40 differs from the transmission shown in FIG. 38 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 40 are identical to those of the transmission shown in FIG. 38. FIG. 41 shows how the elements are coupled into first through fifth rotational members in the transmission shown in FIG. 40.

Figures 42, 43:
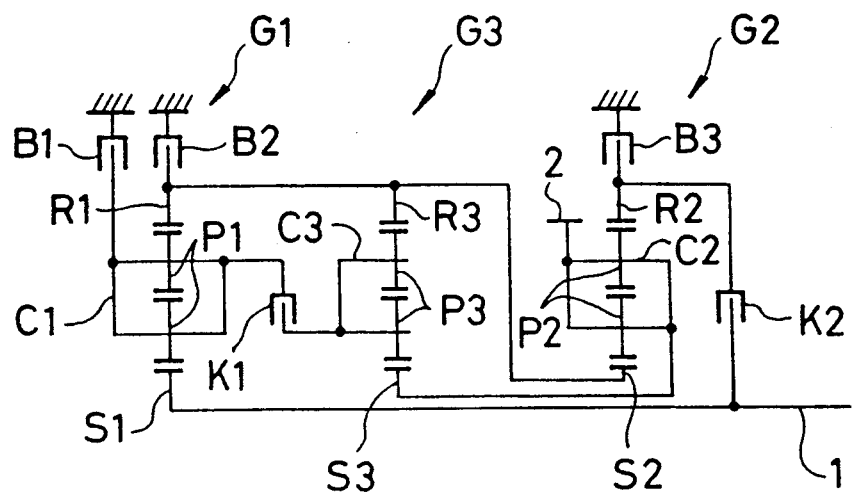

FIG. 42 shows a skelton of a planetary gear transmission according to a 18th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first carrier C1 is disengageably coupled to a stationary member by the first brake B1, and the first sun gear S1 is securely connected to an input shaft 1. FIG. 43 shows how the elements are coupled into first through fifth rotational members.

The carrier C1 and the carrier C3 jointly serve as first rotational member. The ring gear R1, the sun gear S2 and the ring gear R3 jointly serve as second rotational member. The ring gear R2 serves as third rotational member. The carrier C2 and the sun gear S3 jointly serve as fourth rotational member. The sun gear S1 serves as fifth rotational member.

Figures 44, 45:
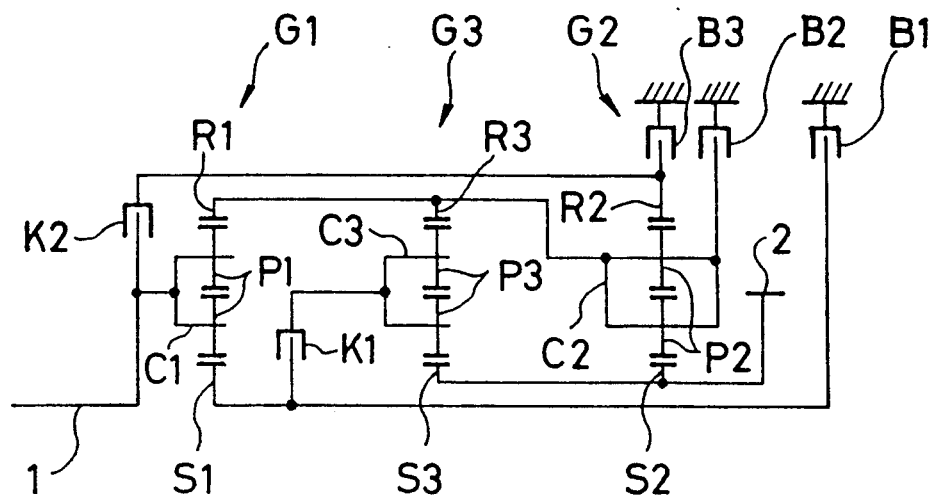

FIG. 44 shows a skelton of a planetary gear transmission according to a 19th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1.

FIG. 45 shows how the elements are coupled into first through fifth rotational members.

The sun gear S1 and the carrier C3 jointly serve as first rotational member. The ring gear R1, the carrier C2 and the ring gear R3 jointly serve as second rotational member. The ring gear R2 serves as third rotational member. The sun gear S2 and the sun gear S3 jointly serve as fourth rotational member. The carrier C1 serves as fifth rotational member.

Figures 46, 47:
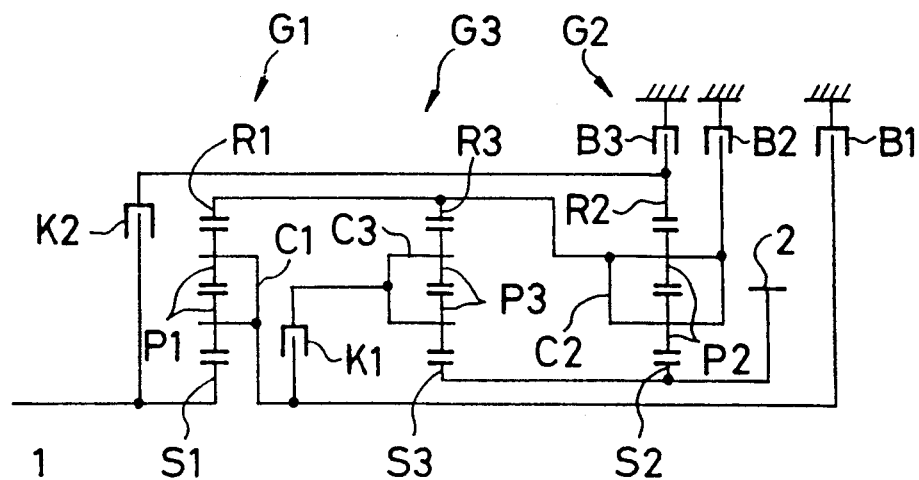

FIG. 46 shows a skelton of a planetary gear transmission according to a 20th embodiment. The transmission shown in FIG. 46 differs from the transmission shown in FIG. 44 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 46 are identical to those of the transmission shown in FIG. 44. FIG. 47 shows how the elements are coupled into first through fifth rotational members in the transmission shown in FIG. 46.

TYPE 4

Figures 180, 181:
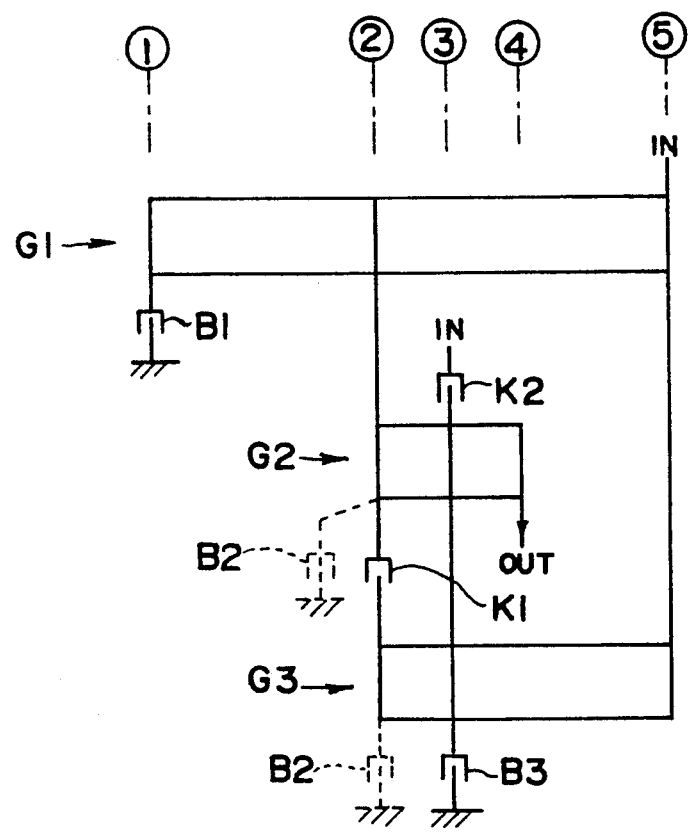

Transmissions of type 4 can be represented by the combination of elements to compose the 1st-5th rotational members shown in FIG. 180. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 2nd, 3rd and 5th rotational members.

A diagram showing coupling relationship is shown in FIG. 181. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 2nd gear train G2 or 3rd gear train G3 coupled to the 2nd rotational member and one of the elements of the 3rd gear train G3 coupled to the 3rd rotational member are respectively connected to stationary members by the second brake B2 and the third brake B3. One of the elements of the 2nd gear train G2 coupled to the 2nd rotational member is disengageably connected to one of the elements of the 3rd gear train G3 coupled to the 2nd rotational member by the first clutch K1.

Figures 48, 49:
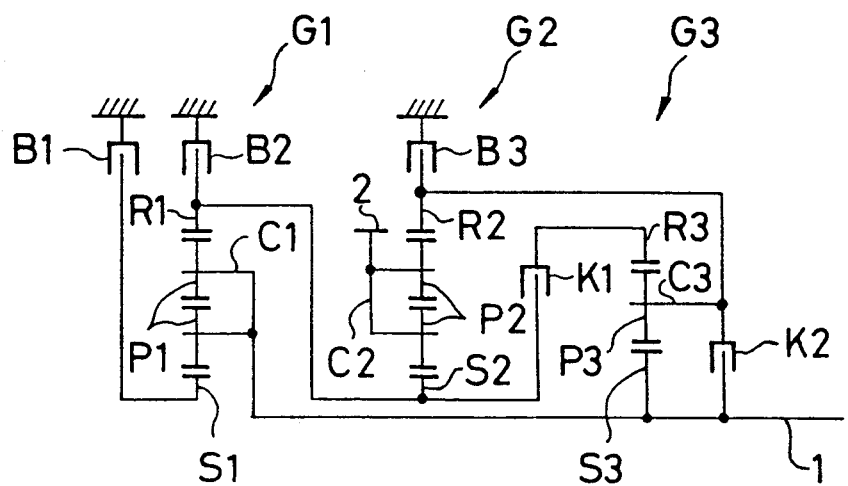

FIG. 48 shows a skelton of a planetary gear transmission according to a 21st embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 49 shows how the elements are coupled into first through fifth rotational members.

The sun gear S1 serves as the first rotational member. The ring gear R1, the sun gear S2 and the ring gear R3 jointly serve as second rotational member. The ring gear R2 and the carrier C3 jointly serve as third rotational member. The carrier C2 serves as fourth rotational member. The carrier C1 and the sun gear S3 jointly serve as fifth rotational member.

Figures 50, 51:
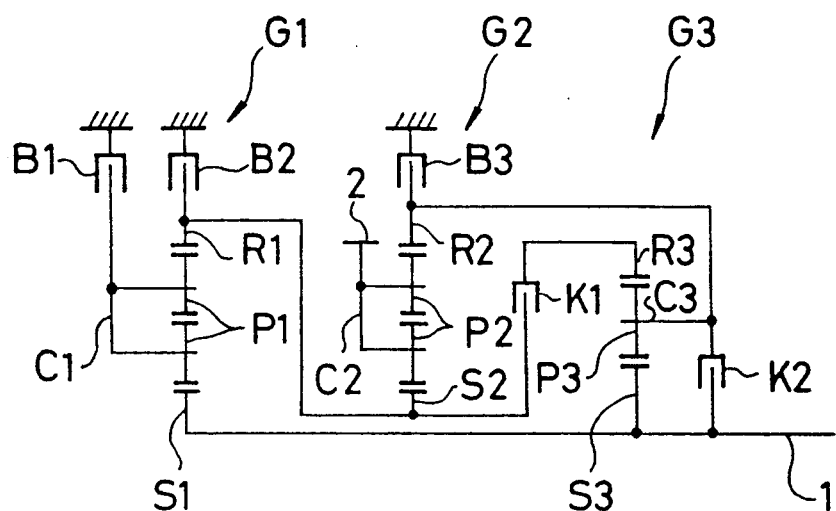

FIG. 50 shows a skelton of a planetary gear transmission according to a 22nd embodiment. The transmission shown in FIG. 50 differs from the transmission shown in FIG. 48 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 50 are identical to those of the transmission shown in FIG. 48. FIG. 51 shows how the elements are coupled into first through fifth rotational members in the transmission shown in FIG. 50.

Figures 52, 53:
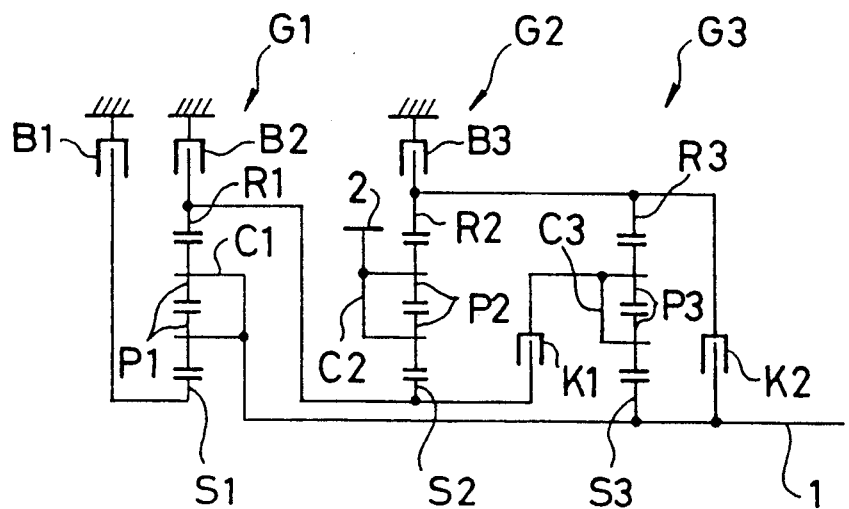

FIG. 52 shows a skelton of a planetary gear transmission according to a 23rd embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 53 shows how the elements are coupled into first through fifth rotational members.

The sun gear S1 serves as first rotational member. The ring gear R1, the sun gear S2 and the carrier C3 jointly serve as second rotational member. The ring gear R2 and the ring gear R3 jointly serve as third rotational member. The carrier C2 serves as fourth rotational member. The carrier C1 and the sun gear S3 serve as fifth rotational member.

Figures 54, 55:
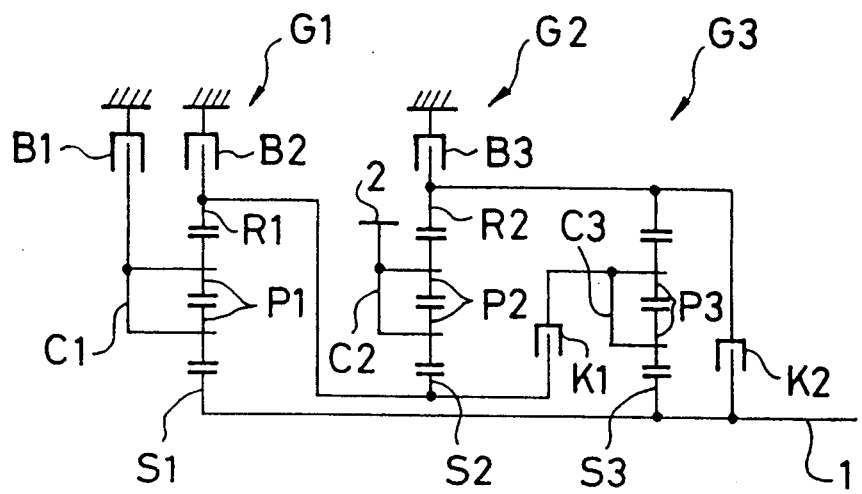

FIG. 54 shows a skelton of a planetary gear transmission according to a 24th embodiment. The transmission shown in FIG. 54 differs from the transmission shown in FIG. 52 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 54 are identical to those of the transmission shown in FIG. 52. FIG. 55 shows how the elements are coupled into first through fifth rotational members in the transmission shown in FIG. 54.

Figures 56, 57:
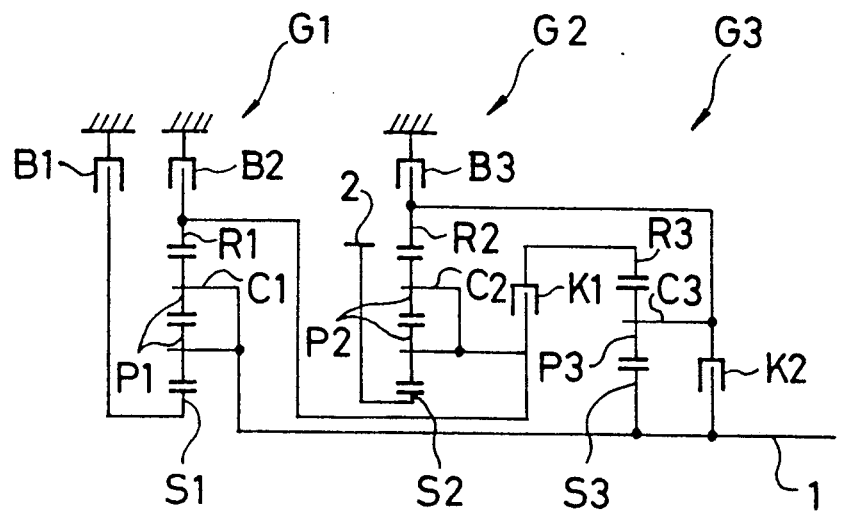

FIG. 56 shows a skelton of a planetary gear transmission according to a 25th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 57 shows how the elements are coupled into first through fifth rotational members.

The sun gear S1 serves as the first rotational member. The ring gear R1, the carrier C2 and the ring gear R3 jointly serve as second rotational member. The ring gear R2 and the carrier C3 jointly serve as third rotational member. The sun gear S2 serves as fourth rotational member. The carrier C1 and the sun gear S3 jointly serve as fifth rotational member.

Figures 58, 59:
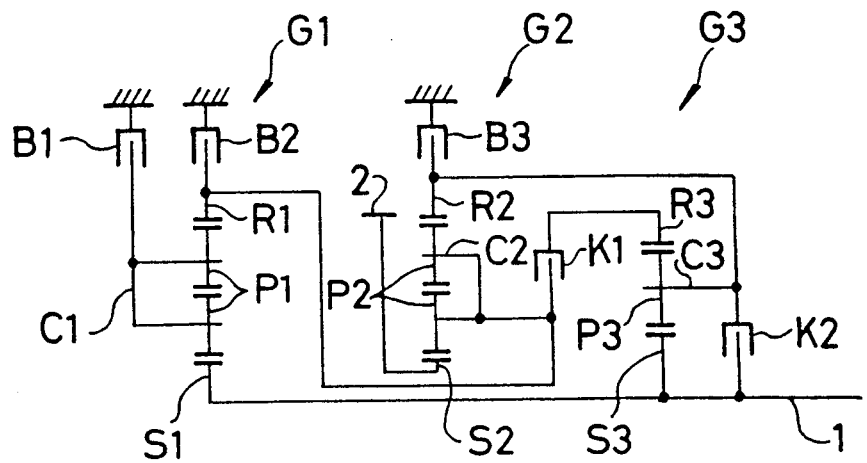

FIG. 58 shows a skelton of a planetary gear transmission according to a 26th embodiment. The transmission shown in FIG. 58 differs from the transmission shown in FIG. 56 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 58 are identical to those of the transmission shown in FIG. 56. FIG. 59 shows how the elements are coupled into first through fifth rotational members in the transmission shown in FIG. 58.

Figures 60, 61:
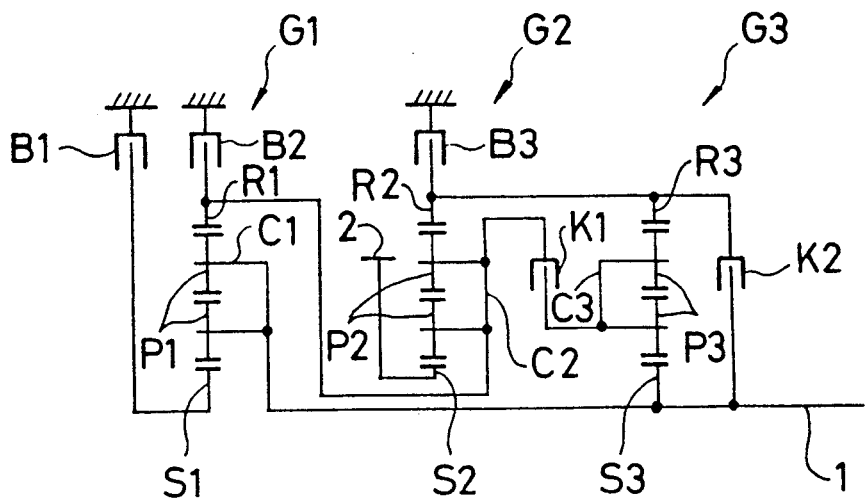

FIG. 60 shows a skelton of a planetary gear transmission according to a 27th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 61 shows how the elements are coupled into first through fifth rotational members.

The sun gear S1 serves as first rotational member. The ring gear R1, the carrier C2 and the carrier C3 jointly serve as second rotational member. The ring gear R2 and the ring gear R3 jointly serve as third rotational member. The sun gear S2 serves as fourth rotational member. The carrier C1 and the sun gear S3 serve as fifth rotational member.

Figures 62, 63:
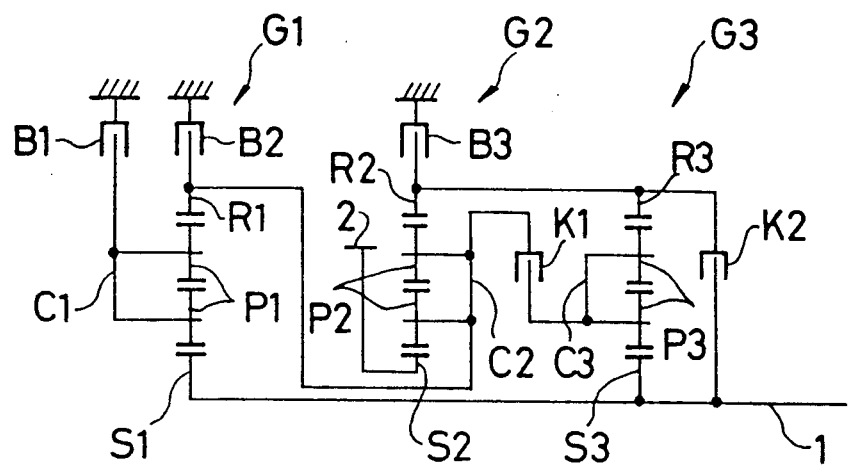

FIG. 62 shows a skelton of a planetary gear transmission according to a 28th embodiment. The transmission shown in FIG. 62 differs from the transmission shown in FIG. 60 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 62 are identical to those of the transmission shown in FIG. 60. FIG. 63 shows how the elements are coupled into first through fifth rotational members in the transmission shown in FIG. 62.

TYPE 5

Figures 182, 183:
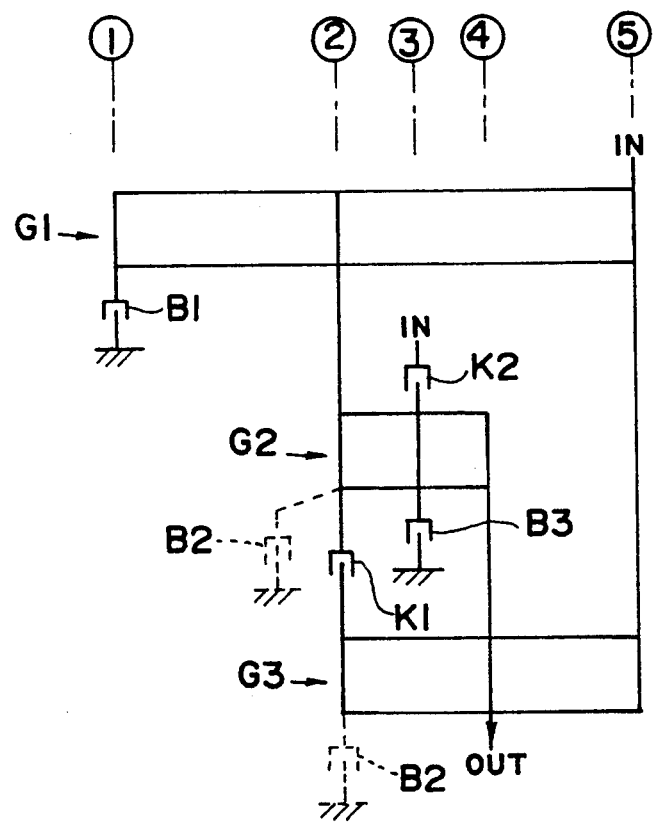

Transmissions of type 5 can be represented by the combination of elements to compose the 1st-5th rotational members shown in FIG. 182. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 2nd, 4th and 5th rotational members.

A diagram showing coupling relationship is shown in FIG. 183. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 2nd gear train G2 or 3rd gear train G3 coupled to the 2nd rotational member and one of the elements of the 2nd gear train G2 coupled to the 3rd rotational member are respectively connected to stationary members by the second brake B2 and the third brake B3. One of the elements of the 2nd gear train G2 coupled to the 2nd rotational member is disengageably connected to one of the elements of the 3rd gear train G3 coupled to the 2nd rotational member by the first clutch K1.

Figures 64, 65:
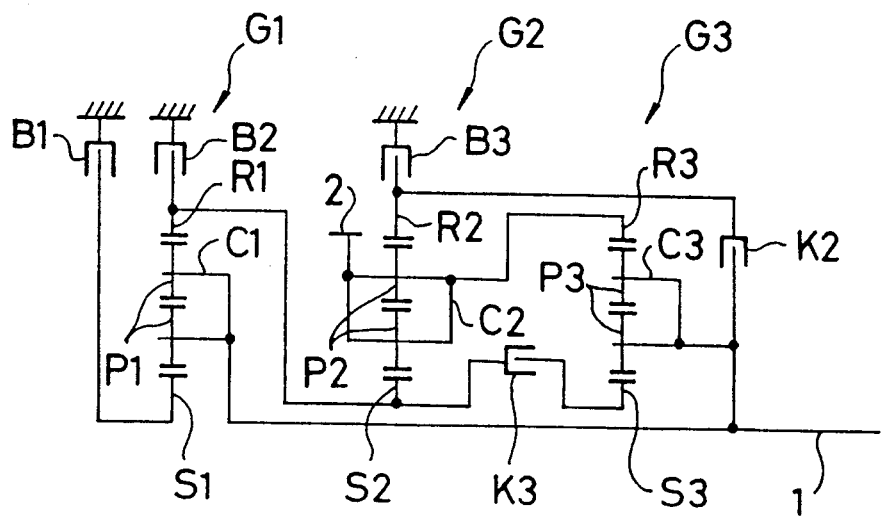

FIG. 64 shows a skelton of a planetary gear transmission according to a 29th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 65 shows how the elements are coupled into first through fifth rotational members.

The sun gear S1 serves as first rotational member. The ring gear R1, the sun gear S2 and the sun gear S3 jointly serve as second rotational member. The ring gear R2 serves as third rotational member. The carrier C2 and the ring gear R3 jointly serve as fourth rotational member. The carrier C1 and the carrier C3 jointly serve as fifth rotational member.

Figures 66, 67:
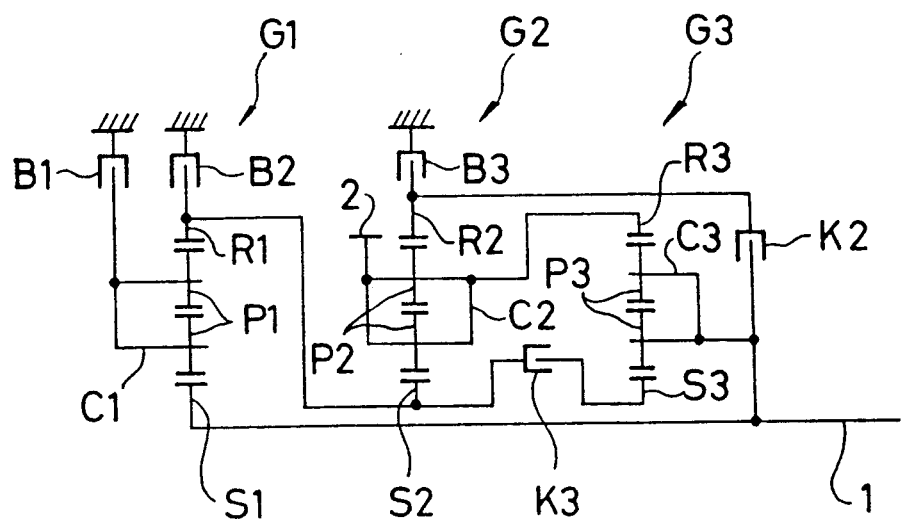

FIG. 66 shows a skelton of a planetary gear transmission according to a 30th embodiment. The transmission shown in FIG. 66 differs from the transmission shown in FIG. 64 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 66 are identical to those of the transmission shown in FIG. 64. FIG. 67 shows how the elements are coupled into first through fifth rotational members in the transmission shown in FIG. 66.

Figures 68, 69:
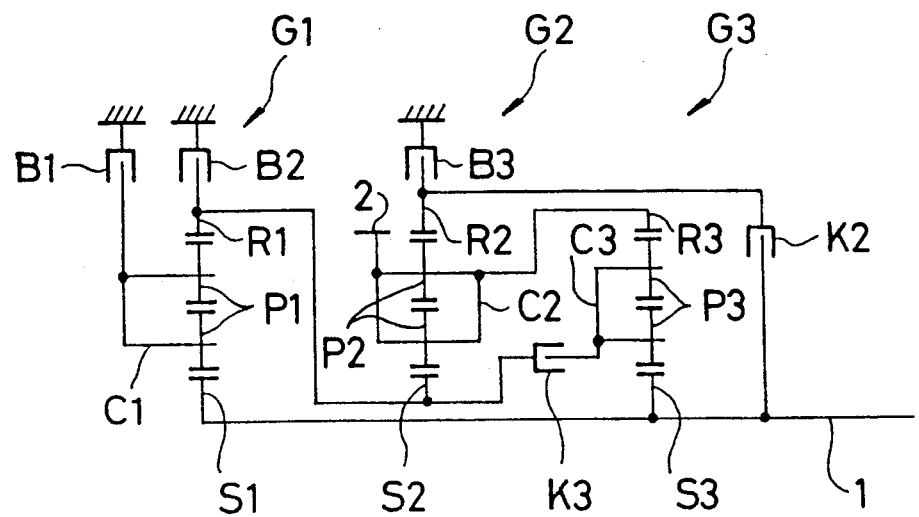

FIG. 68 shows a skelton of a planetary gear transmission according to a 31st embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first carrier C1 is disengageably coupled to a stationary member by the first brake B1, and the first sun gear S1 is securely connected to an input shaft 1. FIG. 69 shows how the elements are coupled into first through fifth rotational members.

The carrier C1 serves as first rotational member. The ring gear R1, the sun gear S2 and the carrier C3 jointly serve as second rotational member. The ring gear R2 serves as third rotational member. The carrier C2 and the ring gear R3 jointly serve as fourth rotational member. The sun gear S1 and the sun gear S3 serve as fifth rotational member.

Figures 70, 71:
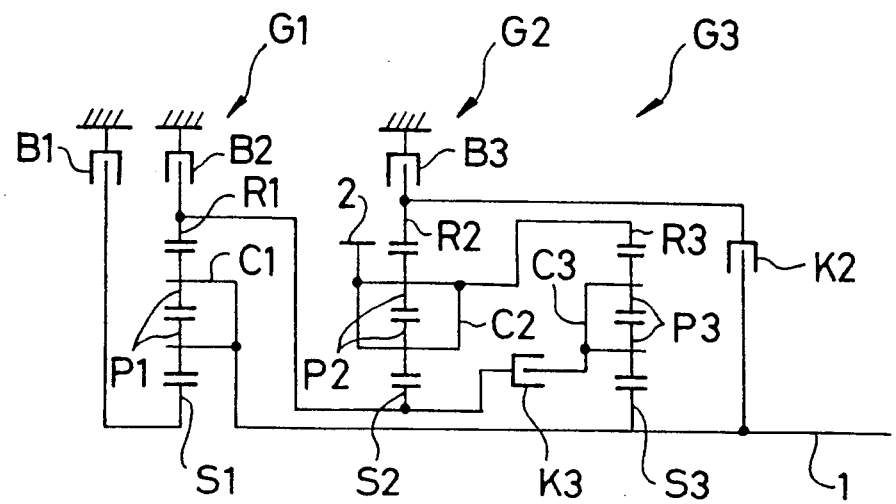

FIG. 70 shows a skelton of a planetary gear transmission according to a 32nd embodiment. The transmission shown in FIG. 70 differs from the transmission shown in FIG. 68 only as to the first planetary gear train G1. Specifically, the first carrier C1 is securely coupled to the input shaft 1, and the first sun gear S1 is disengageably coupled to a stationary member by the first brake B1. The other details of the transmission shown in FIG. 70 are identical to those of the transmission shown in FIG. 68. FIG. 71 shows how the elements are coupled into first through fifth rotational members in the transmission shown in FIG. 70.

Figures 72, 73:
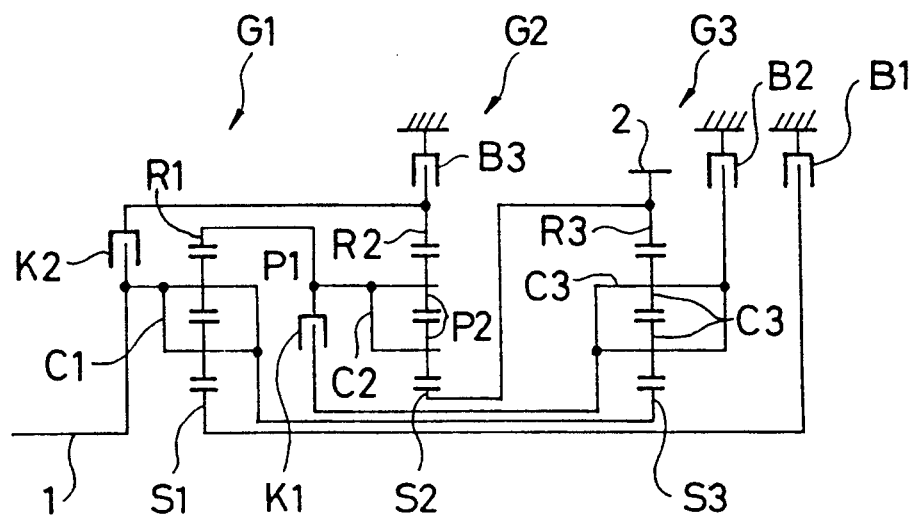

FIG. 72 shows a skelton of a planetary gear transmission according to a 33rd embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 73 shows how the elements are coupled into first through fifth rotational members.

The sun gear S1 serves as first rotational member. The ring gear R1, the carrier C2 and the carrier C3 jointly serve as second rotational member. The ring gear R2 serves as third rotational member. The sun gear S2 and the ring gear R3 jointly serve as fourth rotational member. The carrier C1 and the sun gear S3 serve as fifth rotational member.

TYPE 6

Figures 184, 185:
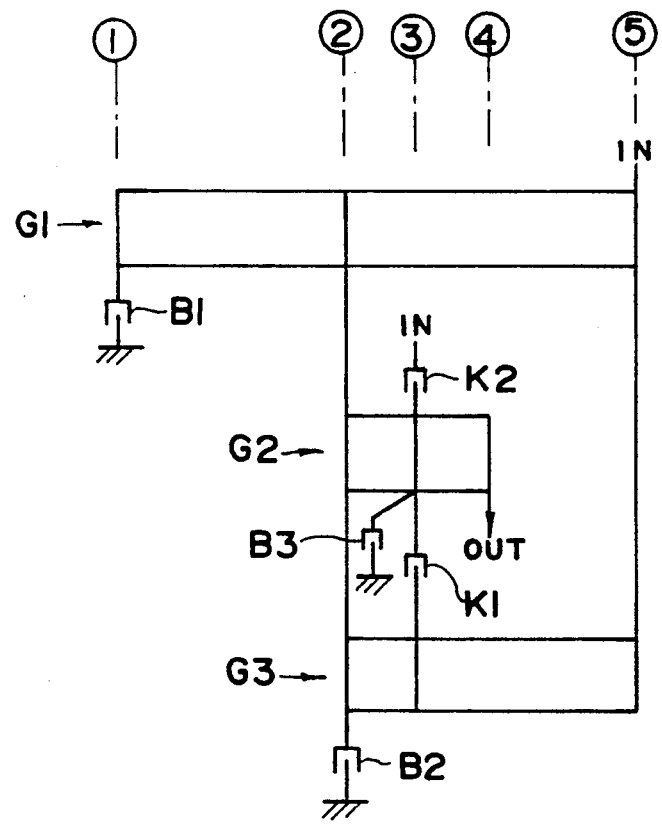

Transmissions of type 6 can be represented by the combination of elements to compose the 1st–5th rotational members shown in FIG. 184. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 2nd, 3rd and 5th rotational members.

A diagram showing coupling relationship is shown in FIG. 185. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 2nd gear train G2 coupled to the 3rd rotational member are respectively connected to stationary members by the second brake B2 and the third brake B3. One of the elements of the 2nd gear train G2 coupled to the 3rd rotational member is disengageably connected to one of the elements of the 3rd gear train G3 coupled to the 3rd rotational member by the first clutch K1.

Figures 74, 75:
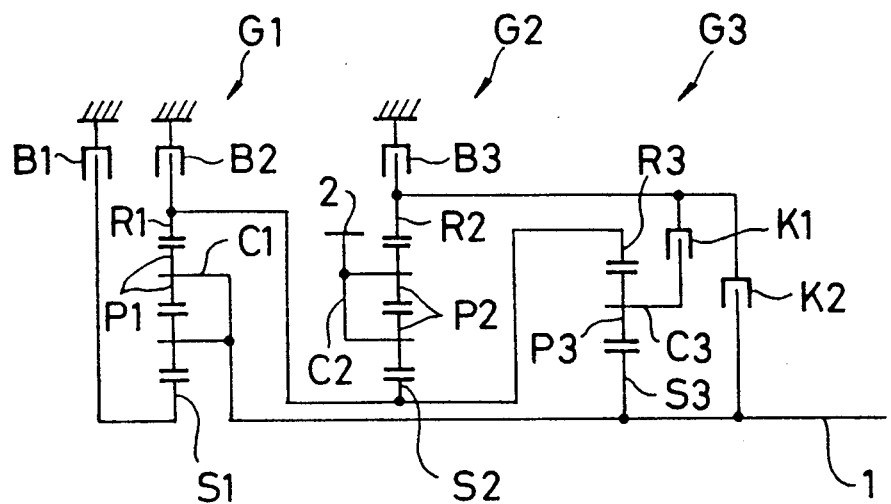

FIG. 74 shows a skelton of a planetary gear transmission according to a 34th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 75 shows how the elements are coupled into first through fifth rotational members.

The sun gear S1 serves as the first rotational member. The ring gear R1, the sun gear S2 and the ring gear R3 jointly serve as second rotational member. The ring gear R2 and the carrier C3 jointly serve as third rotational member. The carrier C2 serves as fourth rotational member. The carrier C1 and the sun gear S3 serve as fifth rotational member.

Figures 76, 77:
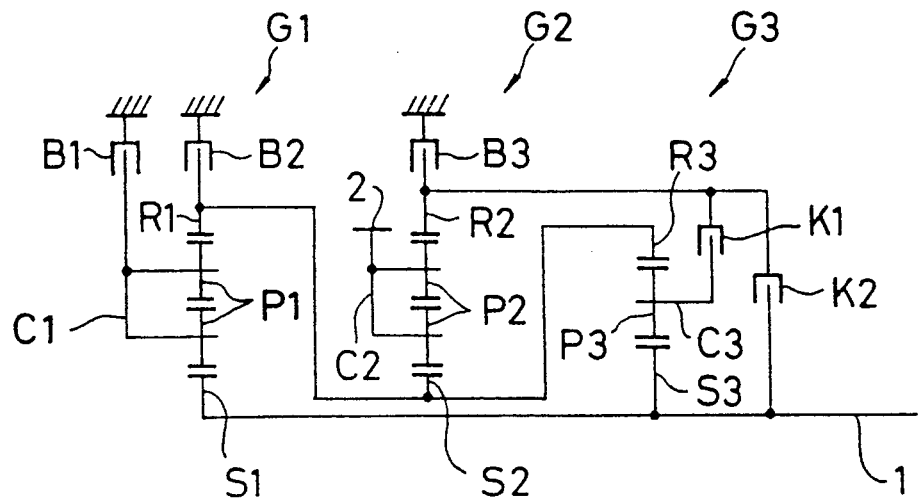

FIG. 76 shows a skelton of a planetary gear transmission according to a 35th embodiment. The transmission shown in FIG. 76 differs from the transmission shown in FIG. 74 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 76 are identical to those of the transmission shown in FIG. 74. FIG. 77 shows how the elements are coupled into first through fifth rotational members in the transmission shown in FIG. 76.

Figures 78, 79:
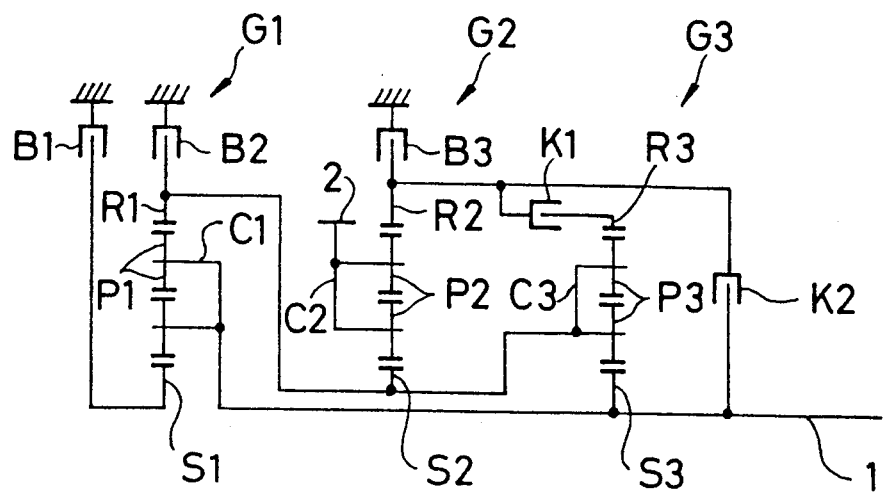

FIG. 78 shows a skelton of a planetary gear transmission according to a 36th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 79 shows how the elements are coupled into first through fifth rotational members.

The sun gear S1 serves as first rotational member. The ring gear R1, the sun gear S2 and the carrier C3 jointly serve as second rotational member. The ring gear R2 and the ring gear R3 jointly serve as third rotational member. The carrier C2 serves as fourth rotational member. The carrier C1 and the sun gear S3 serve as fifth rotational member.

Figures 80, 81:
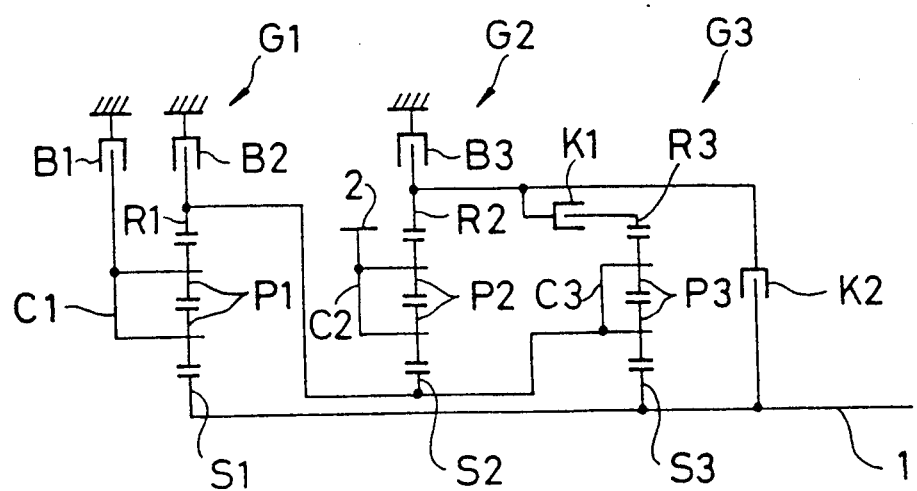

FIG. 80 shows a skelton of a planetary gear transmission according to a 37th embodiment. The transmission shown in FIG. 80 differs from the transmission shown in FIG. 78 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 80 are identical to those of the transmission shown in FIG. 78. FIG. 81 shows how the elements are coupled into first through fifth rotational members in the transmission shown in FIG. 80.

Figures 82, 83:
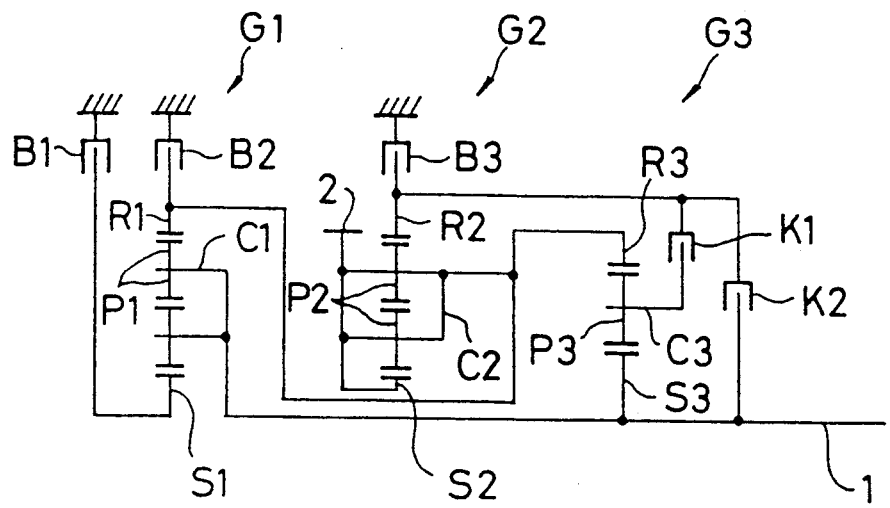

FIG. 82 shows a skelton of a planetary gear transmission according to a 38th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 83 shows how the elements are coupled into first through fifth rotational members.

The sun gear S1 serves as the first rotational member. The ring gear R1, the carrier C2 and the ring gear R3 jointly serve as second rotational member. The ring gear R2 and the carrier C3 jointly serve as third rotational member. The sun gear S2 serves as fourth rotational member. The carrier C1 and the sun gear S3 jointly serve as fifth rotational member.

Figures 84, 85:
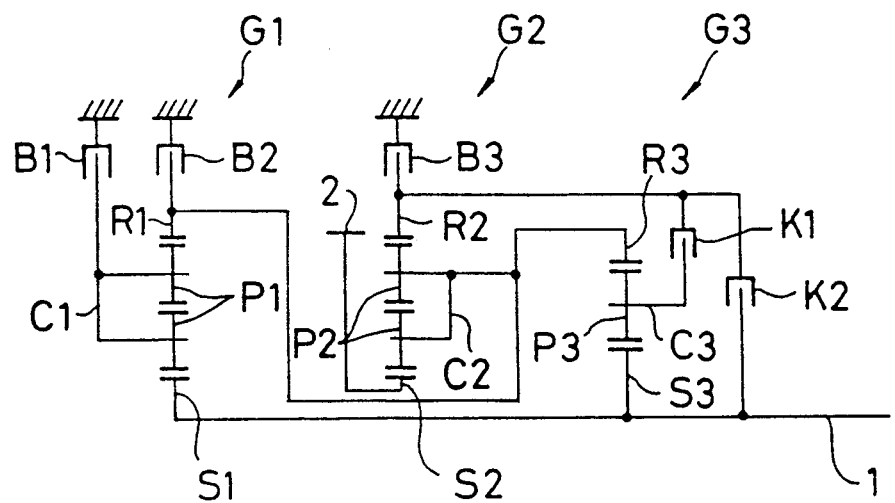

FIG. 84 shows a skelton of a planetary gear transmission according to a 39th embodiment. The transmission shown in FIG. 84 differs from the transmission shown in FIG. 82 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 84 are identical to those of the transmission shown in FIG. 82. FIG. 85 shows how the elements are coupled into first through fifth rotational members in the transmission shown in FIG. 84.

Figures 86, 87:
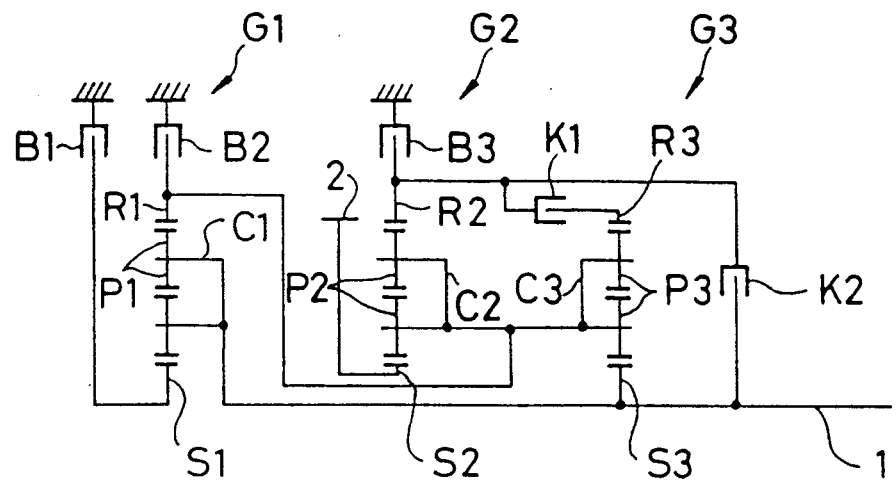

FIG. 86 shows a skeleton of a planetary gear transmission according to a 40th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 87 shows how the elements are coupled into first through fifth rotational members.

The sun gear S1 serves as first rotational member. The ring gear R1, the carrier C2 and the carrier C3 jointly serve as second rotational member. The ring gear R2 and the ring gear R3 jointly serve as third rotational member. The sun gear S2 serves as fourth rotational member. The carrier C1 and the sun gear S3 jointly serve as fifth rotational member.

Figures 88, 89:
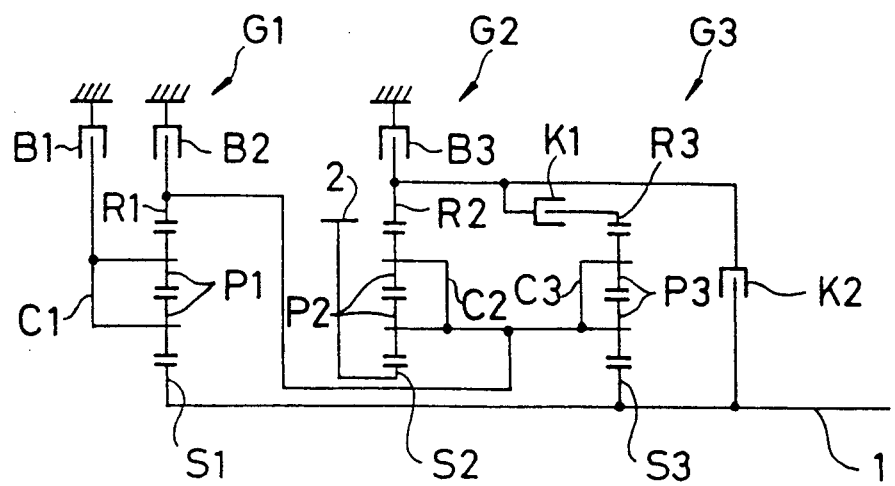

FIG. 88 shows a skeleton of a planetary gear transmission according to a 41st embodiment. The transmission shown in FIG. 88 differs from the transmission shown in FIG. 86 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 88 are identical to those of the transmission shown in FIG. 86. FIG. 89 shows how the elements are coupled into first through fifth rotational members in the transmission shown in FIG. 88.

TYPE 7

Figures 186, 187:
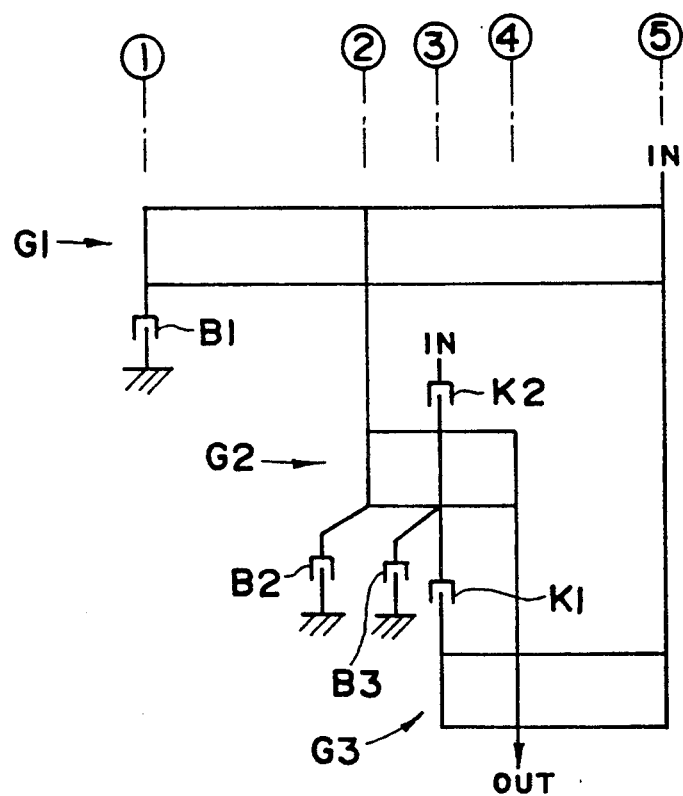

Transmissions of type 7 can be represented by the combination of elements to compose the 1st–5th rotational members shown in FIG. 186. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 3rd, 4th and 5th rotational members.

A diagram showing coupling relationship is shown in FIG. 187. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 2nd gear train G2 coupled to the 2nd rotational member and one of the elements of the 2nd gear train G2 coupled to the 3rd rotational member are respectively connected to stationary members by the second brake B2 and the third brake B3. One of the elements of the 2nd gear train G2 coupled to the 3rd rotational member is disengageably connected to one of the elements of the 3rd gear train G3 coupled to the 3rd rotational member by the first clutch K1.

Figures 90, 91:
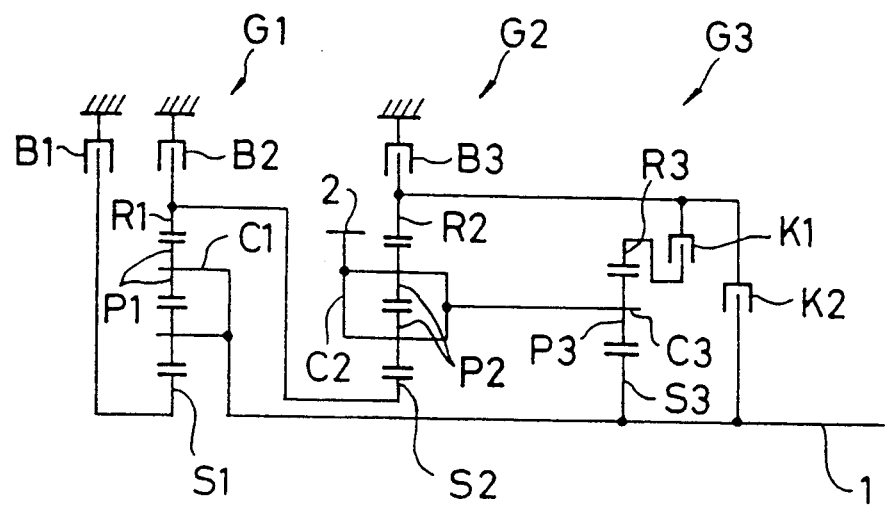

FIG. 90 shows a skeleton of a planetary gear transmission according to a 42nd embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 91 shows how the elements are coupled into first through fifth rotational members.

The sun gear S1 serves as the first rotational member. The ring gear R1 and the sun gear S2 jointly serve as second rotational member. The ring gear R2 and the ring gear R3 jointly serve as third rotational member. The carrier C2 and the carrier C3 jointly serve as fourth rotational member. The carrier C1 and the sun gear S3 jointly serve as fifth rotational member.

Figures 92, 93:
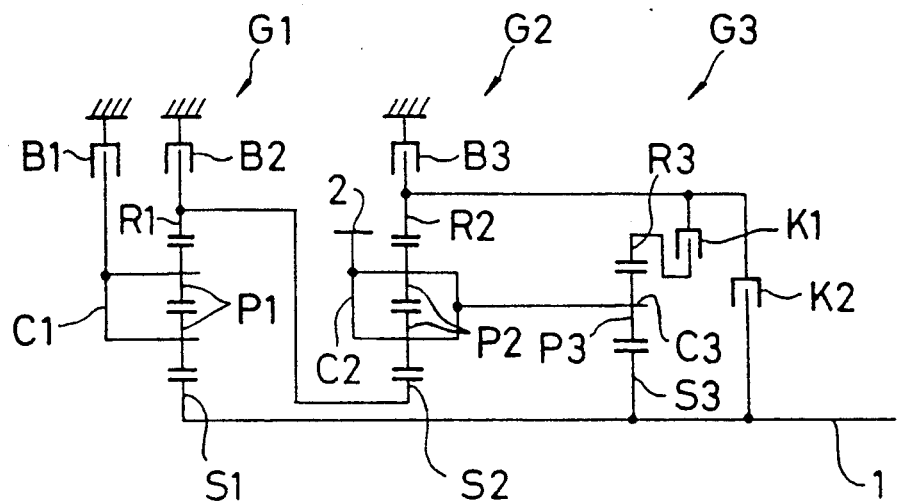

FIG. 92 shows a skeleton of a planetary gear transmission according to a 43rd embodiment. The transmission shown in FIG. 92 differs from the transmission shown in FIG. 90 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 92 are identical to those of the transmission shown in FIG. 90. FIG. 93 shows how the elements are coupled into first through fifth rotational members in the transmission shown in FIG. 92.

Figures 94, 95:
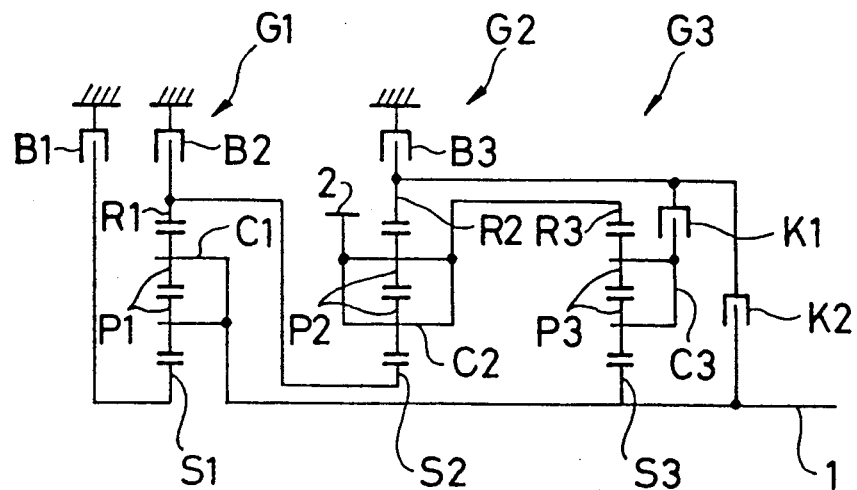

FIG. 94 shows a skeleton of a planetary gear transmission according to a 44th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 95 shows how the elements are coupled into first through fifth rotational members.

The sun gear S1 serves as first rotational member. The ring gear R1 and the sun gear S1 jointly serve as second rotational member. The ring gear R2 and the carrier C3 jointly serve as third rotational member. The carrier C2 and the ring gear R3 jointly serve as fourth rotational member. The carrier C1 and the sun gear S3 serve as fifth rotational member.

Figures 96, 97:
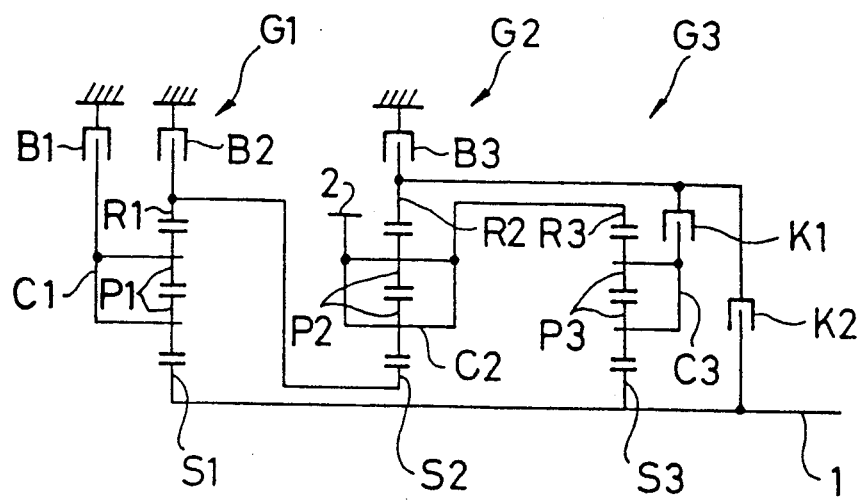

FIG. 96 shows a skeleton of a planetary gear transmission according to a 45th embodiment. The transmission shown in FIG. 96 differs from the transmission shown in FIG. 94 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 96 are identical to those of the transmission shown in FIG. 94. FIG. 97 shows how the elements are coupled into first through fifth rotational members in the transmission shown in FIG. 96.

TYPE 8

Figures 188, 189:
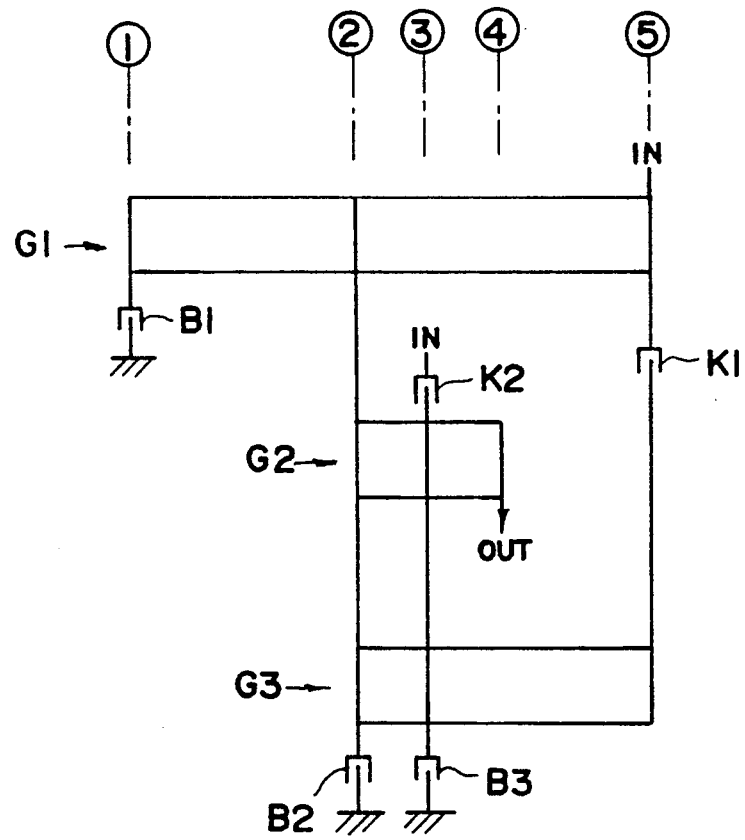

Transmissions of type 8 can be represented by the combination of elements to compose the 1st–5th rotational members shown in FIG. 188. The three elements of the first planetary gear train G1 are respectively coupled to the 1st, 2nd and 5th rotational members. The three elements of the second planetary gear train G3 are respectively coupled to the 2nd, 3rd and 4th rotational members. The three elements of the third planetary gear train G3 are respectively coupled to the 2nd, 3rd and 5th rotational members.

A diagram showing coupling relationship is shown in FIG. 189. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 3rd gear train G3 coupled to the 3rd rotational member are respectively connected to stationary members by the second brake B2 and the third brake B3. One of the elements of the 1st gear train G1 coupled to the 5th rotational member is disengageably connected to one of the elements of the 3rd gear train G3 coupled to the 5th rotational member by the first clutch K1.

Figures 98, 99:
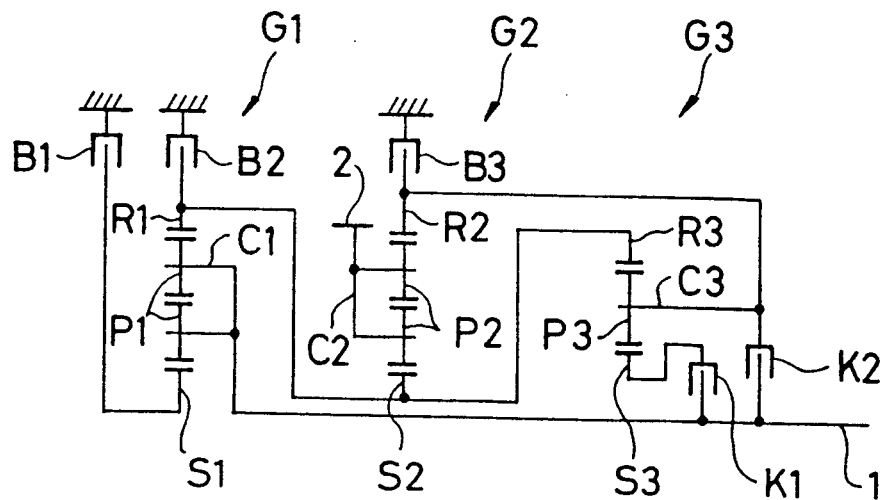

FIG. 98 shows a skelton of a planetary gear transmission according to a 46th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 99 shows how the elements are coupled into first through fifth rotational members.

The sun gear S1 serves as the first rotational member. The ring gear R1, the sun gear S2 and the ring gear R3 jointly serve as second rotational member. The ring gear R2 and the carrier C3 jointly serve as third rotational member. The carrier C2 serves as fourth rotational member. The carrier C1 and the sun gear S3 jointly serve as fifth rotational member.

Figures 100, 101:
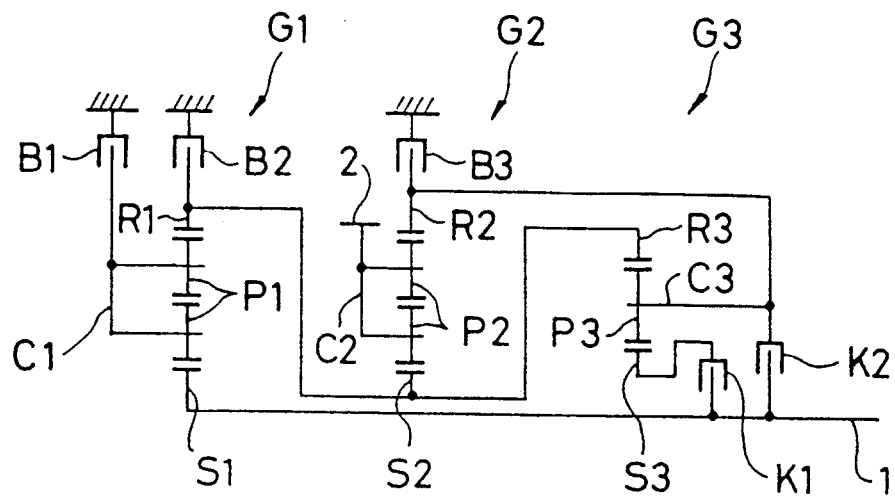

FIG. 100 shows a skelton of a planetary gear transmission according to a 47th embodiment. The transmission shown in FIG. 100 differs from the transmission shown in FIG. 98 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 100 are identical to those of the transmission shown in FIG. 98. FIG. 101 shows how the elements are coupled into first through fifth rotational members in the transmission shown in FIG. 100.

Figures 102, 103:
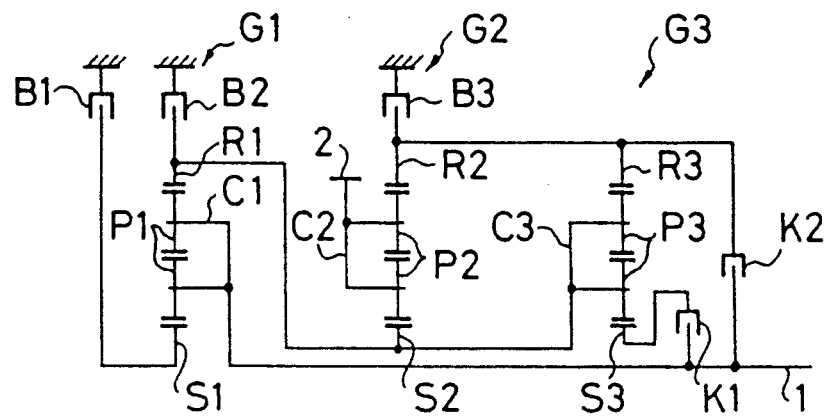

FIG. 102 shows a skelton of a planetary gear transmission according to a 48th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 103 shows how the elements are coupled into first through fifth rotational members.

The sun gear S1 serves as first rotational member. The ring gear R1, the sun gear S2 and the carrier C3 jointly serve as second rotational member. The ring gear R2 and the ring gear R3 jointly serve as third rotational member. The carrier C2 serves as fourth rotational member. The carrier C1 and the sun gear S3 jointly serve as fifth rotational member.

Figures 104, 105:
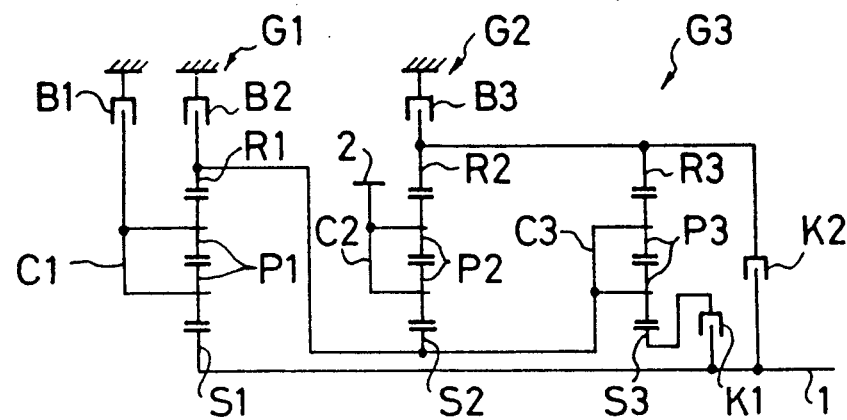

FIG. 104 shows a skelton of a planetary gear transmission according to a 49th embodiment. The transmission shown in FIG. 104 differs from the transmission shown in FIG. 102 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 104 are identical to those of the transmission shown in FIG. 102. FIG. 105 shows how the elements are coupled into first through fifth rotational members in the transmission shown in FIG. 104.

Figures 106, 107:
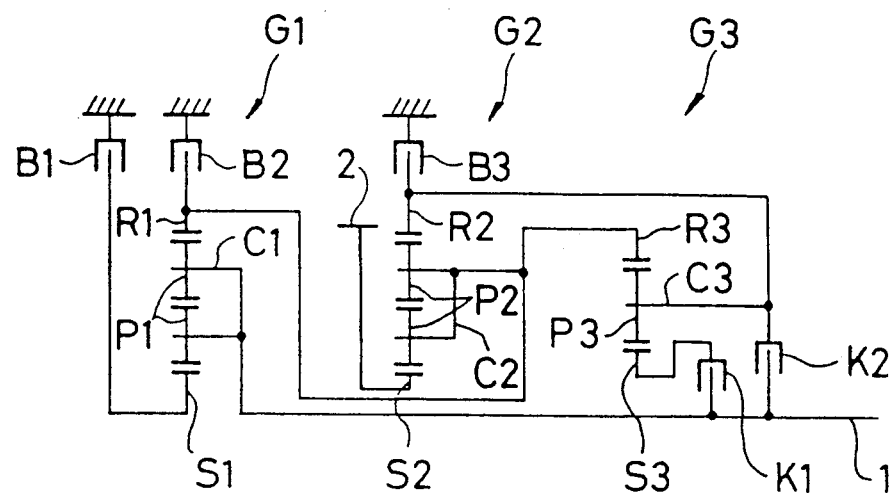

FIG. 106 shows a skelton of a planetary gear transmission according to a 50th embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 107 shows how the elements are coupled into first through fifth rotational members.

The sun gear S1 serves as the first rotational member. The ring gear R1, the carrier C2 and the ring gear R3 jointly serve as second rotational member. The ring gear R2 and the carrier C3 jointly serve as third rotational member. The sun gear S2 serves as fourth rotational member. The carrier C1 and the sun gear S3 serve as fifth rotational member.

Figures 108, 109:
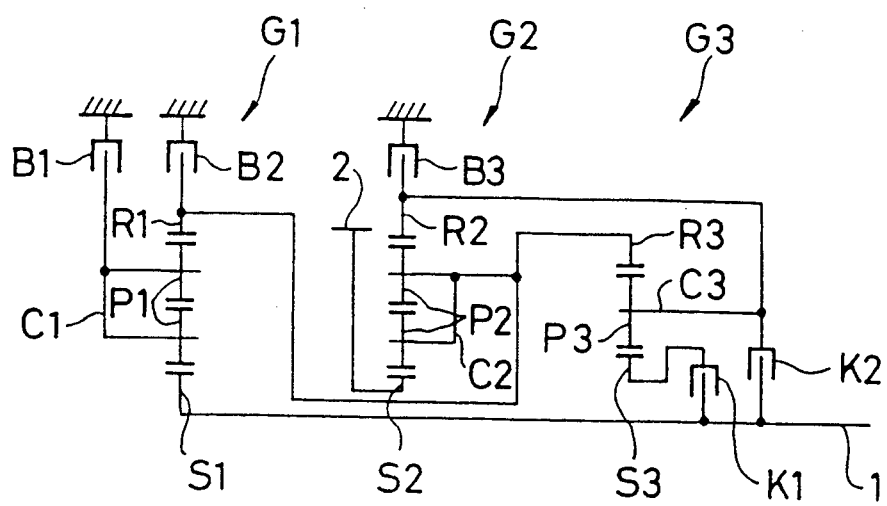

FIG. 108 shows a skelton of a planetary gear transmission according to a 51st embodiment. The transmission shown in FIG. 108 differs from the transmission shown in FIG. 106 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 108 are identical to those of the transmission shown in FIG. 106. FIG. 109 shows how the elements are coupled into first through fifth rotational members in the transmission shown in FIG. 108.

Figures 110, 111:
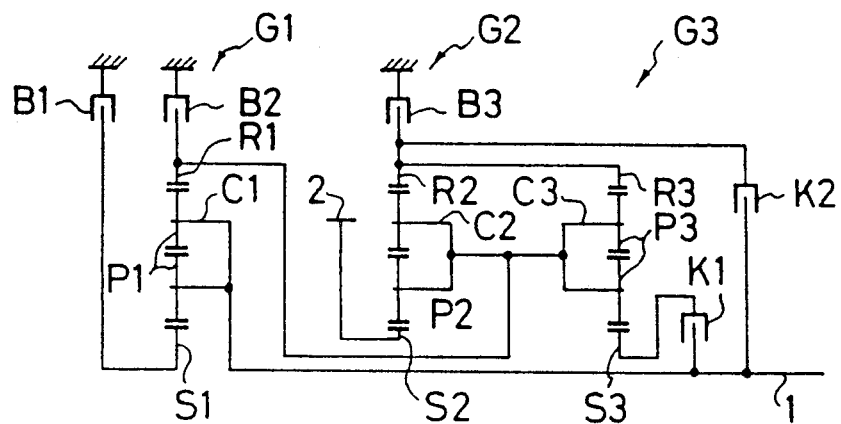

FIG. 110 shows a skelton of a planetary gear transmission according to a 52nd embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 111 shows how the elements are coupled into first through fifth rotational members.

The sun gear S1 serves as first rotational member. The ring gear R1, the carrier C2 and the carrier C3 jointly serve as second rotational member. The ring gear R2 and the ring gear R3 jointly serve as third rotational member. The sun gear S2 serves as fourth rotational member. The carrier C1 and the sun gear S3 jointly serve as fifth rotational member.

Figures 112, 113:
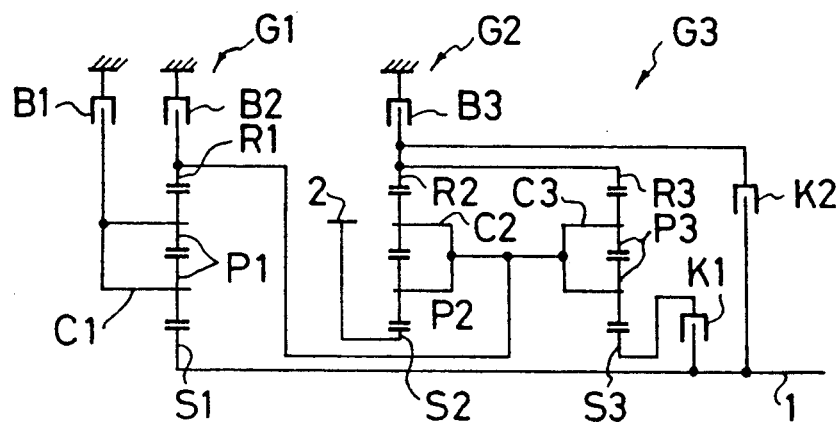

FIG. 112 shows a skelton of a planetary gear transmission according to a 53rd embodiment. The transmission shown in FIG. 112 differs from the transmission shown in FIG. 110 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 112 are identical to those of the transmission shown in FIG. 110. FIG. 113 shows how the elements are coupled into first through fifth rotational members in the transmission shown in FIG. 112.

TYPE 9

Figures 190, 191:
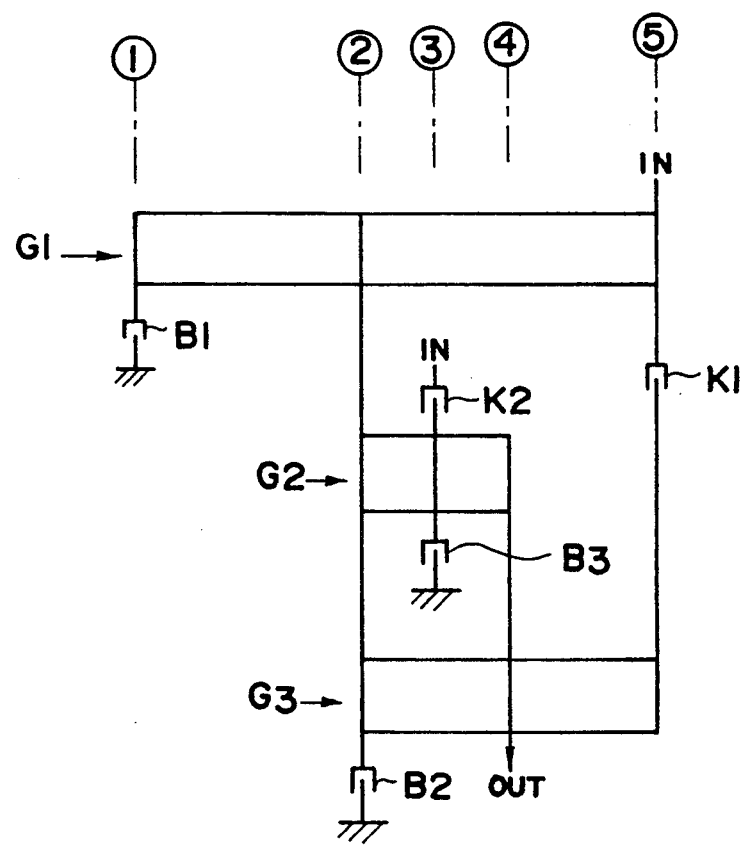

Transmission of type 9 can be represented by the combination of elements to compose the 1st–5th rotational members shown in FIG. 190. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 2nd, 4th and 5th rotational members.

A diagram showing coupling relationship is shown in FIG. 191. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 2nd gear train G2 coupled to the 3rd rotational member are respectively connected to stationary members by the second brake B2 and the third brake B3. One of the elements of the 1st gear train G1 coupled to the 5st rotational member is disengageably connected to one of the elements of the 3rd gear train G3 coupled to the 5th rotational member by the first clutch K1.

Figures 114, 115:
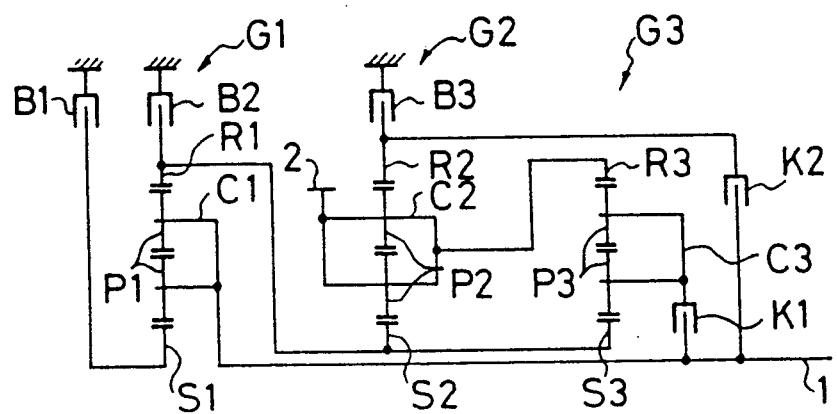

FIG. 114 shows a skelton of a planetary gear transmission according to a 54th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 115 shows how the elements are coupled into first through fifth rotational members.

The sun gear S1 serves as first rotational member. The ring gear R1, the sun gear S2 and the sun gear S3 jointly serve as second rotational member. The ring gear R2 serves as third rotational member. The carrier C2 and the ring gear R3 jointly serve as fourth rotational member. The carrier C1 and the carrier C3 jointly serve as fifth rotational member.

Figures 116, 117:
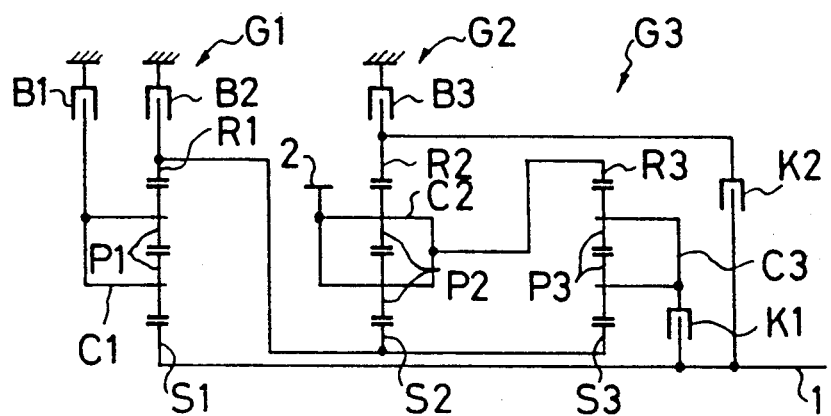

FIG. 116 shows a skelton of a planetary gear transmission according to a 55th embodiment. The transmission shown in FIG. 116 differs from the transmission shown in FIG. 114 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 116 are identical to those of the transmission shown in FIG. 114. FIG. 117 shows how the elements are coupled into first through fifth rotational members in the transmission shown in FIG. 116.

Figures 118, 119:
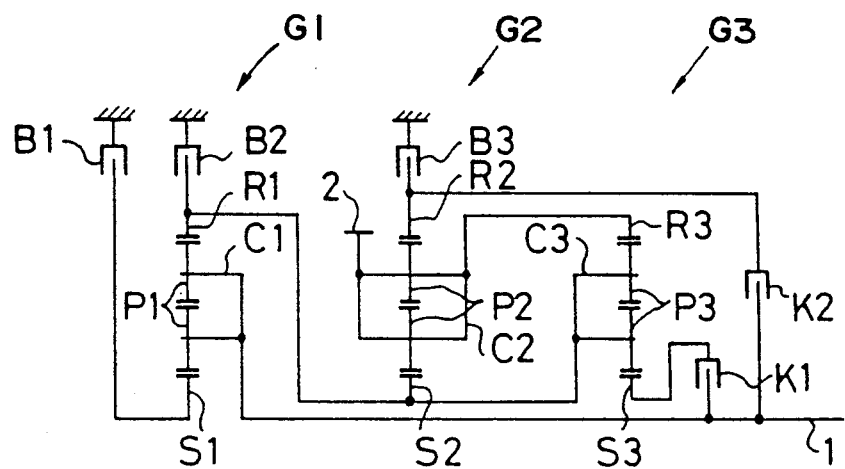

FIG. 118 shows a skelton of a planetary gear transmission according to a 56th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 119 shows how the elements are coupled into first through fifth rotational members.

The sun gear S1 serves as first rotational member. The ring gear R1, the sun gear S2 and the carrier C3 jointly serve as second rotational member. The ring gear R2 serves as third rotational member. The carrier C2 and the ring gear R3 jointly serve as fourth rotational member. The carrier C1 and the sun gear S3 jointly serve as fifth rotational member.

Figures 120, 121:
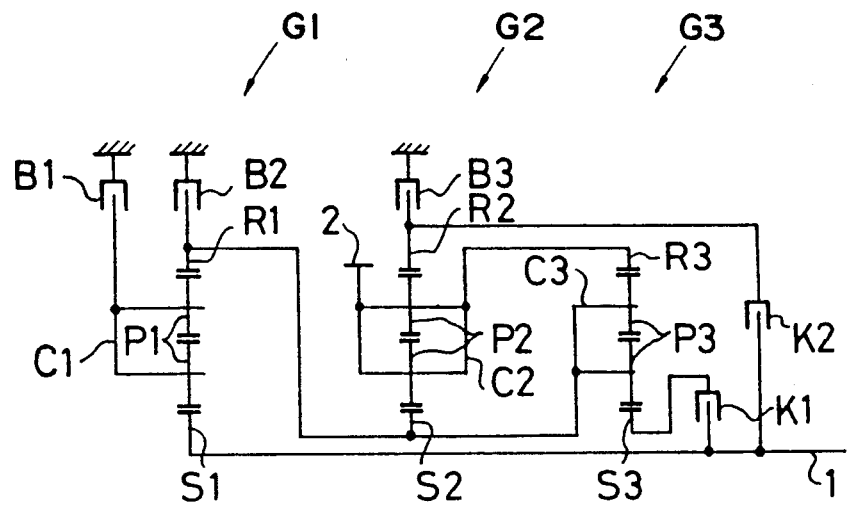

FIG. 120 shows a skelton of a planetary gear transmission according to a 57th embodiment. The transmission shown in FIG. 120 differs from the transmission shown in FIG. 118 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 120 are identical to those of the transmission shown in FIG. 118. FIG. 121 shows how the elements are coupled into first through fifth rotational members in the transmission shown in FIG. 120.

Figures 122, 123:
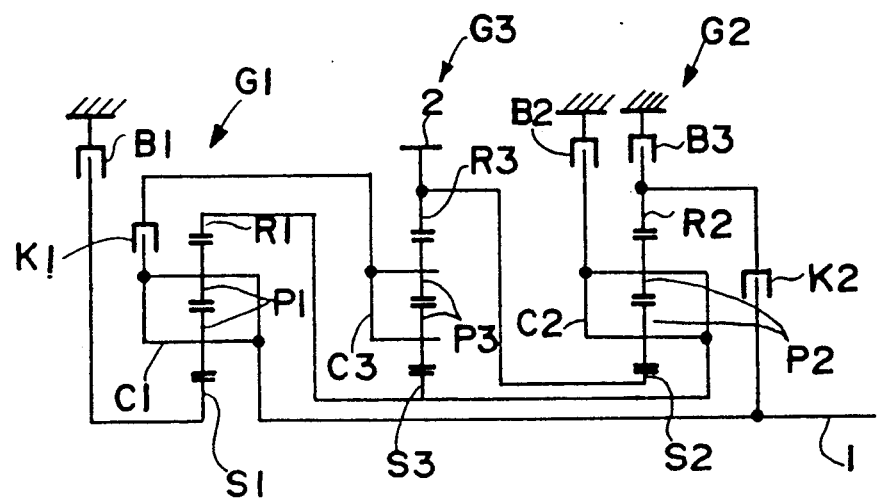

FIG. 122 shows a skelton of a planetary gear transmission according to a 58th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 123 shows how the elements are coupled into first through fifth rotational members.

The sun gear S1 serves as first rotational member. The ring gear R1, the carrier C2 and the sun gear S3 jointly serve as second rotational member. The ring gear R2 serves as third rotational member. The sun gear S2 and the ring gear R3 jointly serve as fourth rotational member. The carrier C1 and the carrier C3 serve as fifth rotational member.

Figures 124, 125:
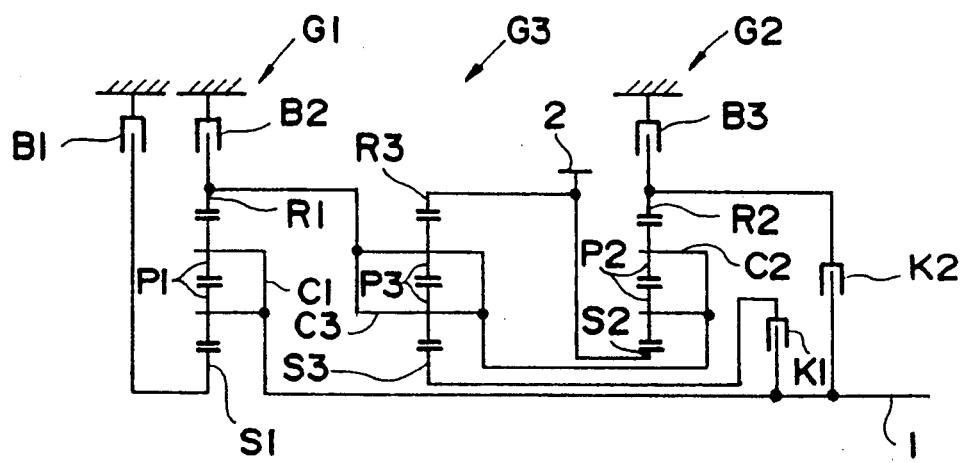

FIG. 124 shows a skelton of a planetary gear transmission according to a 59th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 125 shows how the elements are coupled into first through fifth rotational members.

The sun gear S1 serves as first rotational member. The ring gear R1, the carrier C2 and the carrier C3 jointly serve as second rotational member. The ring gear R2 serves as third rotational member. The sun gear S2 and the ring gear R3 jointly serve as fourth rotational member. The carrier C1 and the sun gear S3 jointly serve as fifth rotational member.

Figures 126, 127:
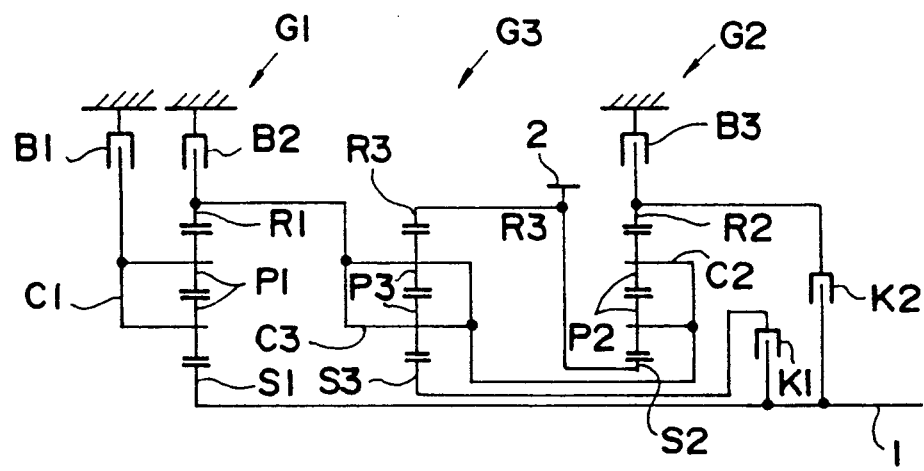

FIG. 126 shows a skelton of a planetary gear transmission according to a 60th embodiment. The transmission shown in FIG. 126 differs from the transmission shown in FIG. 124 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 126 are identical to those of the transmission shown in FIG. 124. FIG. 127 shows how the elements are coupled into first through fifth rotational members in the transmission shown in FIG. 126.

TYPE 10

Transmissions of type 10 can be represented by the combination of elements to compose the 1st-5th rotational members shown in FIG. 192. The three elements of the first planetary gear train G1 are respectively coupled to the 1st, 2nd and 5th rotational members. The three elements of the second planetary gear train G2 are respectively coupled to the 2nd, 3rd and 4th rotational members. The three elements of the third planetary gear train G3 are respectively coupled to the 3rd, 4th and 5th rotational members.

A diagram showing coupling relationship is shown in FIG. 193. One of the elements of the first gear train G1 coupled to the 5th rotational member is securely connected to the input shaft 1, and another element of the first gear train G1 coupled to the 1st rotational member is disengagably connected to a stationary member by the first brake B1. One of the elements of the second gear train G2 is disengageably connected to the input shaft 1 by the second clutch K2. One of the elements of the 3rd gear train G3 coupled to the 3rd rotational member and one of the elements of the 2nd gear train G2 coupled to the 2nd rotational member are respectively connected to stationary members by the second brake B2 and the third brake B3. One of the elements of the 1st gear train G1 coupled to the 5th rotational member is disengageably connected to one of the elements of the 3rd gear train G3 coupled to the 5th rotational member by the first clutch K1.

Figures 128, 129:
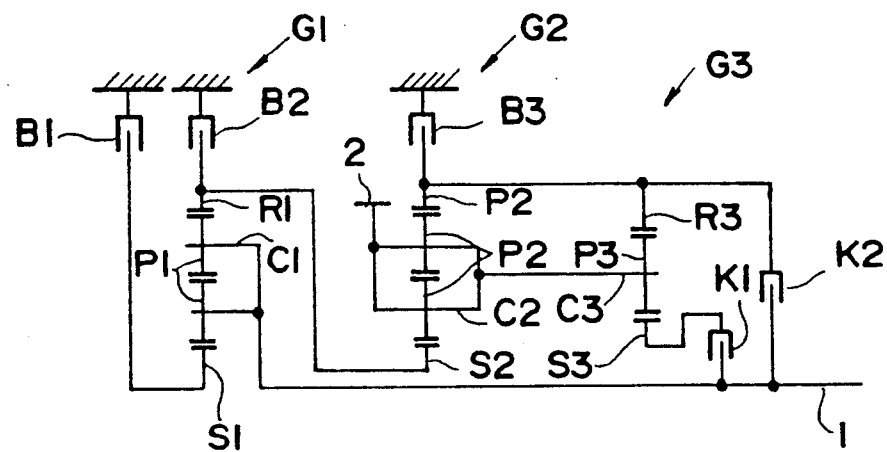

FIG. 128 shows a skelton of a planetary gear transmission according to a 61st embodiment. The transmission has first, second, and third planetary gear trains G1, G2, G3 which are coaxially arranged parallel to each other. The first and second planetary gear trains G1, G2 comprise double-pinion planetary gear trains, and the third planetary gear train G3 comprises a single-pinion planetary gear train.

The first sun gear S1 is disengageably coupled to a stationary member by the first brake B1, and the first carrier C1 is securely connected to an input shaft 1. FIG. 129 shows how the elements are coupled into first through fifth rotational members.

The sun gear S1 serves as the first rotational member. The ring gear R1 and the sun gear S2 jointly serve as second rotational member. The ring gear R2 and the ring gear R3 jointly serve as third rotational member. The carrier C2 and the carrier C3 jointly serve as fourth rotational member. The carrier C1 and the sun gear S3 jointly serve as fifth rotational member.

Figures 130, 131:
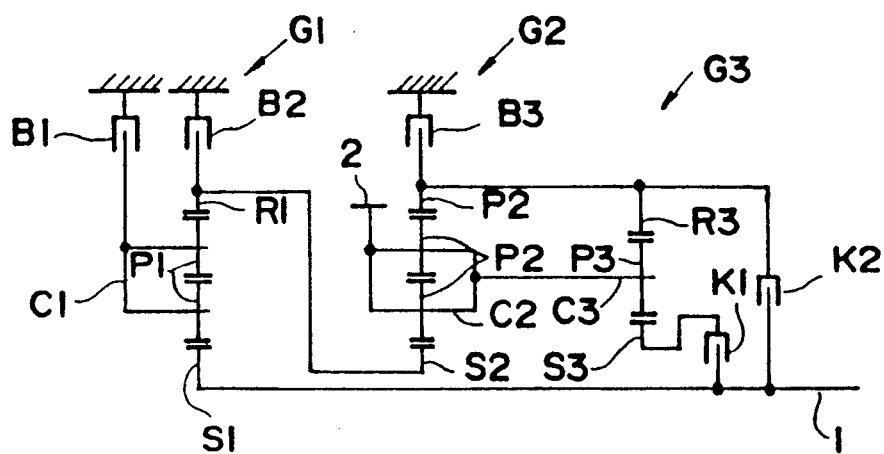

FIG. 130 shows a skelton of a planetary gear transmission according to a 62nd embodiment. The transmission shown in FIG. 130 differs from the transmission shown in FIG. 128 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 130 are identical to those of the transmission shown in FIG. 128. FIG. 131 shows how the elements are coupled into first through fifth rotational members in the transmission shown in FIG. 130.

Figures 132, 133:
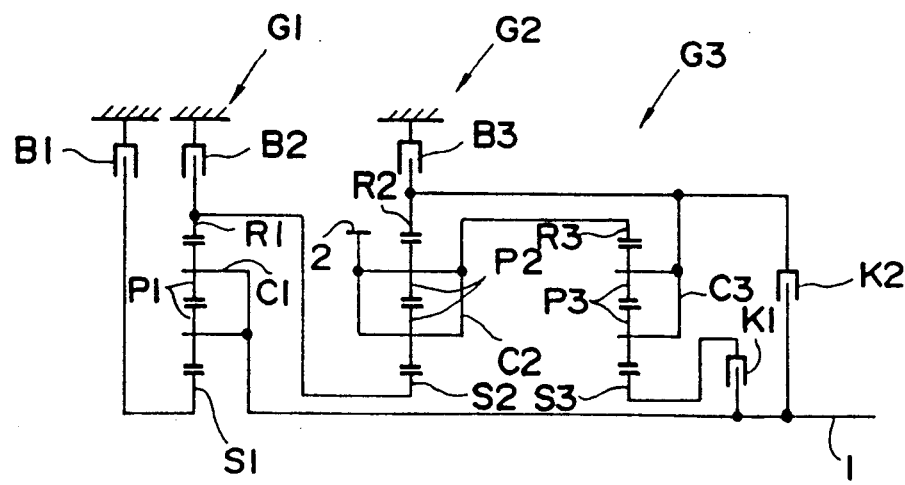

FIG. 132 shows a skelton of a planetary gear transmission according to a 63rd embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengagebly coupled to a stationary member by the first brake B1, and the first carrier C1 is securely connected to an input shaft 1. FIG. 133 shows how the elements are coupled into first through fifth rotational members.

The sun gear S1 serves as first rotational member. The ring gear R1 and the sun gear S2 jointly serve as second rotational member. The ring gear R2 and the carrier C3 jointly serve as third rotational member. The carrier C2 and the ring gear R3 jointly serve as fourth rotational member. The carrier C1 and the sun gear S3 jointly serve as fifth rotational member.

Figures 134, 135:
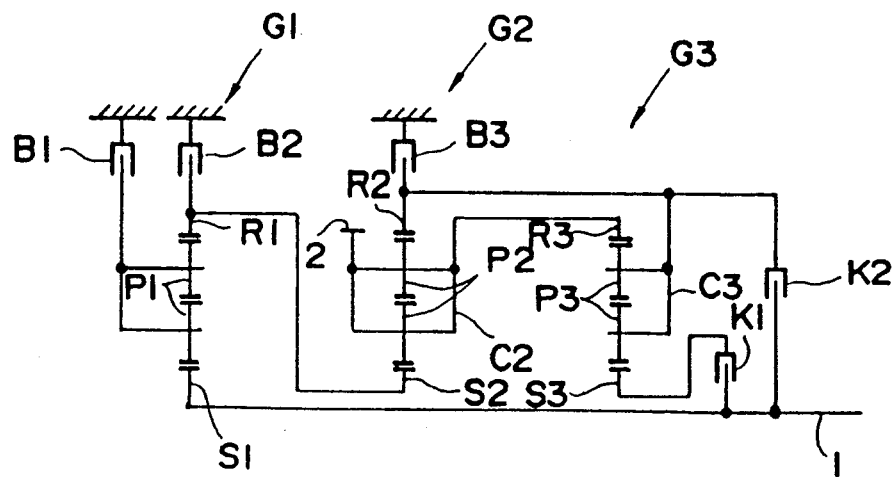

FIG. 134 shows a skelton of a planetary gear transmission according to a 64th embodiment. The transmission shown in FIG. 134 differs from the transmission shown in FIG. 132 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 134 are identical to those of the transmission shown in FIG. 132. FIG. 135 shows how the elements are coupled into first through fifth rotational members in the transmission shown in FIG. 134.

Figures 136, 137:
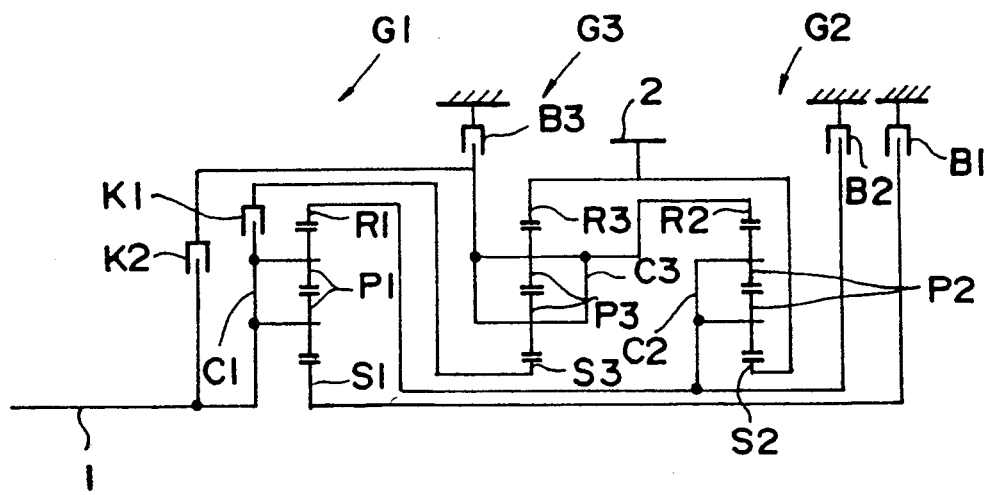

FIG. 136 shows a skelton of a planetary gear transmission according to a 65th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 137 shows how the elements are coupled into first through fifth rotational members.

The sun gear S1 serves as first rotational member. The ring gear R1 and the carrier C2 jointly serve as second rotational member. The ring gear R2 and the carrier C3 jointly serve as third rotational member. The sun gear S2 and the ring gear R3 jointly serve as fourth rotational member. The carrier C1 and the sun gear S3 jointly serve as fifth rotational member.

Figures 138, 139:
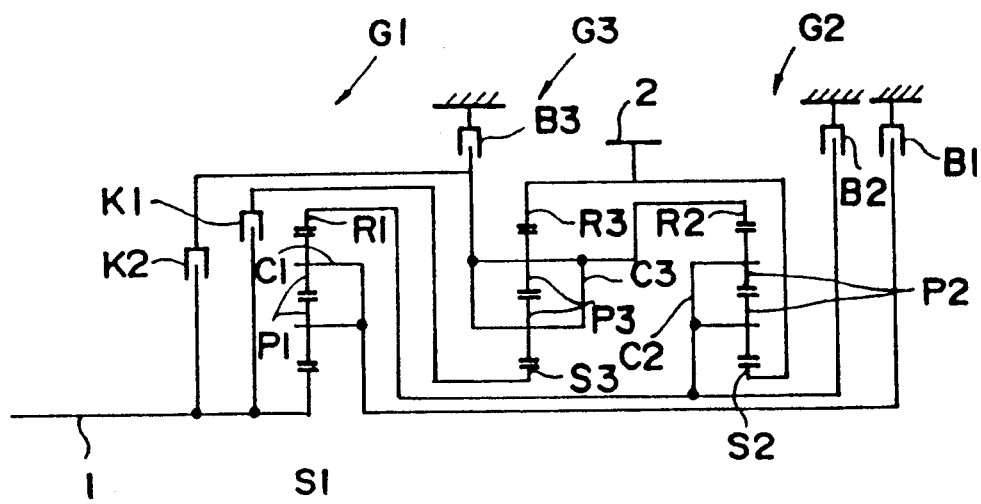

FIG. 138 shows a skelton of a planetary gear transmission according to a 66th embodiment. The transmission shown in FIG. 138 differs from the transmission shown in FIG. 136 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 138 are identical to those of the transmission shown in FIG. 136. FIG. 139 shows how the elements are coupled into first through fifth rotational members in the transmission shown in FIG. 138.

TYPE 11

Figures 194, 195:
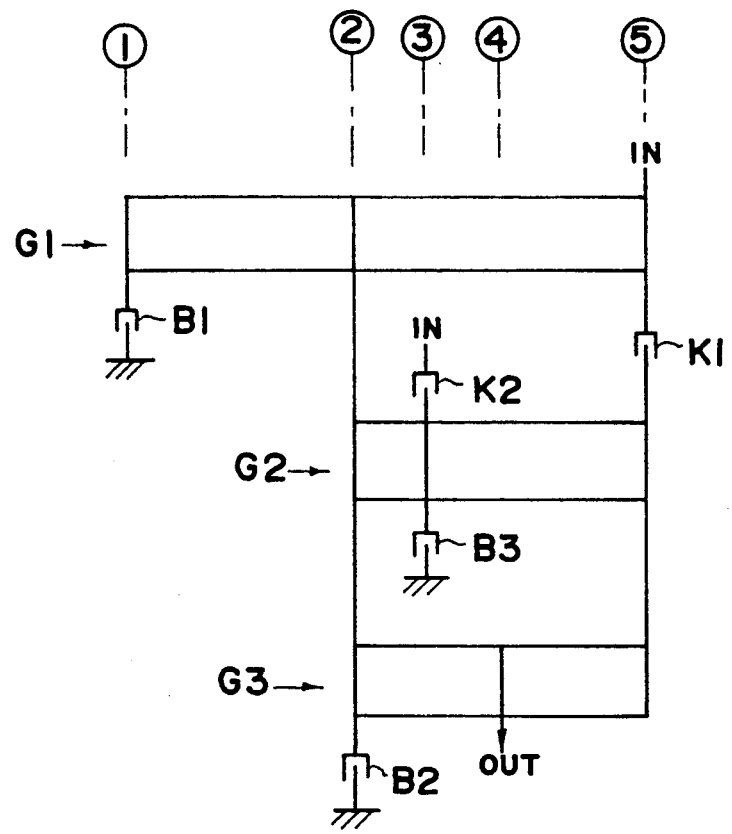

Transmissions of type 11 can be represented by the combination of elements to compose the 1st-5th rotational members shown in FIG. 194. The three elements of the first planetary gear train G1 are respectively coupled to the 1st, 2nd and 5th rotational members. The three elements of the second planetary gear train G2 are respectively coupled to the 2nd, 3rd and 5th rotational members. The three elements of the third planetary gear train G3 are respectively coupled to the 2nd, 4th and 5th rotational members.

A diagram showing coupling relationship is shown in FIG. 195. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 2nd gear train G2 coupled to the 3rd rotational member are respectively connected to stationary members by the second brake B2 and the third brake B3. One of the elements of the 1st gear train G1 coupled to the 5th rotational member is disengageably connected to one of the elements of the 2nd gear train G2 coupled to the 5th rotational member by the first clutch K1.

Figures 140, 141:
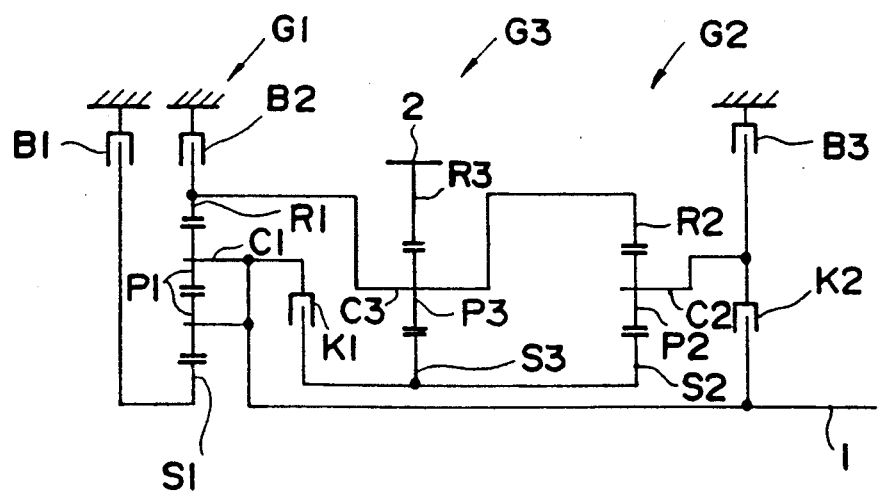

FIG. 140 shows a skelton of a planetary gear transmission according to a 67th embodiment. The transmission has first, second, and third planetary gear trains G1, G2, G3 which are coaxially arranged parallel to each other. The first planetary gear train G1 comprises a double-pinion planetary gear train, and the second and third planetary gear trains G2, G3 comprise single-pinion planetary gear trains.

The first sun gear S1 is disengageably coupled to a stationary member by the first brake B1, and the first carrier C1 is securely connected to an input shaft 1. FIG. 141 shows how the elements are coupled into first through fifth rotational members.

The sun gear S1 serves as the first rotational member. The ring gear R1, the ring gear R2 and the carrier C3 jointly serve as second rotational member. The carrier C2 serves as third rotational member. The ring gear R3 serves as fourth rotational member. The carrier C1, the sun gear S2 and the sun gear S3 jointly serve as fifth rotational member.

Figures 142, 143:
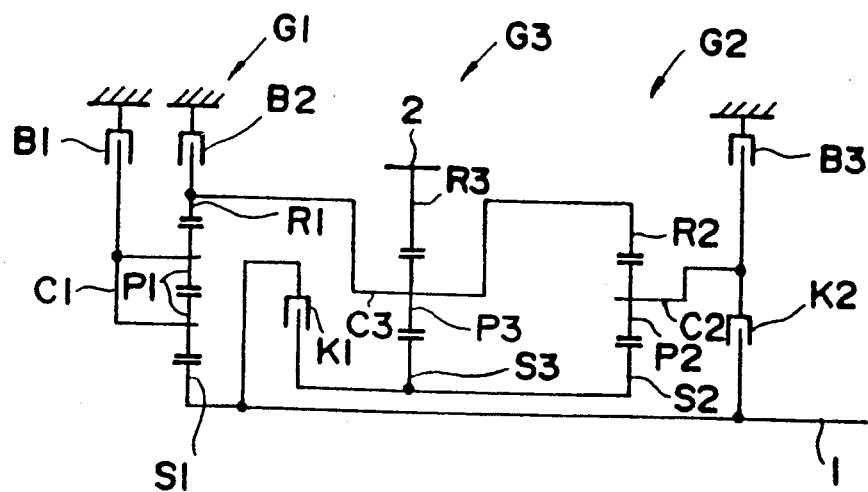

FIG. 142 shows a skelton of a planetary gear transmission according to a 68th embodiment. The transmission shown in FIG. 142 differs from the transmission shown in FIG. 140 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 142 are identical to those of the transmission shown in FIG. 140. FIG. 143 shows how the elements are coupled into first through fifth rotational members in the transmission shown in FIG. 142.

Figures 144, 145:
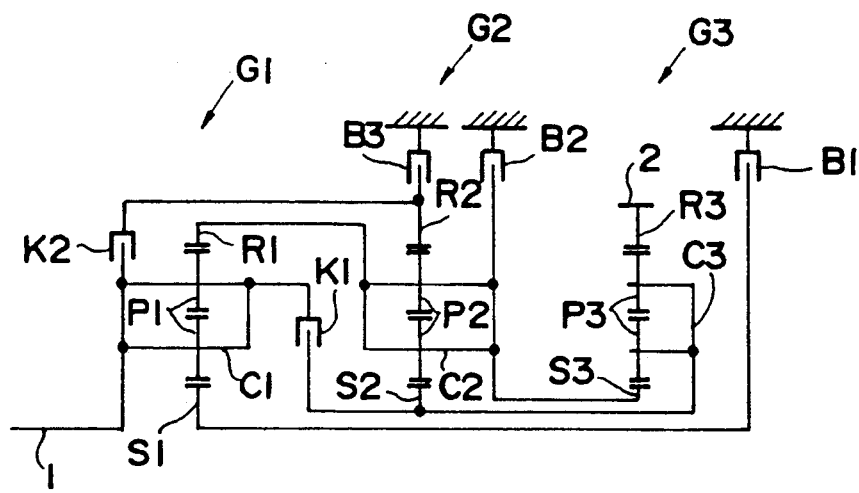

FIG. 144 shows a skelton of a planetary gear transmission according to a 69th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 145 shows how the elements are coupled into first through fifth rotational members.

The sun gear S1 serves as first rotational member. The ring gear R1, the carrier C2 and the sun gear S3 jointly serve as second rotational member. The ring gear R2 serves as third rotational member. The ring gear R3 serves as fourth rotational member. The carrier C1, the sun gear S2 and the carrier C3 jointly serve as fifth rotational member.

Figures 146, 147:
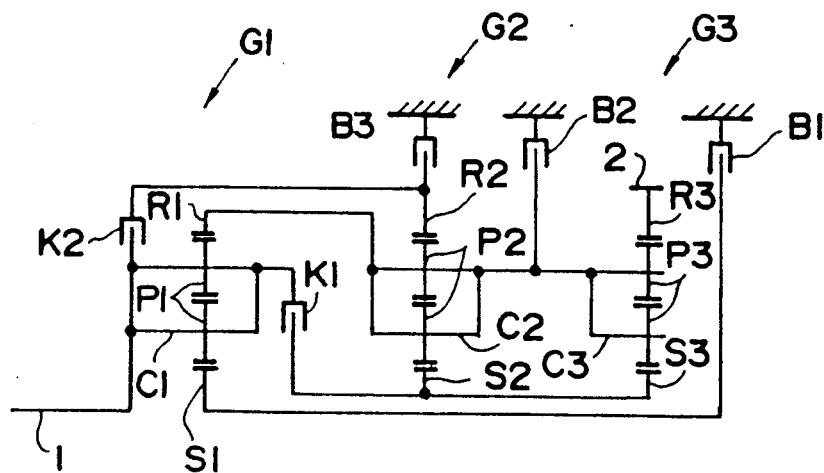

FIG. 146 shows a skelton of a planetary gear transmission according to a 70th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 147 shows how the elements are coupled into first through fifth rotational members.

The sun gear S1 serves as first rotational member. The ring gear R1, the carrier C2 and the carrier C3 jointly serve as second rotational member. The ring gear R2 serves as third rotational member. The ring gear R3 serves as fourth rotational member. The carrier C1, the sun gear S2 and the sun gear S3 jointly serve as fifth rotational member.

Figures 148, 149:
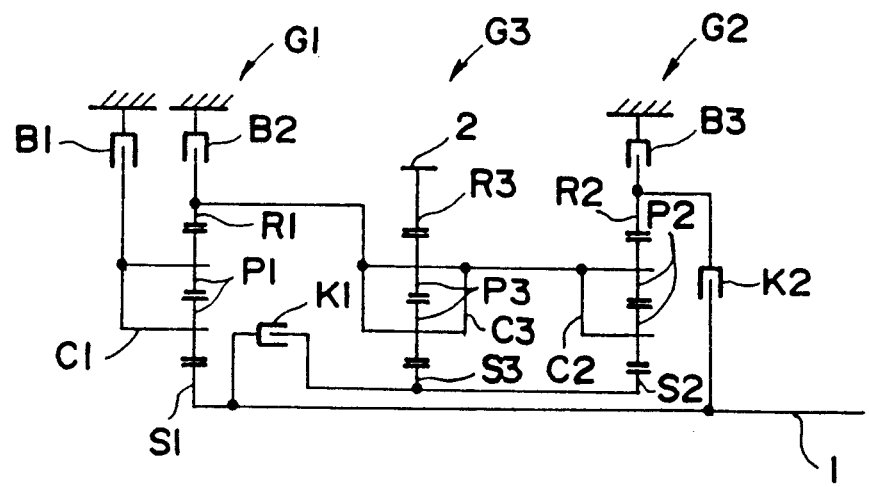

FIG. 148 shows a skelton of a planetary gear transmission according to a 71st embodiment. The transmission shown in FIG. 148 differs from the transmission shown in FIG. 146 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 148 are identical to those of the transmission shown in FIG. 146. FIG. 149 shows how the elements are coupled into first through fifth rotational members in the transmission shown in FIG. 148.

TYPE 12

Figures 196, 197:
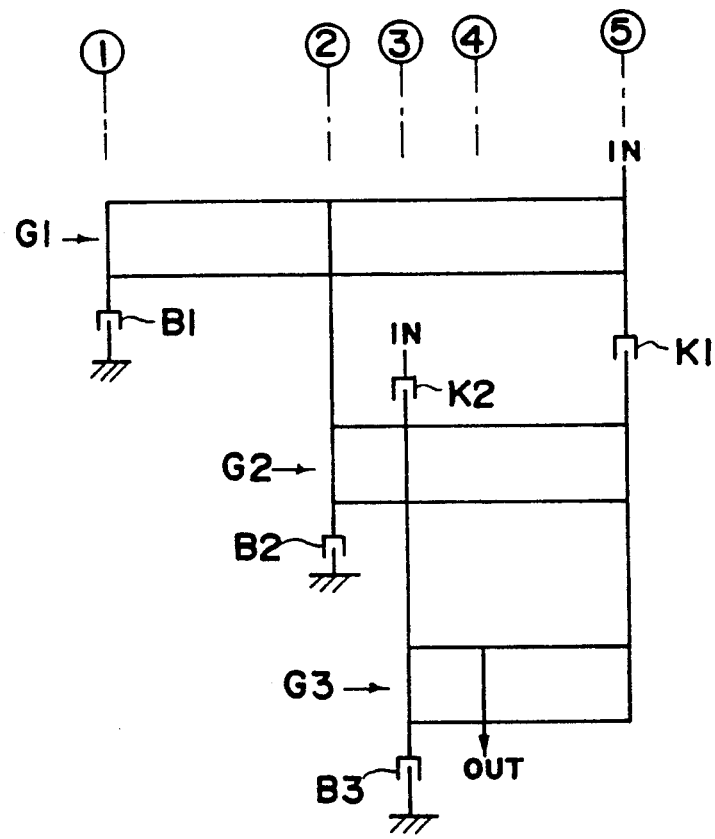

Transmissions of type 12 can be represented by the combination of elements to compose the 1st-5th rotational members shown in FIG. 196. The three elements of the first planetary gear train G1 are respectively coupled to the 1st, 2nd and 5th rotational members. The three elements of the second planetary gear train G2 are respectively coupled to the 2nd, 3rd and 5th rotational members. The three elements of the third planetary gear train G3 are respectively coupled to the 3rd, 4th and 5th rotational members.

A diagram showing coupling relationship is shown in FIG. 197. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 2nd gear train G2 coupled to the 2nd rotational member and one of the elements of the 3rd gear train G3 coupled to the 3rd rotational member are respectively connected to stationary members by the second brake B2 and the third brake B3. One of the elements of the 1st gear train G1 coupled to the 5th rotational member is disengageably connected to one of the elements of the 2nd gear train G2 coupled to the 5th rotational member by the first clutch K1.

Figures 150, 151:
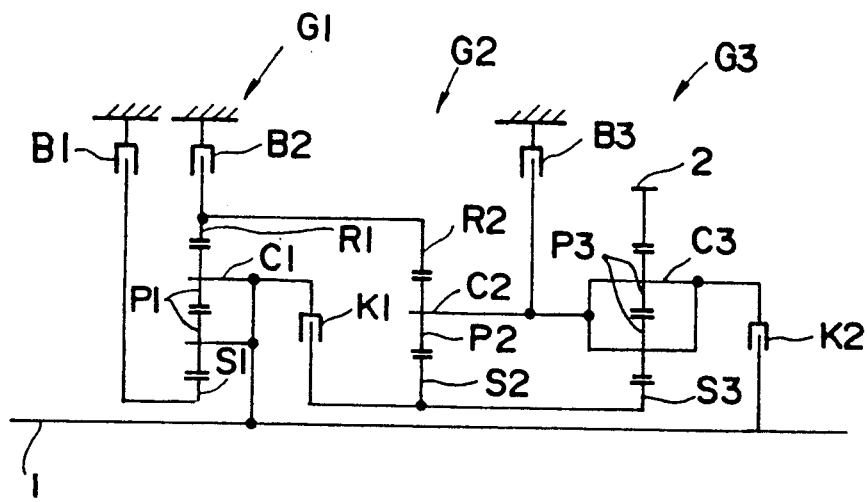

FIG. 150 shows a skelton of a planetary gear transmission according to a 72nd embodiment. The transmission has first, second, and third planetary gear trains G1, G2, G3 which are coaxially arranged parallel to each other. The first and third planetary gear trains G1, G3 comprise double-pinion planetary gear trains, and the second planetary gear train G2 comprises a single-pinion planetary gear train.

The first sun gear S1 is disengageably coupled to a stationary member by the first brake B1, and the first carrier C1 is securely connected to an input shaft 1. FIG. 151 shows how the elements are coupled into first through fifth rotational members.

The sun gear S1 serves as the first rotational member. The ring gear R1 and the ring gear R2 jointly serve as second rotational member. The carrier C2 and the carrier C3 jointly serve as third rotational member. The ring gear R3 serves as fourth rotational member. The carrier C1, the sun gear S2 and the sun gear S3 jointly serve as fifth rotational member.

Figures 152, 153:
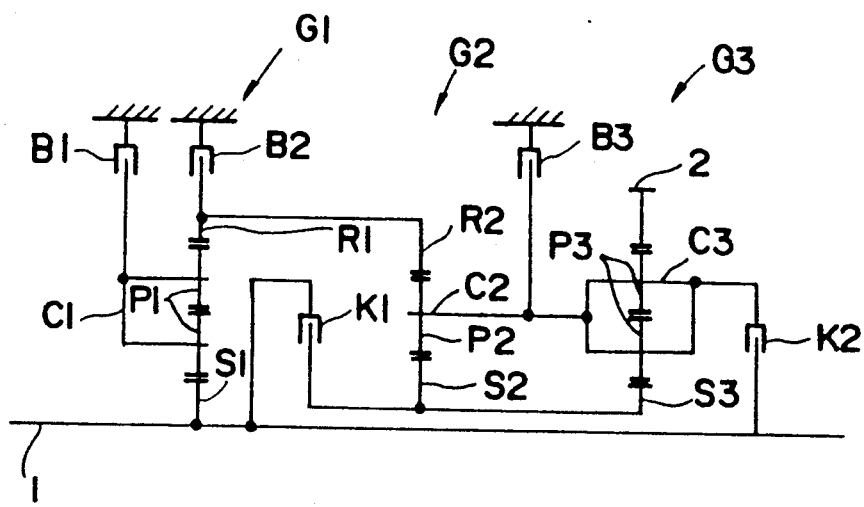

FIG. 152 shows a skelton of a planetary gear transmission according to a 73rd embodiment. The transmission shown in FIG. 152 differs from the transmission shown in FIG. 150 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 152 are identical to those of the transmission shown in FIG. 150. FIG. 153 shows how the elements are coupled into first through fifth rotational members in the transmission shown in FIG. 152.

Figures 154, 155:
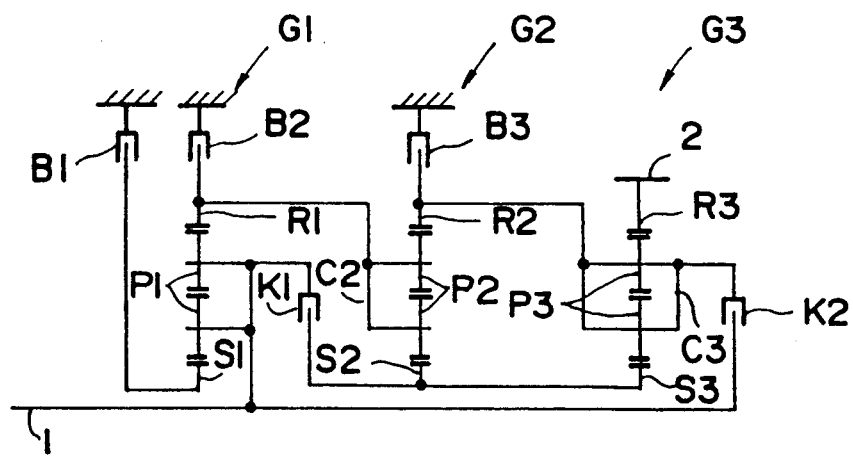

FIG. 154 shows a skelton of a planetary gear transmission according to a 74th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 155 shows how the elements are coupled into first through fifth rotational members.

The sun gear S1 serves as first rotational member. The ring gear R1 and the carrier C2 jointly serve as second rotational member. The ring gear R2 and the carrier C3 jointly serve as third rotational member. The ring gear R3 serves as fourth rotational member. The carrier C1, the sun gear S2 and the sun gear S3 jointly serve as fifth rotational member.

Figures 156, 157:
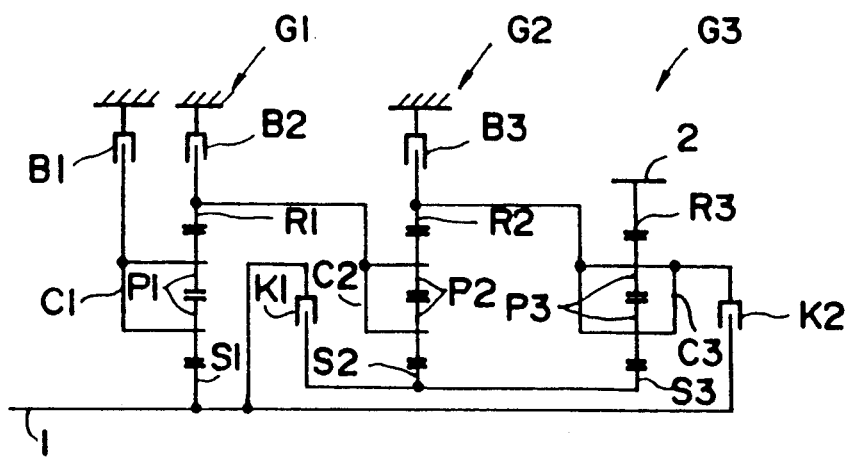

FIG. 156 shows a skelton of a planetary gear transmission according to a 75th embodiment. The transmission shown in FIG. 156 differs from the transmission shown in FIG. 154 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 156 are identical to those of the transmission shown in FIG. 154. FIG. 157 shows how the elements are coupled into first through fifth rotational members in the transmission shown in FIG. 156.

TYPE 13

Figures 198, 199:
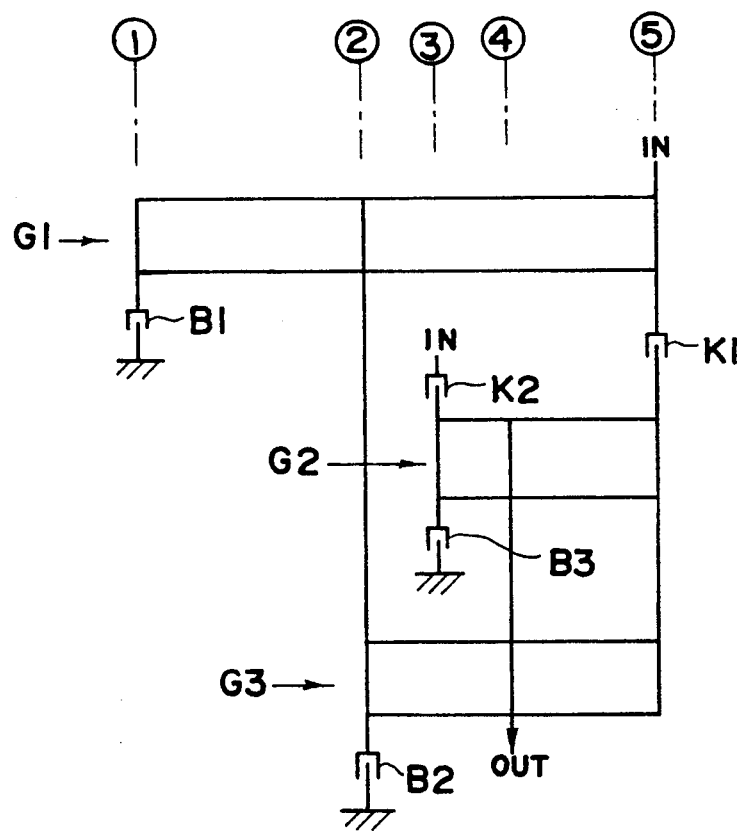

Transmissions of type 13 can be represented by the combination of elements to compose the 1st-5th rotational members shown in FIG. 198. The three elements of the first planetary gear train G1 are respectively coupled to the 1st, 2nd and 5th rotational members. The three elements of the second planetary gear train G2 are respectively coupled to the 3rd, 4th and 5th rotational members. The three elements of the third planetary gear train G3 are respectively coupled to the 2nd, 4th and 5th rotational members.

A diagram showing coupling relationship is shown in FIG. 199. One of the elements of the first gear train G1 coupled to the 5th rotational member is securely connected to the input shaft 1, and another element of the first gear train G1 coupled to the 1st rotational member is disengageably connected to a stationary member by the first brake B1. One of the elements of the second gear train G2 is disengageably connected to the input shaft 1 by the second clutch K2. One of the elements of the 3rd gear train G3 coupled to the 2nd rotational member and one of the elements of the 2nd gear train G2 coupled to the 3rd rotational member are respectively connected to stationary members by the second brake B2 and the third brake B3. One of the elements of the 1st gear train G1 coupled to the 5th rotational member is disengageably connected to one of the elements of the 2nd gear train G2 coupled to the 5th rotational member by the first clutch K1.

Figures 158, 159:
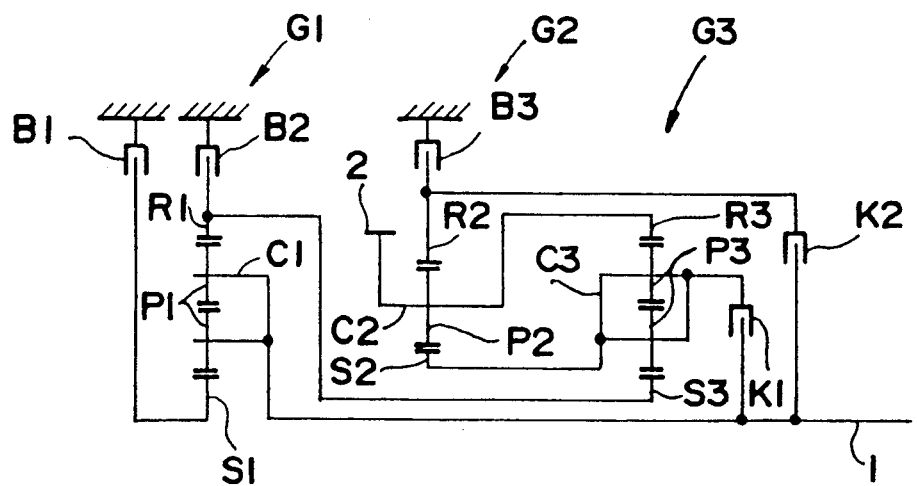

FIG. 158 shows a skelton of a planetary gear transmission according to a 76th embodiment. The transmission has first, second, and third planetary gear trains G1, G2, G3 which are coaxially arranged parallel to each other. The first and third planetary gear trains G1, G3 comprise double-pinion planetary gear trains, and the second planetary gear train G2 comprises a single-pinion planetary gear train.

The first sun gear S1 is disengageably coupled to a stationary member by the first brake B1, and the first carrier C1 is securely connected to an input shaft 1. FIG. 159 shows how the elements are coupled into first through fifth rotational members.

The sun gear S1 serves as the first rotational member. The ring gear R1 and the sun gear S3 jointly serve as second rotational member. The ring gear R2 serves as third rotational member. The carrier C2 and the ring gear R3 jointly serve as fourth rotational member. The carrier C1, the sun gear S2 and the carrier C3 jointly serve as fifth rotational member.

Figures 160, 161:
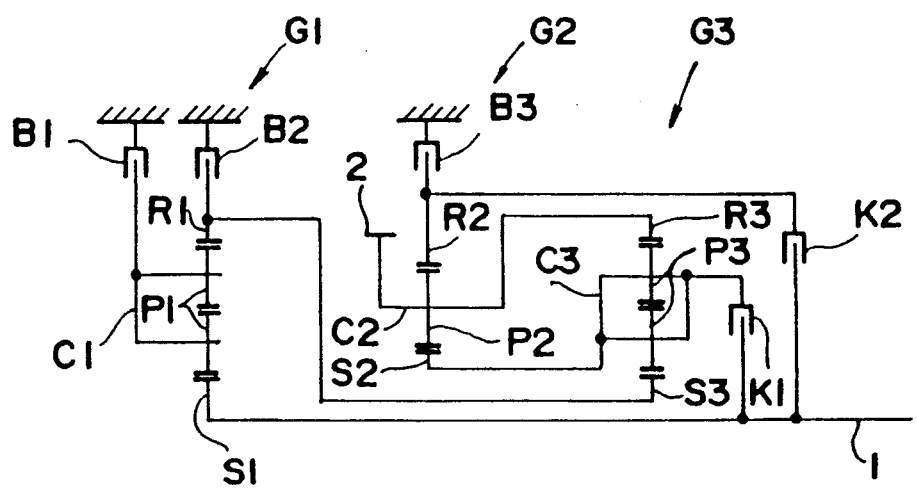

FIG. 160 shows a skelton of a planetary gear transmission according to a 77th embodiment. The transmission shown in FIG. 160 differs from the transmission shown in FIG. 158 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 160 are identical to those of the transmission shown in FIG. 158. FIG. 161 shows how the elements are coupled into first through fifth rotational members in the transmission shown in FIG. 160.

Figures 162, 163:
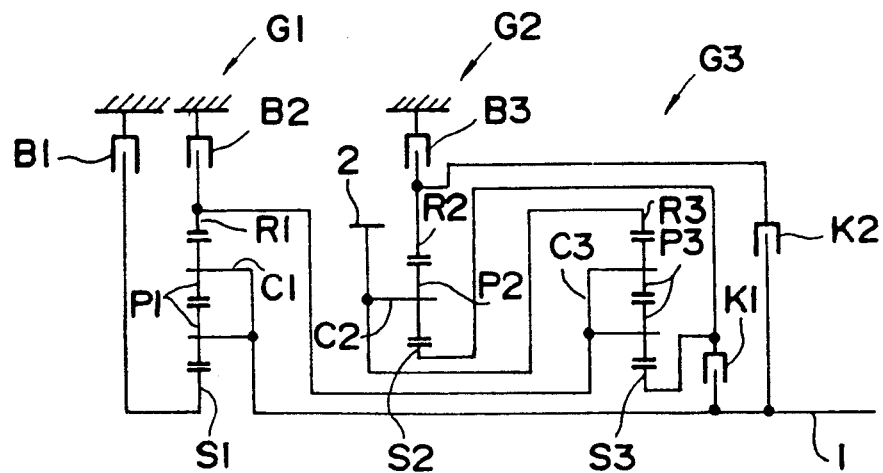

FIG. 162 shows a skelton of a planetary gear transmission according to a 78th embodiment. The transmission has first, second, and third planetary gear trains G1, G2, G3 which are coaxially arranged parallel to each other. The first and third planetary gear trains G1, G3 comprise double-pinion planetary gear trains, and the second planetary gear train G2 comprises a single-pinion planetary gear train.

The first sun gear S1 is disengageably coupled to a stationary member by the first brake B1, and the first carrier C1 is securely connected to an input shaft 1. FIG. 163 shows how the elements are coupled into first through fifth rotational members.

The sun gear S1 serves as the first rotational member. The ring gear R1 and the carrier C3 jointly serve as second rotational member. The ring gear R2 serves as third rotational member. The carrier C2 and the ring gear R3 jointly serve as fourth rotational member. The carrier C1, the sun gear S2 and the sun gear S3 jointly serve as fifth rotational member.

Figures 164, 165:
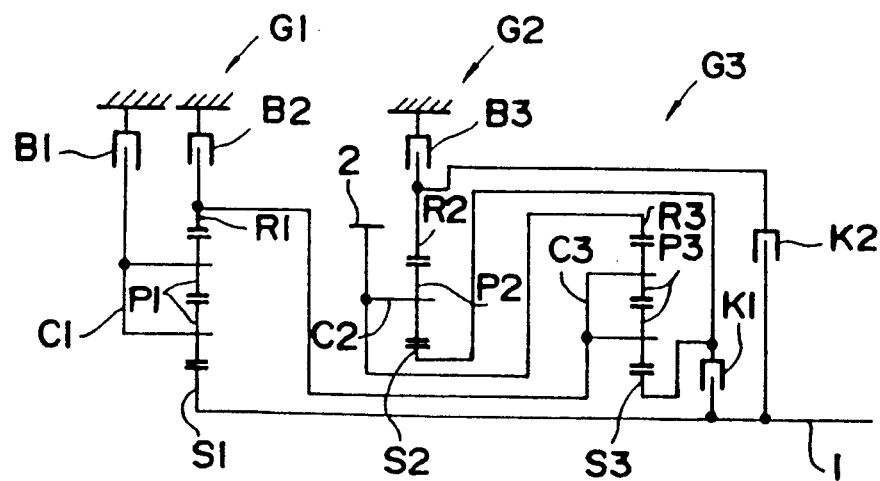

FIG. 164 shows a skelton of a planetary gear transmission according to a 79th embodiment. The transmission shown in FIG. 164 differs from the transmission shown in FIG. 162 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 164 are identical to those of the transmission shown in FIG. 162. FIG. 165 shows how the elements are coupled into first through fifth rotational members in the transmission shown in FIG. 164.

Figures 166, 167:
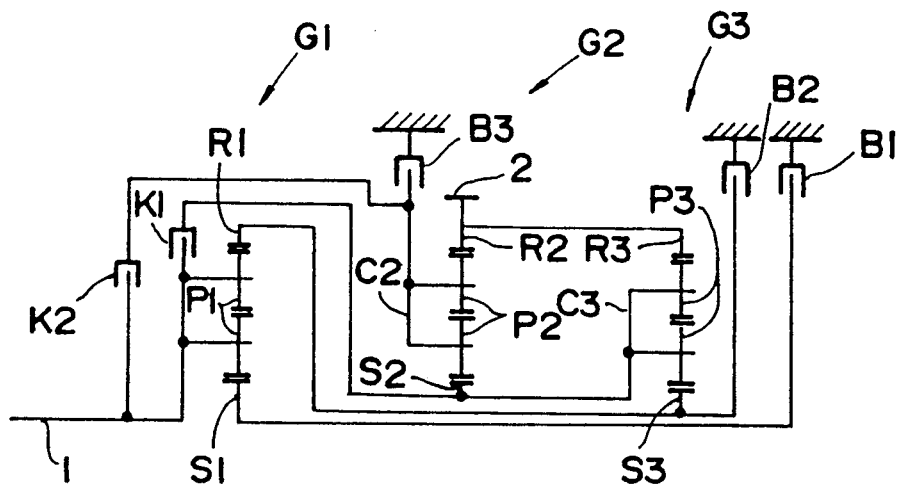

FIG. 166 shows a skelton of a planetary gear transmission according to a 80th embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 167 shows how the elements are coupled into first through fifth rotational members.

The sun gear S1 serves as first rotational member. The ring gear R1 and the sun gear S3 jointly serve as second rotational member. The carrier C2 serves as third rotational member. The ring gear R2 and the ring gear R3 jointly serve as fourth rotational member. The carrier C1, the sun gear S2 and the carrier C3 jointly serve as fifth rotational member.

Figures 168, 169:
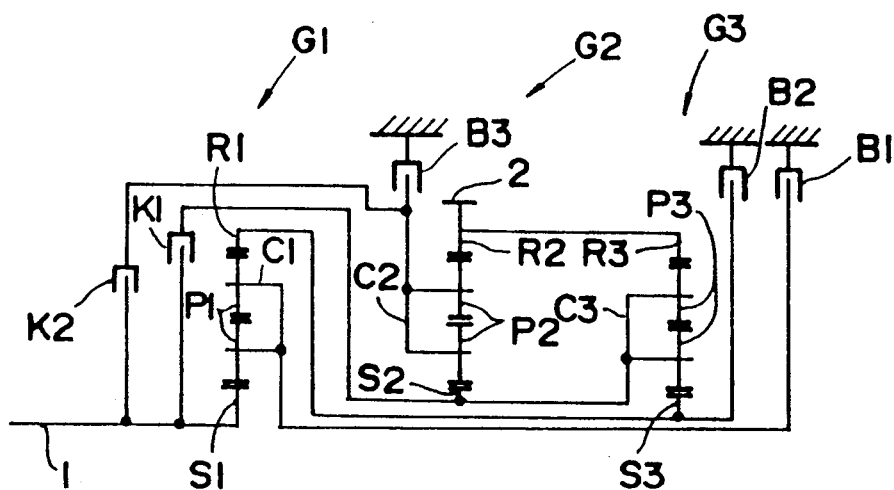

FIG. 168 shows a skelton of a planetary gear transmission according to a 81st embodiment. The transmission shown in FIG. 168 differs from the transmission shown in FIG. 166 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 168 are identical to those of the transmission shown in FIG. 166. FIG. 169 shows how the elements are coupled into first through fifth rotational members in the transmission shown in FIG. 168.

Figures 170, 171:
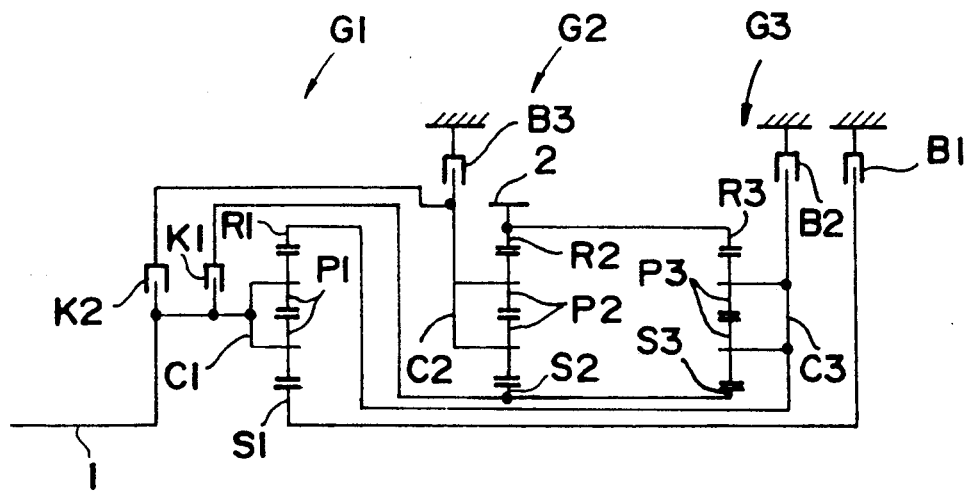

FIG. 170 shows a skelton of a planetary gear transmission according to a 82nd embodiment. The transmission has first, second and third planetary gear trains G1, G2, G3 which are coaxially arranged parallel to each other, and all of the planetary gear trains G1, G2, G3 comprise double-pinion planetary gear trains, respectively.

The first sun gear S1 is disengageably coupled to a stationary member by the first brake B1, and the first carrier C1 is securely connected to an input shaft 1. FIG. 171 shows how the elements are coupled into first through fifth rotational members.

The sun gear S1 serves as first rotational member. The ring gear R1 and the carrier C3 jointly serve as second rotational member. The carrier C2 serves as third rotational member. The ring gear R2 and the ring gear R3 jointly serve as fourth rotational member. The carrier C1, the sun gear S2 and the sun gear S3 jointly serve as fifth rotational member.

Figures 172, 173:
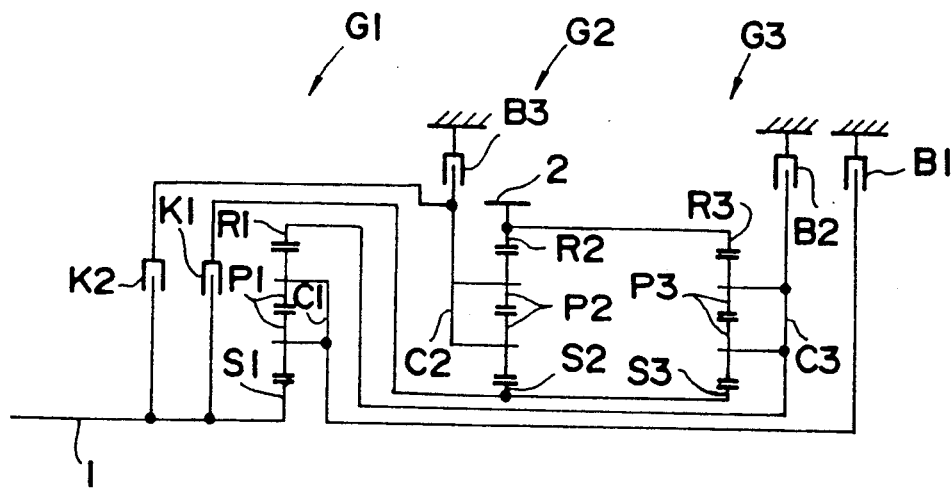

FIG. 172 shows a skelton of a planetary gear transmission according to a 83rd embodiment. The transmission shown in FIG. 172 differs from the transmission shown in FIG. 170 only as to the first planetary gear train G1. Specifically, the first sun gear S1 is securely coupled to the input shaft 1, and the first carrier C1 is disengageably coupled to a stationary member by the first brake B1. The other details of the transmission shown in FIG. 172 are identical to those of the transmission shown in FIG. 170. FIG. 173 shows how the elements are coupled into first through fifth rotational members in the transmission shown in FIG. 170.

What is claimed is:

1. A planetary gear transmission comprising:
   an input member;
   first, second, and third planetary gear trains arranged coaxially with each other and each having elements including a sun gear, a carrier, and a ring gear, two of the elements of each of said first, second, and third planetary gear trains being directly disengageably coupled to elements of the other planetary gear trains;
   an output member;
   a first and a second clutch means and a first, a second and a third brake means for selectively establishing a power transmitting path from said input member to said output member through said first, second, and third planetary gear trains; and
   said first planetary gear train comprising a double-pinion planetary gear train, one of the sun gear and the carrier of said double-pinion planetary gear train being fixedly coupled to said input member and the other of said sun gear and said carrier being disengageably connected to a stationary member through said first brake means,
   at least one of said first and second clutch means connected between an element of one of said first, second and third planetary gear trains and an element of another of said first, second and third planetary gear trains for selectively connecting those two elements,
   said elements of the first, second, and third planetary gear trains being corotatably coupled into first, second, third, fourth and fifth rotational members in a speed diagram for establishing five forward speeds and one reverse speed through the transmission, said third and fifth rotatable members being coupled to said input member, and said fourth rotational member being coupled to said output member.

2. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 1st, 2nd and 3rd rotational members, the three elements of the third planetary gear train G3 are respectively coupled to one of the 1st, 2nd and 4th rotational members, and one of the elements coupled to the first rotational member in the first planetary gear train G1 being disengageably connected to one of the elements coupled to the first rotational member in the second planetary gear train G2 by the first clutch means K1.

3. A planetary gear transmission according to claim 2, wherein said first planetary gear train G1, comprises a double-pinion planetary gear train, and said second and third planetary gear trains G2, G3 comprise single-pinion planetary gear trains;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the ring gear R3 of said third planetary gear train G3 serving as said fourth rotational member; and the carrier C1 of said first planetary gear train G1 serving as said fifth rotational member.

4. A planetary gear transmission according to claim 2, wherein said first planetary gear train G1, comprises a double-pinion planetary gear train, and said second and third planetary gear trains G2, G3 comprise single-pinion planetary gear trains;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the ring gear R3 of said third planetary gear train G3 serving as said fourth rotational member; and the sun gear S1 of said first planetary gear train G1 serving as said fifth rotational member.

5. A planetary gear transmission according to claim 2, wherein said first and third planetary gear trains G1, G3 comprise double-pinion planetary gear trains, respectively, and said second planetary gear train G2 comprises single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the carrier C3 of said third planetary gear train G3 serving as said fourth rotational member; and the carrier C1 of said first planetary gear train G1 serving as said fifth rotational member.

6. A planetary gear transmission according to claim 2, wherein said first and third planetary gear trains G1, G3 comprise a double-pinion planetary gear trains, respectively, and said second planetary gear train G2 comprise a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the carrier C3 of said third planetary gear train G3 serving as said fourth rotational member; and the sun gear S1 of said first planetary gear train G1 serving as said fifth rotational member.

7. A planetary gear transmission according to claim 2, wherein said first and third planetary gear trains G1, G3 comprise double-pinion planetary gear trains, respectively, and said second planetary gear train G2 comprise a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the carrier C3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S3 of said third planetary gear train G3 serving as said fourth rotational member; and the carrier C1 of said first planetary gear train G1 serving as said fifth rotational member.

8. A planetary gear transmission according to claim 2, wherein said first and third planetary gear trains G1, G3 comprise double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the carrier C3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S3 of said third planetary gear train G3 serving as said fourth rotational member; and the sun gear S1 of said first planetary gear train G1 serving as said fifth rotational member.

9. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 1st, 2nd and 3rd rotational members, the three elements of the third planetary gear train G3 are respectively coupled to one of the 2nd, 3rd and 4th rotational members, and one of the element coupled to the first rotational member in the first planetary gear train G1 being disengageably connected to one of the element coupled to the first rotational member in the second planetary gear train G2 by the first clutch means K1.

10. A planetary gear transmission according to claim 9, wherein said first and third planetary gear trains G1, G3 comprise double-pinion planetary gear trains, respectively, and said second planetary gear train G2 comprises a single-pinion planetary gear train;

the carrier C1 of said first planetary gear train G1 being coupled to said input member 1 and the sun gear S1 of said first planetary gear train 61 being disengageably coupled to a stationary member by the first brake B1;

the sun gear S1 of said first planetary gear train G1 and the sun gear S2 of said second planetary gear train G2 jointly serving as said first rotational member;

the ring gear R1 of said first planetary gear train G1, the carrier C2 of said second planetary gear train G2 and the sun gear S3 of said third planetary gear train G3 jointly serving as said second rotational member;

the ring gear R2 of said second planetary gear train G2 and the ring gear R3 of said third planetary gear train G3 jointly serving as said third rotational member;

the carrier C3 of said third planetary gear train G3 serving as said fourth rotational member; and the carrier C1 of said first planetary gear train G1 serving as said fifth rotational member.

11. A planetary gear transmission according to claim 9, wherein said first and third planetary gear trains G1, G3 comprises a double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, and the sun gear S2 of said second planetary gear train G2 jointly serving as said first rotational member;

the ring gear R1 of said first planetary gear train G1, the carrier C2 of said second planetary gear train G2 and the sun gear S3 of said third planetary gear train G3 jointly serving as said second rotational member;

the ring gear R2 of said second planetary gear train G2 and the ring gear R3 of said third planetary gear train G3 jointly serving as said third rotational member;

the carrier C3 of said third planetary gear train G3 serving as said fourth rotational member; and the sun gear S1 of said first planetary gear train G1 serving as said fifth rotational member.

12. A planetary gear transmission according to claim 9, wherein said first and third planetary gear trains G1, G3 comprise double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the sun gear S1 of said first planetary gear train G1 and the sun gear S2 of said second planetary gear train G2 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S3 of said third planetary gear train G3 serving as said fourth rotational member; and the carrier C1 of said first planetary gear train G1 serving as said fifth rotational member.

13. A planetary gear transmission according to claim 9, wherein said first and third planetary gear trains G1, G3 comprise double-pinion planetary gear trains, respectively, and said second planetary gear train G2 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the carrier C1 of said first planetary gear train G1, and the sun gear S1 of said second planetary gear train G2 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S3 of said third planetary gear train G3 serving as said fourth rotational member; and the sun gear S1 of said first planetary gear train G1 serving as said fifth rotational member.

14. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 1st, 2nd and 4th rotational members, and one of the element coupled to the first rotational member in the first planetary gear train G1 being disengageably connected to one of the element coupled to the first rotational member in the third planetary gear train G3 by the first clutch means K1.

15. A planetary gear transmission according to claim 14, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, and the sun gear S3 of said third planetary gear train G3 jointly serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1 serving as said fifth rotational member.

16. A planetary gear transmission according to claim 14, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

The carrier C1 of said first planetary gear train G1, and the sun gear S3 of said third planetary gear train G3 jointly serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1 serving as said fifth rotational member.

17. A planetary gear transmission according to claim 14, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the sun gear S2 of said second planetary gear train G2 and the ring gear R3 of said third planetary gear train G3 jointly serving as said fourth rotational member; and the carrier C1 of said first planetary gear train G1 serving as said fifth rotational member.

18. A planetary gear transmission according to claim 14, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

The carrier C1 of said first planetary gear train G1 and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the sun gear S2 of said second planetary gear train G2 and the ring gear R3 of said third planetary gear train G3 jointly serving as said fourth rotational member; and the sun gear S1 of said first planetary gear train G1 serving as said fifth rotational member.

19. A planetary gear transmission according to claim 14, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, and the sun gear S3 of said third planetary gear train G3 jointly serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 serving as said third rotational member;

the carrier C2 of said second planetary gear train G2 and the carrier C3 of said third planetary gear train G3 jointly serving as said fourth rotational member; and the sun gear S1 of said first planetary gear train G1 serving as said fifth rotational member.

20. A planetary gear transmission according to claim 14, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S2 of said second planetary gear train G2 and the carrier C3 of said third planetary gear train G3 jointly serving as said fourth rotational member; and the carrier C1 of said first planetary gear train G1 serving as said fifth rotational member.

21. A planetary gear transmission according to claim 14, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S2 of said second planetary gear train G2 and the carrier C3 of said third planetary gear train G3 jointly serving as said fourth rotational member; and the sun gear S1 of said first planetary gear train G1 serving as said fifth rotational member.

22. A planetary gear transmission according to claim 14, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, and the carrier C3 of said third planetary gear train G3 jointly serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 serving as said third rotational member;

the carrier C2 of said second planetary gear train G2 and the sun gear S3 of said third planetary gear train G3 jointly serving as said fourth rotational member; and the sun gear S1 of said first planetary gear train G1 serving as said fifth rotational member.

23. A planetary gear transmission according to claim 14, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

The sun gear S1 of said first planetary gear train G1, and the carrier C3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S2 of said second planetary gear train G2 and the sun gear S3 of said third planetary gear train G3 jointly serving as said fourth rotational member; and the carrier C1 of said first planetary gear train G1 serving as said fifth rotational member.

24. A planetary gear transmission according to claim 14, wherein said first, second and third planetary gear trains G1, G2, G3 comprise double-pinion planetary gear trains, respectively;
the sun gear S1 of said first planetary gear train G1 being coupled to said input member 1 and the carrier C1 of said first planetary gear train G1 being disengageably coupled to a stationary member by the first brake B1;
the carrier C1 of said first planetary gear train G1, and the carrier C3 of said third planetary gear train G3 jointly serving as said first rotational member;
the ring gear R1 of said first planetary gear train G1, the carrier C2 of said second planetary gear train G2 and the ring gear R3 of said third planetary gear train G3 jointly serving as said second rotational member;
the ring gear R2 of said second planetary gear train G2 serving as said third rotational member;
the sun gear S2 of said second planetary gear train G2 and the sun gear S3 of said third planetary gear train G3 jointly serving as said fourth rotational member; and
the sun gear S1 of said first planetary gear train G1 serving as said fifth rotational member.

25. A planetary gear transmission according to claim 1, wherein the three elements of the first planetary gear train G1 are respectively coupled to one of the 1st, 2nd and 5th rotational members,
the three elements of the second planetary gear train G2 are respectively coupled to one of the 2nd, 3rd and 4th rotational members,
the three elements of the third planetary gear train G3 are respectively coupled to one of the 2nd, 3rd and 5th rotational members, and
one of the element coupled to the second rotational member in the second planetary gear train G2 being disengageably connected to one of the element coupled to the second rotational member in the third planetary gear train G3 by the first clutch means K1.

26. A planetary gear transmission according to claim 25, wherein said first and second planetary gear trains G1, G2 comprise double-pinion planetary gear trains, respectively, and said third planetary gear train G3 comprises a single-pinion planetary gear train;
the carrier C1 of said first planetary gear train G1 being coupled to said input member 1 and the sun gear S1 of said first planetary gear train G1 being disengageably coupled to a stationary member by the first brake B1;
the sun gear S1 of said first planetary gear train G1 serving as said first rotational member;
the ring gear R1 of said first planetary gear train G1, the sun gear S2 of said second planetary gear train G2 and the ring gear R3 of said third planetary gear train G3 jointly serving as said second rotational member;
the ring gear R2 of said second planetary gear train G2 and the carrier C3 of said third planetary gear train G3 jointly serving as said third rotational member;
the carrier C2 of said second planetary gear train G2 serving as said fourth rotational member; and
the carrier C1 of said first planetary gear train G1 and the sun gear S3 of said third planetary gear train G3 jointly serving as said fifth rotational member.

27. A planetary gear transmission according to claim 25, wherein said first and second planetary gear trains G1, G2 comprise double-pinion planetary gear trains, respectively, and said third planetary gear train G3 comprises a single-pinion planetary gear train;
the sun gear S1 of said first planetary gear train G1 being coupled to said input member 1 and the carrier C1 of said first planetary gear train G1 being disengageably coupled to a stationary member by the first brake B1;
the carrier C1 of said first planetary gear train G1 serving as said first rotational member;
the ring gear R1 of said first planetary gear train G1, the sun gear S2 of said second planetary gear train G2 and the ring gear R3 of said third planetary gear train G3 jointly serving as said second rotational member;
the ring gear R2 of said second planetary gear train G2 and the carrier C3 of said third planetary gear train G3 jointly serving as said third rotational member;
the carrier C2 of said second planetary gear train G2 serving as said fourth rotational member; and
the sun gear S1 of said first planetary gear train G1 and the sun gear S3 of said third planetary gear train G3 jointly serving as said fifth rotational member.

28. A planetary gear transmission according to claim 25, wherein said first, second and third planetary gear trains G1, G2, G3 comprise double-pinion planetary gear trains, respectively;
the carrier C1 of said first planetary gear train G1 being coupled to said input member 1 and the sun gear S1 of said first planetary gear train G1 being disengageably coupled to a stationary member by the first brake B1;
the sun gear S1 of said first planetary gear train G1 serving as said first rotational member;
the ring gear R1 of said first planetary gear train G1, the sun gear S2 of said second planetary gear train G2 and the carrier C3 of said third planetary gear train G3 jointly serving as said second rotational member;
the ring gear R2 of said second planetary gear train G2 and the ring gear R3 of said third planetary gear train G3 jointly serving as said third rotational member;
the carrier C2 of said second planetary gear train G2 serving as said fourth rotational member; and
the carrier C1 of said first planetary gear train G1 and the sun gear S3 of said third planetary gear train G3 jointly serving as said fifth rotational member.

29. A planetary gear transmission according to claim 25, wherein said first, second and third planetary gear trains G1, G2, G3 comprise double-pinion planetary gear trains, respectively;
the sun gear S1 of said first planetary gear train G1 being coupled to said input member 1 and the carrier C1 of said first planetary gear train G1 being disengageably coupled to a stationary member by the first brake B1;
the carrier C1 of said first planetary gear train G1 serving as said first rotational member;
the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the carrier C2 of said second planetary gear train G2 serving as said fourth rotational member; and the sun gear S1 of said first planetary gear train G1 and the sun gear S3 of said third planetary gear train G3 jointly serving as said fifth rotational member.

30. A planetary gear transmission according to claim 25, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

31. A planetary gear transmission according to claim 25, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

32. A planetary gear transmission according to claim 25, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

33. A planetary gear transmission according to claim 25, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

34. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 2nd, 4th and 5th rotational members, and one of the element coupled to the second rotational member in the second planetary gear train G2 being disengageably connected to one of the element coupled to the second rotational member in the third planetary gear train G3 by the first clutch means K1.

35. A planetary gear transmission according to claim 34, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1 and the carrier C3 of said third planetary gear train G3 jointly serving as said fifth rotational member.

36. A planetary gear transmission according to claim 34, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1 and the carrier C3 of said third planetary gear train G3 jointly serving as said fifth rotational member.

37. A planetary gear transmission according to claim 34, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1 and the sun gear S3 of said third planetary gear train G3 jointly serving as said fifth rotational member.

38. A planetary gear transmission according to claim 34, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

39. A planetary gear transmission according to claim 34, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the sun gear S2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

40. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 2nd, 3rd and 5th rotational members, one of the element coupled to the third rotational member in the second planetary gear train G2 being disengageably connected to one of the element coupled to the third rotational member in the third planetary gear train G3 by the first clutch means K1.

41. A planetary gear transmission according to claim 40, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the carrier C2 of said second planetary gear train G2 serving as said fourth rotational member; and the carrier C1 of said first planetary gear train G1 and the sun gear S3 of said third planetary gear train G3 jointly serving as said fifth rotational member.

42. A planetary gear transmission according to claim 40, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the carrier C2 of said second planetary gear train G2 serving as said fourth rotational member; and the sun gear S1 of said first planetary gear train G1 and the sun gear S3 of said third planetary gear train G3 jointly serving as said fifth rotational member.

43. A planetary gear transmission according to claim 40, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the carrier C2 of said second planetary gear train G2 serving as said fourth rotational member; and the carrier C1 of said first planetary gear train G1 and the sun gear S3 of said third planetary gear train G3 jointly serving as said fifth rotational member.

44. A planetary gear transmission according to claim 40, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the carrier C2 of said second planetary gear train G2 serving as said fourth rotational member; and the sun gear S1 of said first planetary gear train G1 and the sun gear S3 of said third planetary gear train G3 jointly serving as said fifth rotational member.

45. A planetary gear transmission according to claim 40, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

46. A planetary gear transmission according to claim 40, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

47. A planetary gear transmission according to claim 40, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

48. A planetary gear transmission according to claim 40, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

49. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 3rd, 4th and 5th rotational members, and one of the element coupled to the third rotational member in the second planetary gear train G2 being disengageably connected to one of the element coupled to the third rotational member in the third planetary gear train G3 by the first clutch means K1.

50. A planetary gear transmission according to claim 49, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the ring gear R3 of said third planetary gear train G3 jointly serving as said third rotational member;

the carrier C2 of said second planetary gear train G2 and the carrier C3 of said third planetary gear train G3 jointly serving as said fourth member; and the carrier C1 of said first planetary gear train G1 and the sun gear S3 of said third planetary gear train G3 jointly serving as said fifth rotational member.

51. A planetary gear transmission according to claim 49, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the ring gear R3 of said third planetary gear train G3 jointly serving as said third rotational member;

the carrier C2 of said second planetary gear train G2 and the carrier C3 of said third planetary gear train G3 jointly serving as said fourth rotational member; and the sun gear S1 of said first planetary gear train G1 and the sun gear S3 of said third planetary gear train G3 jointly serving as said fifth rotational member.

52. A planetary gear transmission according to claim 49, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S1 of said second planetary gear train G2 jointly serving as said second rotational member;

the ring gear R2 of said second planetary gear train G2 and the carrier C3 of said third planetary gear train G3 jointly serving as said third rotational member;

the carrier C2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

53. A planetary gear transmission according to claim 49, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the carrier C3 of said third planetary gear train G3 jointly serving as said third rotational member;

the carrier C2 of said second planetary gear train G2 and the ring gear R3 of said third planetary gear train G3 jointly serving as said fourth rotational member; and the sun gear S1 of said first planetary gear train G1 and the sun gear S3 of said third planetary gear train G3 jointly serving as said fifth rotational member.

54. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 2nd, 3rd and 5th rotational members, one of the element coupled to the fifth rotational member in the first planetary gear train G1 being disengageably connected to one of the element coupled to the fifth rotational member in the third planetary gear train G3 by the first clutch means K1.

55. A planetary gear transmission according to claim 54, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the carrier C2 of said second planetary gear train G2 serving as said fourth rotational member; and the carrier C1 of said first planetary gear train G1 and the sun gear S3 of said third planetary gear train G3 jointly serving as said fifth rotational member.

56. A planetary gear transmission according to claim 54, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the carrier C2 of said second planetary gear train G2 serving as said fourth rotational member; and the sun gear S1 of said first planetary gear train G1 and the sun gear S3 of said third planetary gear train G3 jointly serving as said fifth rotational member.

57. A planetary gear transmission according to claim 54, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the carrier C2 of said second planetary gear train G2 serving as said fourth rotational member; and the carrier C1 of said first planetary gear train G1 and the sun gear S3 of said third planetary gear train G3 jointly serving as said fifth rotational member.

58. A planetary gear transmission according to claim 54, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the carrier C2 of said second planetary gear train G2 serving as said fourth rotational member; and the sun gear S1 of said first planetary gear train G1 and the sun gear S3 of said third planetary gear train G3 jointly serving as said fifth rotational member.

59. A planetary gear transmission according to claim 54, wherein said first and second planetary gear trains G1, G2 comprise double-pinion planetary gear trains, respectively, and said third planetary gear train G3 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

60. A planetary gear transmission according to claim 54, wherein said first and second planetary gear trains G1, G2 comprise double-pinion planetary gear trains, respectively, and said third planetary gear train G3 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 and the carrier C3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

61. A planetary gear transmission according to claim 54, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the carrier C1 of said first planetary gear train G1 and the sun gear S3 of said third planetary gear train G3 jointly serving as said fifth rotational member.

62. A planetary gear transmission according to claim 54, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 and the ring gear R3 of said third planetary gear train G3 jointly serving as said third rotational member;

the sun gear S2 of said second planetary gear train G2 serving as said fourth rotational member; and the sun gear S1 of said first planetary gear train G1 and the sun gear S3 of said third planetary gear train G3 jointly serving as said fifth rotational member.

63. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 4th rotational members, the three elements of the third planetary gear train G3 are respectively coupled to one of the 2nd, 4th and 5th rotational members, and one of the element coupled to the fifth rotational member in the first planetary gear train G1 being disengageably connected to one of the element coupled to the fifth rotational member in the third planetary gear train G3 by the first clutch means K1.

64. A planetary gear transmission according to claim 63, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1, the sun gear S2 of said second planetary gear train G2 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1 and the carrier C3 of said third planetary gear train G3 jointly serving as said fifth rotational member.

65. A planetary gear transmission according to claim 63, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1, the sun gear S2 of said second planetary gear train G2 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1 and the carrier C3 of said third planetary gear train G3 jointly serving as said fifth rotational member.

66. A planetary gear transmission according to claim 63, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

The sun gear S1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

67. A planetary gear transmission according to claim 63, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

The carrier C1 of said first planetary gear train G1 serving as said first rotational member;

the ring gear R1 of said first planetary gear train G1, the sun gear S2 of said second planetary gear train G2 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1 and the sun gear S3 of said third planetary gear train G3 jointly serving as said fifth rotational member.

68. A planetary gear transmission according to claim 63, wherein said first, second and third planetary gear trains G1, G2, G3 comprise double-pinion planetary gear trains, respectively;
the carrier C1 of said first planetary gear train G1 being coupled to said input member 1 and the sun gearc S1 of said first planetary gear train G1 being disengageably coupled to a stationary member by the first brake B1;
The sun gear S1 of said first planetary gear train G1 serving as said first rotational member;
the ring gear R1 of said first planetary gear train G1, the carrier C2 of said second planetary gear train G2 and the sun gear S3 of said third planetary gear train G3 jointly serving as said second rotational member;
the ring gear R2 of said second planetary gear train G2 serving as said third rotational member;
the sun gear S2 of said second planetary gear train G2 and the ring gear R3 of said third planetary gear train G3 jointly serving as said fourth rotational member; and
the carrier C1 of said first planetary gear train G1 and the carrier C3 of said third planetary gear train G3 jointly serving as said fifth rotational member.

69. A planetary gear transmission according to claim 63, wherein said first, second and third planetary gear trains G1, G2, G3 comprise double-pinion planetary gear trains, respectively;
the carrier C1 of said first planetary gear train G1 being coupled to said input member 1 and the sun gear S1 of said first planetary gear train G1 being disengageably coupled to a stationary member by the first brake B1;
The sun gear S1 of said first planetary gear train G1 serving as said first rotational member;
the ring gear R1 of said first planetary gear train G1, the carrier C2 of said second planetary gear train G2 and the carrier C3 of said third planetary gear train G3 jointly serving as said second rotational member;
the ring gear R2 of said second planetary gear train G2 serving as said third rotational member;
the sun gear S2 of said second planetary gear train G2 and the ring gear R3 of said third planetary gear train G3 jointly serving as said fourth rotational member; and
the carrier C1 of said first planetary gear train G1 and the sun gear S3 of said third planetary gear train G3 jointly serving as said fifth rotational member.

70. A planetary gear transmission according to claim 63, wherein said first, second and third planetary gear trains G1, G2, G3 comprise double-pinion planetary gear trains, respectively;
the sun gear S1 of said first planetary gear train G1 being coupled to said input member 1 and the carrier C1 of said first planetary gear train G1 being disengageably coupled to a stationary member by the first brake B1;
the carrier C1 of said first planetary gear train G1 serving as said first rotational member;
the ring gear R1 of said first planetary gear train G1, the carrier C2 of said second planetary gear train G2 and the carrier C3 of said third planetary gear train G3 jointly serving as said second rotational member;
the ring gear R2 of said second planetary gear train G2 serving as said third rotational member;
the sun gear S2 of said second planetary gear train G2 and the ring gear R3 of said third planetary gear train G3 jointly serving as said fourth rotational member; and
the sun gear S1 of said first planetary gear train G1 and the sun gear S3 of said third planetary gear train G3 jointly serving as said fifth rotational member.

71. A planetary gear transmission according to claim 1, wherein the three elements of the first planetary gear train G1 are respectively coupled to one of the 1st, 2nd and 5th rotational members,
the three elements of the second planetary gear train G2 are respectively coupled to one of the 2nd, 3rd and 4th rotational members,
the three elements of the third planetary gear train G3 are respectively coupled to one of the 3rd, 4th and 5th rotational members, and
one of the element coupled to the fifth rotational member in the first planetary gear train G1 being disengageably connected to one of the element coupled to the fifth rotational member in the third planetary gear train G3 by the first clutch means K1.

72. A planetary gear transmission according to claim 71, wherein said first and second planetary gear trains G1, G2 comprise double-pinion planetary gear trains, respectively, and said third planetary gear train G3 comprises a single-pinion planetary gear train;
the carrier C1 of said first planetary gear train G1 being coupled to said input member 1 and the sun gear S1 of said first planetary gear train G1 being disengageably coupled to a stationary member by the first brake B1;
The sun gear S1 of said first planetary gear train G1 serving as said first rotational member;
the ring gear R1 of said first planetary gear train G1 and the sun gear S2 of said second planetary gear train G2 jointly serving as said second rotational member;
the ring gear R2 of said second planetary gear train G2 and the ring gear R3 of said third planetary gear train G3 jointly serving as said third rotational member;
the carrier C2 of said second planetary gear train G2 and the carrier C3 of said third planetary gear train G3 jointly serving as said fourth rotational member; and
the carrier C1 of said first planetary gear train G1 and the sun gear S3 of said third planetary gear train G3 jointly serving as said fifth rotational member.

73. A planetary gear transmission according to claim 71, wherein said first and second planetary gear trains G1, G2 comprise double-pinion planetary gear trains, respectively, and said third planetary gear train G3 comprises a single-pinion planetary gear train;
the sun gear S1 of said first planetary gear train G1 being coupled to said input member 1 and the carrier C1 of said first planetary gear train G1 being disengageably coupled to a stationary member by the first brake B1;
the carrier C1 of said first planetary gear train G1 serving as said first rotational member;
the ring gear R1 of said first planetary gear train G1 and the sun gear S2 of said second planetary gear train G2 jointly serving as said second rotational member;

the ring gear R2 of said second planetary gear train G2 and the ring gear R3 of said third planetary gear train G3 jointly serving as said third rotational member;

the carrier C2 of said second planetary gear train G2 and the carrier C3 of said third planetary gear train G3 jointly serving as said fourth rotational member; and the sun gear S1 of said first planetary gear train G1 and the sun gear S3 of said third planetary gear train G3 jointly serving as said fifth rotational member.

74. A planetary gear transmission according to claim 71, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the carrier C3 of said third planetary gear train G3 jointly serving as said third rotational member;

the carrier C2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

75. A planetary gear transmission according to claim 71, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S2 of said second planetary gear train G2 jointly serving as said second rotational member;

the ring gear R2 of said second planetary gear train G2 and the carrier C3 of said third planetary gear train G3 jointly serving as said third rotational member;

the carrier C2 of said second planetary gear train G2 and the ring gear R3 of said third planetary gear train G3 jointly serving as said fourth rotational member; and the sun gear S1 of said first planetary gear train G1 and the sun gear S3 of said third planetary gear train G3 jointly serving as said fifth rotational member.

76. A planetary gear transmission according to claim 71, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the carrier C2 of said second planetary gear train G2 jointly serving as said second rotational member;

the ring gear R2 of said second planetary gear train G2 and the carrier C3 of said third planetary gear train G3 jointly serving as said third rotational member;

the sun gear S2 of said second planetary gear train G2 and the ring gear R3 of said third planetary gear train G3 jointly serving as said fourth rotational member; and the carrier C1 of said first planetary gear train G1 and the sun gear S3 of said third planetary gear train G3 jointly serving as said fifth rotational member.

77. A planetary gear transmission according to claim 71, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the carrier C2 of said second planetary gear train G2 jointly serving as said second rotational member;

the ring gear R2 of said second planetary gear train G2 and the carrier C3 of said third planetary gear train G3 jointly serving as said third rotational member;

the sun gear S2 of said second planetary gear train G2 and the ring gear R3 of said third planetary gear train G3 jointly serving as said fourth rotational member; and the sun gear S1 of said first planetary gear train G1 and the sun gear S3 of said third planetary gear train G3 jointly serving as said fifth rotational member.

78. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 2nd, 3rd and 5th rotational members, the three elements of the third planetary gear train G3 are respectively coupled to one of the 2nd, 4th and 5th rotational members, one of the element coupled to the fifth rotational member in the first planetary gear train G1 being disengageably connected to one of the element coupled to the fifth rotational member in the second planetary gear train G2 by the first clutch means K1.

79. A planetary gear transmission according to claim 78, wherein said first planetary gear train G1 comprises a double-pinion planetary gear train, and said second and third planetary gear trains G2, G3 comprise single-pinion planetary gear trains;
   the carrier C1 of said first planetary gear train G1 being coupled to said input member 1 and the sun gear S1 of said first planetary gear train G1 being disengageably coupled to a stationary member by the first brake B1;
   the sun gear S1 of said first planetary gear train G1 serving as said first rotational member;
   the ring gear R1 of said first planetary gear train G1, the ring gear R2 of said second planetary gear train G2 and the carrier C3 of said third planetary gear train G3 jointly serving as said second rotational member;
   the carrier C2 of said second planetary gear train G2 serving as said third rotational member;
   the ring gear R3 of said third planetary gear train G3 serving as said fourth rotational member; and
   the carrier C1 of said first planetary gear train G1, the sun gear S2 of said second planetary gear train G2 and the sun gear S3 of said third planetary gear train G3 jointly serving as said fifth rotational member.

80. A planetary gear transmission according to claim 78, wherein said first planetary gear train G1 comprises a double-pinion planetary gear train, and said second and third planetary gear trains G2, G3 comprise single-pinion planetary gear trains;
   the sun gear S1 of said first planetary gear train G1 being coupled to said input member 1 and the carrier C1 of said first planetary gear train G1 being disengageably coupled to a stationary member by the first brake B1;
   the carrier C1 of said first planetary gear train G1 serving as said first rotational member;
   the ring gear R1 of said first planetary gear train G1, the ring gear R2 of said second planetary gear train G2 and the carrier C3 of said third planetary gear train G3 jointly serving as said second rotational member;
   the carrier C2 of said second planetary gear train G2 serving as said third rotational member;
   the ring gear R3 of said third planetary gear train G3 serving as said fourth rotational member; and
   the sun gear S1 of said first planetary gear train G1, the sun gear S2 of said second planetary gear train G2 and the sun gear S3 of said third planetary gear train G3 jointly serving as said fifth rotational member.

81. A planetary gear transmission according to claim 78, wherein said first, second and third planetary gear trains G1, G2, G3 comprise double-pinion planetary gear trains, respectively;
   the carrier C1 of said first planetary gear train G1 being coupled to said input member 1 and the sun gear S1 of said first planetary gear train G1 being disengageably coupled to a stationary member by the first brake B1;
   the sun gear S1 of said first planetary gear train G1 serving as said first rotational member;
   the ring gear R1 of said first planetary gear train G1 and the carrier C2 of said second planetary gear train G2 and the sun gear S3 of said third planetary gear train G3 jointly serving as said second rotational member;
   the ring gear R2 of said second planetary gear train G2 serving as said third rotational member;
   the ring gear R3 of said third planetary gear train G3 serving as said fourth rotational member; and
   the carrier C1 of said first planetary gear train G1, the sun gear S2 of said second planetary gear train G2 and the carrier C3 of said third planetary gear train G3 jointly serving as said fifth rotational member.

82. A planetary gear transmission according to claim 78, wherein said first, second and third planetary gear trains G1, G2, G3 comprise double-pinion planetary gear trains, respectively;
   the carrier C1 of said first planetary gear train G1 being coupled to said input member 1 and the sun gear S1 of said first planetary gear train G1 being disengageably coupled to a stationary member by the first brake B1;
   the sun gear S1 of said first planetary gear train G1 serving as said first rotational member;
   the ring gear R1 of said first planetary gear train G1, the carrier C2 of said second planetary gear train G2 and the carrier C3 of said third planetary gear train G3 jointly serving as said second rotational member;
   the ring gear R2 of said second planetary gear train G2 serving as said third rotational member;
   the ring gear R3 of said third planetary gear train G3 serving as said fourth rotational member; and
   the carrier C1 of said first planetary gear train G1, the sun gear S2 of said second planetary gear train G2 and the sun gear S3 of said third planetary gear train G3 jointly serving as said fifth rotational member.

83. A planetary gear transmission according to claim 78, wherein said first, second and third planetary gear trains G1, G2, G3 comprise double-pinion planetary gear trains, respectively;
   the sun gear S1 of said first planetary gear train G1 being coupled to said input member 1 and the carrier C1 of said first planetary gear train G1 being disengageably coupled to a stationary member by the first brake B1;
   the carrier C1 of said first planetary gear train G1 serving as said first rotational member;
   the ring gear R1 of said first planetary gear train G1, the carrier C2 of said second planetary gear train G2 and the carrier C3 of said third planetary gear train G3 jointly serving as said second rotational member;
   the ring gear R2 of said second planetary gear train G2 serving as said third rotational member;
   the ring gear R3 of said third planetary gear train G3 serving as said fourth rotational member; and
   the sun gear S1 of said first planetary gear train G1, the sun gear S2 of said second planetary gear train G2 and the sun gear S3 of said third planetary gear train G3 jointly serving as said fifth rotational member.

84. A planetary gear transmission according to claim 1, wherein the three elements of the first planetary gear train G1 are respectively coupled to one of the 1st, 2nd and 5th rotational members,
   the three elements of the second planetary gear train G2 are respectively coupled to one of the 2nd, 3rd and 5th rotational members, the three elements of the third planetary gear train G3 are respectively coupled to one of the 3rd, 4th and 5th rotational members, one of the element coupled to the fifth rotational member in the first planetary gear train G1 being disengageably connected to one of the element coupled to the fifth rotational member in the second planetary gear train G2 by the first clutch means K1.

85. A planetary gear transmission according to claim 84, wherein said first and third planetary gear trains G1, G3 comprise a double-pinion planetary gear trains, respectively, and said second planetary gear trains G2 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the ring gear R2 of said second planetary gear train G2 jointly serving as said second rotational member;

the carrier C2 of said second planetary gear train G2 and the carrier C3 of said third planetary gear train G3 jointly serving as said third rotational member;

the ring gear R3 of said third planetary gear train G3 serving as said fourth rotational member; and the carrier C1 of said first planetary gear train G1, the sun gear S2 of said second planetary gear train G2 and the sun gear S3 of said third planetary gear train G3 jointly serving as said fifth rotational member.

86. A planetary gear transmission according to claim 84, wherein said first and third planetary gear trains G1, G3 comprise double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the ring gear R2 of said second planetary gear train G2 jointly serving as said second rotational member;

the carrier C2 of said second planetary gear train G2 and the carrier C3 of said third planetary gear train G3 jointly serving as said third rotational member;

the ring gear R3 of said third planetary gear train G3 serving as said fourth rotational member; and the sun gear S1 of said first planetary gear train G1, the sun gear S2 of said second planetary gear train G2 and the sun gear S3 of said third planetary gear train G3 jointly serving as said fifth rotational member.

87. A planetary gear transmission according to claim 84, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the carrier C2 of said second planetary gear train G2 jointly serving as said second rotational member;

the ring gear R2 of said second planetary gear train G2 and the carrier C3 of said third planetary gear train G3 jointly serving as said third rotational member;

the ring gear R3 of said third planetary gear train G3 serving as said fourth rotational member; and the carrier C1 of said first planetary gear train G1, the sun gear S2 of said second planetary gear train G2 and the sun gear S3 of said third planetary gear train G3 jointly serving as said fifth rotational member.

88. A planetary gear transmission according to claim 84, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the carrier C2 of said second planetary gear train G2 jointly serving as said second rotational member;

the ring gear R2 of said second planetary gear train G2 and the carrier C3 of said third planetary gear train G3 jointly serving as said third rotational member;

the ring gear R3 of said third planetary gear train G3 serving as said fourth rotational member; and the sun gear S1 of said first planetary gear train G1, the sun gear S2 of said second planetary gear train G2 and the sun gear S3 of said third planetary gear train G3 jointly serving as said fifth rotational member.

89. A planetary gear transmission according to claim 1, wherein the three elements of the first planetary gear train G1 are respectively coupled to one of the 1st, 2nd and 5th rotational members, the three elements of the second planetary gear train G2 are respectively coupled to one of the 3rd, 4th and 5th rotational members, the three elements of the third planetary gear train G3 are respectively coupled to one of the 2nd, 4th and 5th rotational members, one of the element coupled to the fifth rotational member in the first planetary gear train G1 being disengageably connected to one of the element coupled to the fifth rotational member in the second planetary gear train G2 by the first clutch means K1.

90. A planetary gear transmission according to claim 89, wherein said first and third planetary gear trains G1, G3 comprise double-pinion planetary gear trains, respectively, and said second planetary gear train G2 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1, the sun gear S2 of said second planetary gear train G2 and the carrier C3 of said third planetary gear train G3 jointly serving as said fifth rotational member.

91. A planetary gear transmission according to claim 89, wherein said first and third planetary gear trains G1, G3 comprise double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1, the sun gear S2 of said second planetary gear train G2 and the carrier C3 of said third planetary gear train G3 jointly serving as said fifth rotational member.

92. A planetary gear transmission according to claim 89, wherein said first and third planetary gear trains G1, G3 comprise double-pinion planetary gear trains, respectively, and said second planetary gear trains G2 comprises a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the carrier C1 of said first planetary gear train G1, the sun gear S2 of said second planetary gear train G2 and the sun gear S3 of said third planetary gear train G3 jointly serving as said fifth rotational member.

93. A planetary gear transmission according to claim 89, wherein said first and third planetary gear trains G1, G3 comprise double-pinion planetary gear trains, respectively, and said second planetary gear trains G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the carrier C3 of said third planetary gear train G3 jointly serving as said second rotational member;

the ring gear R2 of said second planetary gear train G2 serving as said third rotational member;

the carrier C2 of said second planetary gear train G2 and the ring gear R3 of said third planetary gear train G3 jointly serving as said fourth rotational member; and the sun gear S1 of said first planetary gear train G1, the sun gear S2 of said second planetary gear train G2 and the sun gear S3 of said third planetary gear train G3 jointly serving as said fifth rotational member.

94. A planetary gear transmission according to claim 89, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the sun gear S3 of said third planetary gear train G3 jointly serving as said second rotational member;

the carrier C2 of said second planetary gear train G2 serving as said third rotational member;

the ring gear R2 of said second planetary gear train G2 and the ring gear R3 of said third planetary gear train G3 jointly serving as said fourth rotational member; and the carrier C1 of said first planetary gear train G1, the sun gear S2 of said second planetary gear train G2 and the carrier C3 of said third planetary gear train G3 jointly serving as said fifth rotational member.

95. A planetary gear transmission according to claim 89, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the sun gear S3 of said third planetary gear train G3 jointly serving as said second rotational member;

the carrier C2 of said second planetary gear train G2 serving as said third rotational member;

the ring gear R2 of said second planetary gear train G2 and the ring gear R3 of said third planetary gear train G3 jointly serving as said fourth rotational member; and the sun gear S1 of said first planetary gear train G1, the sun gear S2 of said second planetary gear train G2 and the carrier C3 of said third planetary gear train G3 jointly serving as said fifth rotational member.

96. A planetary gear transmission according to claim 89, wherein said first, second and third planetary gear trains G1, G2, G3 comprise double-pinion planetary gear trains, respectively;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1 serving as said first rotational member;

the ring gear R1 of said first planetary gear train G1 and the carrier C3 of said third planetary gear train G3 jointly serving as said second rotational member;

the carrier C2 of said second planetary gear train G2 serving as said third rotational member;

the ring gear R2 of said second planetary gear train G2 and the ring gear R3 of said third planetary gear train G3 jointly serving as said fourth rotational member; and the carrier C1 of said first planetary gear train G1, the sun gear S2 of said second planetary gear train G2 and the sun gear S3 of said third planetary gear train G3 jointly serving as said fifth rotational member.

97. A planetary gear transmission according to claim 89, wherein said first, second and third planetary gear trains G1, G2, G3 comprise double-pinion planetary gear trains, respectively;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1 serving as said first rotational member;

the ring gear R1 of said first planetary gear train G1 and the carrier C3 of said third planetary gear train G3 jointly serving as said second rotational member;

the carrier C2 of said second planetary gear train G2 serving as said third rotational member;

the ring gear R2 of said second planetary gear train G2 and the ring gear R3 of said third planetary gear train G3 jointly serving as said fourth rotational member; and the sun gear S1 of said first planetary gear train G1, the sun gear S2 of said second planetary gear train G2 and the sun gear S3 of said third planetary gear train G3 jointly serving as said fifth rotational member.

98. A planetary gear transmission comprising:

an input member;

first, second, and third planetary gear trains arranged coaxially with each other and each having elements including a sun gear, a carrier, and a ring gear, two of the elements of each of said first, second, and third planetary gear trains being directly or disengageably coupled to elements of the other planetary gear trains;

an output member;

a first and a second clutch means and a first, a second and a third brake means for selectively establishing a power transmitting path from said input member to said output member through said first, second, and third planetary gear trains;

said first planetary gear train comprising a double-pinion planetary gear train, one of the sun gear and the carrier of said double-pinion planetary gear train being coupled to said input member and the other of said sun gear and said carrier being disengageably connected to a stationary member through said first brake means;

said elements of the first, second, and third planetary gear trains being corotatably coupled into first, second, third, fourth, and fifth rotational members in a speed diagram, said third and fifth rotatable members being coupled to said input member, and said fourth rotational member being coupled to said output member; and wherein the three elements of the first planetary gear train G1 are respectively coupled to one of the 1st, 2nd and 5th rotational members, the three elements of the second planetary gear train G2 are respectively coupled to one of the 1st, 2nd and 3rd rotational members, the three elements of the third planetary gear train G3 are respectively coupled to one of the 1st, 2nd and 4th rotational members, and one of the elements coupled to the first rotational member in the first planetary gear train G1 being disengageably connected to one of the elements coupled to the first rotational member in the second planetary gear train G2 by the first clutch means K1.

99. A planetary gear transmission according to claim 98, wherein said first planetary gear train G1, comprises a double-pinion planetary gear train, and said second and third planetary gear trains G2, G3 comprise single-pinion planetary gear trains;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the ring gear R3 of said third planetary gear train G3 serving as said fourth rotational member; and the carrier C1 of said first planetary gear train G1 serving as said fifth rotational member.

100. A planetary gear transmission according to claim 98, wherein said first planetary gear train G1, comprises a double-pinion planetary gear train, and said second and third planetary gear trains G2, G3 comprise single-pinion planetary gear trains;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the carrier C3 of said third planetary gear train G3 jointly serving as said second rotational member;

the ring gear R2 of said second planetary gear train G2 serving as said third rotational member;

the ring gear R3 of said third planetary gear train G3 serving as said fourth rotational member; and the sun gear S1 of said first planetary gear train G1 serving as said fifth rotational member.

101. A planetary gear transmission according to claim 98, wherein said first and third planetary gear trains G1, G3 comprise double-pinion planetary gear trains, respectively, and said second planetary gear train G2 comprises single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the carrier C3 of said third planetary gear train G3 serving as said fourth rotational member; and the carrier C1 of said first planetary gear train G1 serving as said fifth rotational member.

102. A planetary gear transmission according to claim 98, wherein said first and third planetary gear trains G1, G3 comprise a double-pinion planetary gear trains, respectively, and said second planetary gear train G2 comprise a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the sun gear S3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the carrier C3 of said third planetary gear train G3 serving as said fourth rotational member; and the sun gear S1 of said first planetary gear train G1 serving as said fifth rotational member.

103. A planetary gear transmission according to claim 98, wherein said first and third planetary gear trains G1, G3 comprise double-pinion planetary gear trains, respectively, and said second planetary gear train G2 comprise a single-pinion planetary gear train;

the carrier C1 of said first planetary gear train G1 being coupled to said input member 1 and the sun gear S1 of said first planetary gear train G1 being disengageably coupled to a stationary member by the first brake B1;

the sun gear S1 of said first planetary gear train G1, the sun gear S2 of said second planetary gear train G2 and the carrier C3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S3 of said third planetary gear train G3 serving as said fourth rotational member; and the carrier C1 of said first planetary gear train G1 serving as said fifth rotational member.

104. A planetary gear transmission according to claim 98, wherein said first and third planetary gear trains G1, G3 comprise double-pinion planetary gear trains, respectively, and said second planetary gear train G2 comprises a single-pinion planetary gear train;

the sun gear S1 of said first planetary gear train G1 being coupled to said input member 1 and the carrier C1 of said first planetary gear train G1 being disengageably coupled to a stationary member by the first brake B1;

the carrier C1 of said first planetary gear train G1, the sun gear S2 of said second planetary gear train G2 and the carrier C3 of said third planetary gear train G3 jointly serving as said first rotational member;

the ring gear R1 of said first planetary gear train G1, the carrier C2 of said second planetary gear train G2 and the ring gear R3 of said third planetary gear train G3 jointly serving as said second rotational member;

the ring gear R2 of said second planetary gear train G2 serving as said third rotational member;

the sun gear S3 of said third planetary gear train G3 serving as said fourth rotational member; and the sun gear S1 of said first planetary gear train G1 serving as said fifth rotational member.

105. A planetary gear transmission comprising:
an input member;
first, second, and third planetary gear trains (G1, G2, G3) arranged coaxially with each other and each having elements including first through third sun gears, first through third carriers, and first through third ring gears, two of the elements of each of said first, second, and third planetary gear trains being directly or disengageably coupled to elements of the other planetary gear trains;

an output member;

a first and a second clutch means (K1, K2) and a first, a second and a third brake means (B1, B2, B3), for selectively establishing a power transmitting path from said input member to said output member through said first, second, and third planetary gear trains (G1, G2, G3);

said first planetary gear train (G1) comprising a double-pinion planetary gear train, one of the first sun gear (S1) and the first carrier (C1) of said first planetary gear train (G1) being coupled to said input member, and the other of said first sun gear (S1) and said first carrier (C1) being disengageably connected to a stationary member through said first brake means (B1) and also being disengageably connected to one of the elements of the second and the third planetary gear trains (G2, G3) through the first clutch means (K1); and second ring gear (R2) being disengageably connected to the input member through second clutch means (K2) and also being disengageably connected to the stationary member through the third brake means (B3).

106. A planetary gear transmission according to claim 105, wherein the first ring gear (R1) and the second carrier (C2) being firmly connected with each other and being disengageably connected to the stationary member through the second brake means (B2).

107. A planetary gear transmission according to claim 106, wherein the second sun gear (S2) and the third sun gear (S3) being firmly connected with each other and being disengageably connected to said one of the first sun gear (S1) and the first carrier (C1) through the first clutch means (K1);

the third carrier (C3) being firmly connected to the first ring gear (R1) and the second carrier (C2); and the third ring gear (R3) being connected to the output member.

108. A planetary gear transmission according to claim 106, wherein the second sun gear (S2) and the third sun gear (S3) being firmly connected with each other and being disengageably connected to said one of the first sun gear (S1) and the first carrier (C1) through the first clutch means (K1);

the third ring gear (R3) being firmly connected to the first ring gear (R1) and the second carrier (C2); and the third carrier (C3) being connected to the output member.

109. A planetary gear transmission according to claim 106, wherein the second sun gear (S2) and the third carrier (C3) being firmly connected with each other and being disengageably connected to said one of the first sun gear (S1) and the first carrier (C1) through the first clutch means (K1);

the third ring gear (R3) being firmly connected to the first ring gear (R1) and the second carrier (C2); and the third sun gear (S3) being connected to the output member.

110. A planetary gear transmission according to claim 105, wherein the second sun gear (S2) being disengageably connected to said one of the first sun gear (S1) and the first carrier (C1) through the first clutch means (K1);

the first ring gear (R1) and the second carrier (C2) being firmly connected with each other and being disengageably connected to the stationary member through the second brake (B2); and the third ring gear (R3) being firmly connected to the second ring gear (R2).

111. A planetary gear transmission according to claim 110, wherein the third sun gear (S3) being firmly connected to the first ring gear (R1) and the second carrier (C2); and the ring carrier (C3) being connected to the output member.

112. A planetary gear transmission according to claim 110, wherein the third carrier (C3) being firmly connected to the first ring gear (R1) and the second carrier (C2); and the third sun gear (S3) being connected to the output member.

113. A planetary gear transmission according to claim 105, wherein the third sun gear (S3) being disengageably connected to said one of the first sun gear (S1) and the first carrier (C1) through the first clutch means (K1);

the first ring gear (R1), the second sun gear (S2) and the third carrier (C3) being firmly connected with each other and being disengageably connected to the stationary member through the second brake means (B2); and the second carrier (C2) and the third ring gear (R3) being firmly connected with each other and also being connected to the output member.

114. A planetary gear transmission according to claim 105, wherein the third sun gear (S3) being disengageably connected to said one of the first sun gear (S1) and the first carrier (C1) through the first clutch means (K1);

the first ring gear (R1), the second carrier (C2) and the third carrier (C3) being firmly connected with each other and being disengageably connected to the stationary member through the second brake means (B2); and the second sun gear (S2) and the third ring gear (R2) being firmly connected with each other and also being connected to the output member.

115. A planetary gear transmission according to claim 105, wherein the third sun gear (S3) being disengageably connected to said one of the first sun gear (S1) and the first carrier (C1) through the first clutch means (K1);

the first ring gear (R1), the second carrier (C2) and the third ring gear (R3) being firmly connected with each other and being disengageably connected to the stationary member through the second brake means (B2); and the second sun gear (S2) and the third carrier (C3) being firmly connected with each other and also being connected to the output member.

116. A planetary gear transmission according to claim 105, wherein the third carrier (C2) being disengageably connected to said one of the first sun gear (S1) and the first carrier (C1) through the first clutch means (K1);

the first ring gear (R1), the second carrier (C2) and the third ring gear (R3) being firmly connected with each other and being disengageably connected to the stationary member through the second brake means (B2); and the second sun gear (S2) and the third sun gear (S3) being firmly connected with each other and also being connected to the output member.

117. A planetary gear transmission according to claim 105, wherein the third sun gear (S3) being disengageably connected to the first carrier (C1) through the first clutch means (K1);

the first ring gear (R1), the second sun gear (S2) and the third ring gear (R3) being firmly connected with each other and being disengageably connected to the stationary member through the second brake means (B2); and the second carrier (C2) and the third carrier (C3) being firmly connected with each other and also being connected to the output member.

118. A planetary gear transmission according to claim 105, wherein the third carrier (C3) being disengageably connected to the first carrier (C1) through the first clutch means (K1);

the first ring gear (R1), the second sun gear (S2) and the third ring gear (R3) being firmly connected with each other and being disengageably connected to the stationary member through the second brake means (B2); and the second carrier (C2) and the third sun gear (S3) being firmly connected with each other and also being connected to the output member.

* * * * *